US012574763B2

(12) United States Patent
Khalid

(10) Patent No.: US 12,574,763 B2
(45) Date of Patent: Mar. 10, 2026

(54) METHODS AND APPARATUS FOR INTEGRATED ACCESS BACKHAUL WITH MULTIPLE PARENT BASE STATIONS

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 249 days.

(21) Appl. No.: 18/378,358

(22) Filed: Oct. 10, 2023

(65) Prior Publication Data

US 2025/0119760 A1      Apr. 10, 2025

(51) Int. Cl.
| | |
|---|---|
| *H04W 24/02* | (2009.01) |
| *H04W 24/08* | (2009.01) |
| *H04W 28/02* | (2009.01) |
| *H04W 76/10* | (2018.01) |
| *H04W 88/08* | (2009.01) |

(52) U.S. Cl.
CPC ........... *H04W 24/02* (2013.01); *H04W 24/08* (2013.01); *H04W 28/0236* (2013.01); *H04W 76/10* (2018.02); *H04W 88/085* (2013.01)

(58) Field of Classification Search
CPC ..... H04W 76/10; H04W 24/08; H04W 24/02; H04W 28/0236; H04W 92/20; H04W 40/22; H04W 88/085
See application file for complete search history.

(56) References Cited

U.S. PATENT DOCUMENTS

| | | | | |
|---|---|---|---|---|
| 9,363,651 | B1 * | 6/2016 | daCosta | ................. H04W 4/14 |
| 11,570,662 | B2 | 1/2023 | Mukherjee et al. | |

(Continued)

FOREIGN PATENT DOCUMENTS

| | | |
|---|---|---|
| EP | 4135451 A1 | 2/2023 |

OTHER PUBLICATIONS

Summary of Offline Discussion on CB: # 8 Topology Redundancy, R3-205468, Nokia (moderator), 3GPP TSG-RAN WG3 #108-e, Online, Jun. 1-11, 2020, 15 pages.

(Continued)

*Primary Examiner* — Syed Ali
(74) *Attorney, Agent, or Firm* — Straub & Straub; Stephen T. Straub; Michael P. Straub

(57) ABSTRACT

The present invention relates to methods and apparatus for providing backhaul wireless services to wireless base stations. An exemplary embodiment includes the steps of: receiving, at a backhaul management node, user equipment connection information for a first base station, the first base station having a first wireless backhaul connection path to a second base station; determining, by the backhaul management node, whether or not a second wireless backhaul connection path is to be established for the first base station based on the received user equipment connection request information; and in response to determining to establish the second wireless backhaul connection path for the first base station: sending, by the backhaul management node, a message to establish the second wireless backhaul connection from the first base station to a third base station, said second and third base stations being connected to a core network via a wired and/or fiber backhaul connection.

20 Claims, 23 Drawing Sheets

100

ONE-HOP INTEGRATED ACCESS AND BACKHAUL (IAB) NETWORK

101

(56) References Cited

U.S. PATENT DOCUMENTS

| 12,464,388 | B2 * | 11/2025 | Bai | H04L 5/001 |
|---|---|---|---|---|
| 2023/0146940 | A1 | 5/2023 | Mukherjee et al. | |
| 2024/0114452 | A1 * | 4/2024 | Abedini | H04W 52/028 |
| 2024/0129975 | A1 * | 4/2024 | Zhou | H04W 76/10 |
| 2024/0137884 | A1 * | 4/2024 | Bai | G06N 20/00 |
| 2024/0155653 | A1 * | 5/2024 | Abedini | H04W 28/0215 |
| 2024/0172004 | A1 * | 5/2024 | Hanif | H04L 5/0037 |
| 2024/0204842 | A1 * | 6/2024 | Nattha | H04W 24/08 |
| 2024/0205704 | A1 * | 6/2024 | Takeda | H04W 56/001 |
| 2025/0168081 | A1 * | 5/2025 | Zhang | H04W 24/02 |
| 2025/0330846 | A1 * | 10/2025 | Kumar | H04W 24/10 |

OTHER PUBLICATIONS

Technical Specification 5G; NR; Backhaul Adaptation Protocol (BAP) specification, 3GPP TS 38.340 version 16.1.0 (Release 16), Jul. 2020, 24 pages.

* cited by examiner

200

MT/DU

BAP-SAP

C-SAP

BAP
SUBLAYER

BAP ENTITY

BAP - PDU

RLC CHANNELS

RLC - SDU

RLC
SUBLAYER

RLC UM-SAP

RLC AM-SAP

BACKHAUL ADAPTATION PROTOCOL (BAP) LAYER ABOVE RADIO LINK CONTROL (RLC) LAYER

202

| D/C | R | R | R | DESTINATION | | Oct 1 |
| DESTINATION (cont.) | | | | | PATH | Oct 2 |
| PATH (cont.) | | | | | | Oct 3 |
| Data | | | | | | Oct 4 |

BAP DATA PDU

| NEIGHBORS | DISTANCE (m) | CHANNELS | AVERAGE LATENCY (ms) | TP AVAILABLE DL/UL (Mbps) | CELL LOADING (%) | BAND |
|---|---|---|---|---|---|---|
| NWB_2 | 300 | 1, 2, 3, (1,2,3) | 100, 110, 115, 113 | 50, 52, 48, 140 | 50 | CBRS (3.550 GHz to 3.7 GHz) |
| NWB_2 | 300 | 4 | 80 | 200 | 20 | 60 GHz |
| NWB_3 | 450 | 2, 3 | 200, 210 | 70,75 | 40 | CBRS (3.550 GHz to 3.7 GHz) |
| NWB_4 | 800 | 1, 3 | 250, 255 | 30, 40 | 60 | CBRS (3.550 GHz to 3.7 GHz) |
| ... | ... | ... | ... | ... | ... | ... |

| FIGURE 15A |
| FIGURE 15B |
| FIGURE 15C |
| FIGURE 15D |

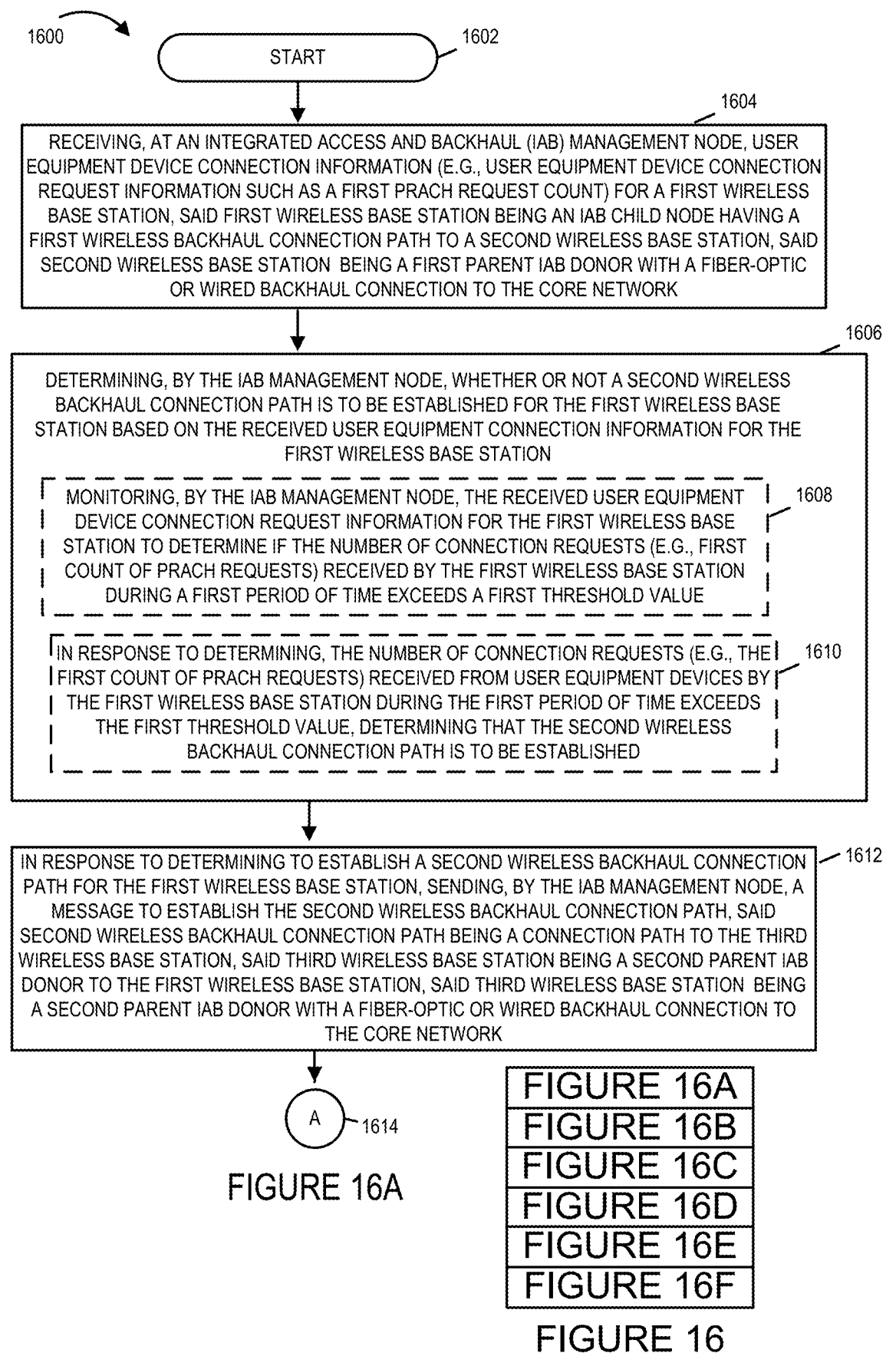

1600

1602
START

1604
RECEIVING, AT AN INTEGRATED ACCESS AND BACKHAUL (IAB) MANAGEMENT NODE, USER EQUIPMENT DEVICE CONNECTION INFORMATION (E.G., USER EQUIPMENT DEVICE CONNECTION REQUEST INFORMATION SUCH AS A FIRST PRACH REQUEST COUNT) FOR A FIRST WIRELESS BASE STATION, SAID FIRST WIRELESS BASE STATION BEING AN IAB CHILD NODE HAVING A FIRST WIRELESS BACKHAUL CONNECTION PATH TO A SECOND WIRELESS BASE STATION, SAID SECOND WIRELESS BASE STATION BEING A FIRST PARENT IAB DONOR WITH A FIBER-OPTIC OR WIRED BACKHAUL CONNECTION TO THE CORE NETWORK

1606
DETERMINING, BY THE IAB MANAGEMENT NODE, WHETHER OR NOT A SECOND WIRELESS BACKHAUL CONNECTION PATH IS TO BE ESTABLISHED FOR THE FIRST WIRELESS BASE STATION BASED ON THE RECEIVED USER EQUIPMENT CONNECTION INFORMATION FOR THE FIRST WIRELESS BASE STATION

1608
MONITORING, BY THE IAB MANAGEMENT NODE, THE RECEIVED USER EQUIPMENT DEVICE CONNECTION REQUEST INFORMATION FOR THE FIRST WIRELESS BASE STATION TO DETERMINE IF THE NUMBER OF CONNECTION REQUESTS (E.G., FIRST COUNT OF PRACH REQUESTS) RECEIVED BY THE FIRST WIRELESS BASE STATION DURING A FIRST PERIOD OF TIME EXCEEDS A FIRST THRESHOLD VALUE

1610
IN RESPONSE TO DETERMINING, THE NUMBER OF CONNECTION REQUESTS (E.G., THE FIRST COUNT OF PRACH REQUESTS) RECEIVED FROM USER EQUIPMENT DEVICES BY THE FIRST WIRELESS BASE STATION DURING THE FIRST PERIOD OF TIME EXCEEDS THE FIRST THRESHOLD VALUE, DETERMINING THAT THE SECOND WIRELESS BACKHAUL CONNECTION PATH IS TO BE ESTABLISHED

1612
IN RESPONSE TO DETERMINING TO ESTABLISH A SECOND WIRELESS BACKHAUL CONNECTION PATH FOR THE FIRST WIRELESS BASE STATION, SENDING, BY THE IAB MANAGEMENT NODE, A MESSAGE TO ESTABLISH THE SECOND WIRELESS BACKHAUL CONNECTION PATH, SAID SECOND WIRELESS BACKHAUL CONNECTION PATH BEING A CONNECTION PATH TO THE THIRD WIRELESS BASE STATION, SAID THIRD WIRELESS BASE STATION BEING A SECOND PARENT IAB DONOR TO THE FIRST WIRELESS BASE STATION, SAID THIRD WIRELESS BASE STATION BEING A SECOND PARENT IAB DONOR WITH A FIBER-OPTIC OR WIRED BACKHAUL CONNECTION TO THE CORE NETWORK

| FIGURE 16A |
| FIGURE 16B |
| FIGURE 16C |
| FIGURE 16D |
| FIGURE 16E |
| FIGURE 16F |

FIGURE 16

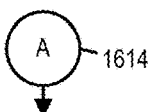

A ~1614

STEP 1616 PART A

SELECTING, BY THE IAB MANAGEMENT NODE, THE THIRD WIRELESS BASE STATION FROM A PLURALITY OF NEIGHBOR WIRELESS BASE STATIONS AFTER DETERMINING TO ESTABLISH THE SECOND WIRELESS BACKHAUL CONNECTION PATH FOR THE FIRST WIRELESS BASE STATION AND PRIOR TO SENDING SAID MESSAGE TO ESTABLISH THE SECOND WIRELESS BACKHAUL CONNECTION PATH, SAID NEIGHBOR BASE STATIONS BEING NEIGHBORS TO THE FIRST WIRELESS BASE STATION (E.G., FIRST WIRELESS BASE STATION IS WITHIN THE COVERAGE AREA OF EACH OF THE NEIGHBOR WIRELESS BASE STATIONS

SELECTING, BY THE IAB MANAGEMENT NODE, THE THIRD WIRELESS BASE STATION FROM A PLURALITY OF NEIGHBOR WIRELESS BASE STATIONS BASED ON MEASURED BACKHAUL CONNECTION PATH PERFORMANCE OR PREDICTED BACKAHAUL CONNECTION PATH PERFORMANCE                    1618

SELECTING, BY THE IAB MANAGEMENT NODE, THE THIRD WIRELESS BASE STATION FROM A PLURALITY OF NEIGHBOR WIRELESS BASE STATIONS BASED ON HISTORICAL PERFORMANCE CHARACTERISTICS AND/OR METRICS OF WIRELESS BACKHAUL CONNECTION PATHS PROVIDED BY NEIGHBOR WIRELESS BASE STATIONS TO THE FIRST WIRELESS BASE STATION                    1620

1622

SELECTING, BY THE IAB MANAGEMENT NODE, THE THIRD WIRELESS BASE STATION FROM A PLURALITY OF NEIGHBOR WIRELESS BASE STATIONS BASED ON MEASURED WIRELESS BACKHAUL CONNECTION PATH PERFORMANCE METRICS

SENDING MESSAGES TO THE ONE OR MORE NEIGHBOR WIRELESS BASE STATIONS REQUESTING THE ONE OR MORE NEIGHBOR WIRELESS BASE STATIONS EXECUTE WIRELESS BACKHAUL CONNECTION PATH PERFORMANCE TESTS ON A WIRELESS BACKHAUL CONNECTION PATH BETWEEN THE NEIGHBOR WIRELESS BASE STATION WHICH RECEIVED THE MESSAGE AND THE FIRST WIRELESS BASE STATION                    1624

RECEIVING MEASURED WIRELESS BACKHAUL CONNECTION PATH PERFORMANCE RESULTS FROM THE ONE OR MORE NEIGHBOR WIRELESS BASE STATIONS, SAID ONE OR MORE NEIGHBOR WIRELESS BASE STATIONS INCLUDING THE THIRD WIRELESS BASE STATION                    1626

GENERATING AND/OR DETERMINING SAID MEASURED WIRELESS BACKHAUL CONNECTION PATH PERFORMANCE METRICS FROM SAID MEASURED WIRELESS BACKHAUL CONNECTION PATH RESULTS                    1628

COMPARING THE GENERATED BACKHAUL CONNECTION PATH PERFORMANCE METRICS FOR EACH BACKHAUL CONNECTION PATH TO EACH OTHER AND/OR A SET OF PERFORMANCE CRITERIA FOR THE SECOND WIRELESS BACKHAUL CONNECTION PATH TO DETERMINE WHICH NEIGHBOR WIRELESS BASE STATION CAN PROVIDE A WIRELESS BACKHAUL CONNECTION PATH WHICH BEST MEETS OR EXCEEDS A SET OF PERFORMANCE CRITERIA FOR THE SECOND WIRELESS BACKHAUL CONNECTION PATH                    1630

Figure 16C:
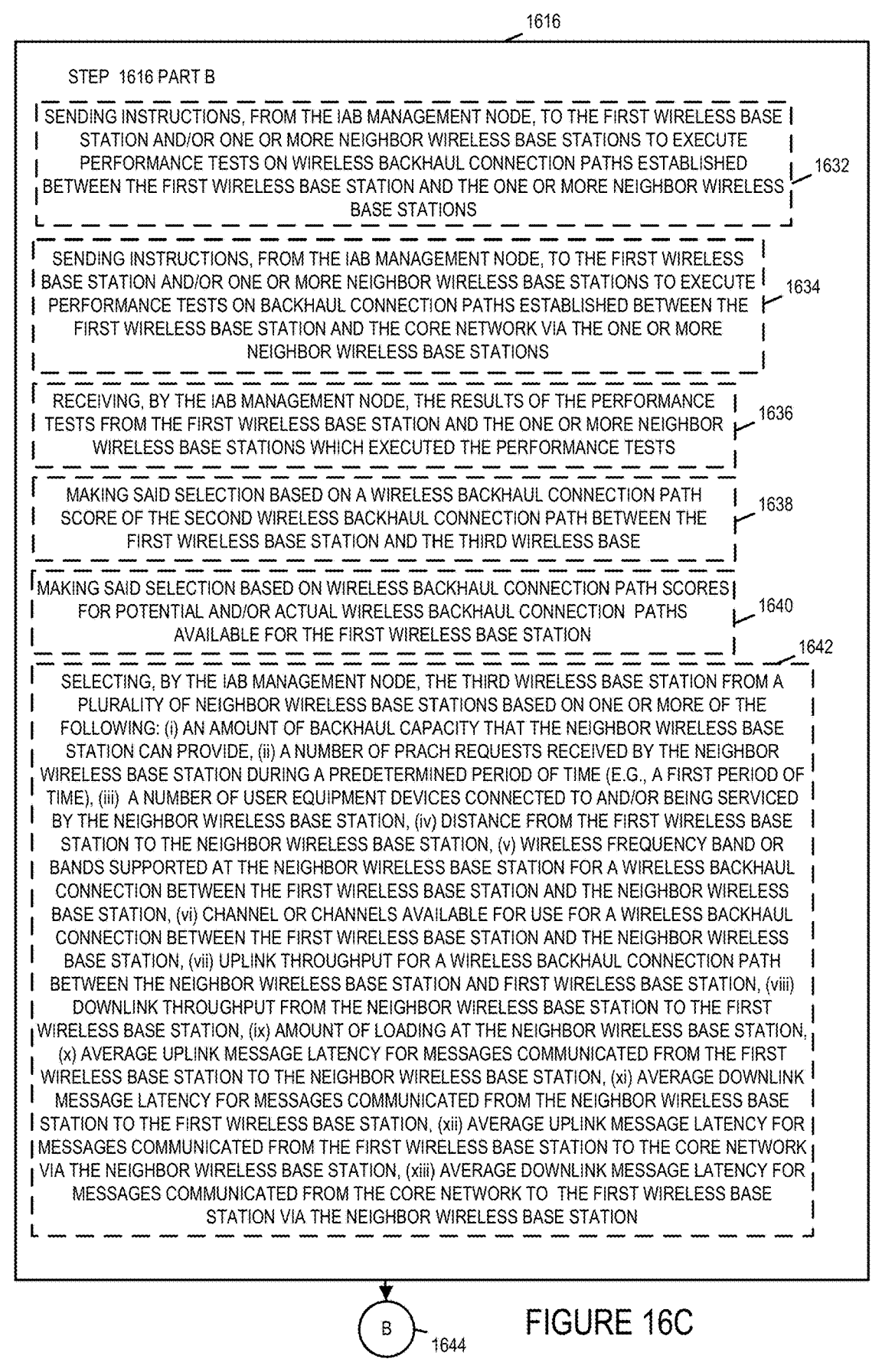

STEP 1616 PART B

SENDING INSTRUCTIONS, FROM THE IAB MANAGEMENT NODE, TO THE FIRST WIRELESS BASE STATION AND/OR ONE OR MORE NEIGHBOR WIRELESS BASE STATIONS TO EXECUTE PERFORMANCE TESTS ON WIRELESS BACKHAUL CONNECTION PATHS ESTABLISHED BETWEEN THE FIRST WIRELESS BASE STATION AND THE ONE OR MORE NEIGHBOR WIRELESS BASE STATIONS — 1632

SENDING INSTRUCTIONS, FROM THE IAB MANAGEMENT NODE, TO THE FIRST WIRELESS BASE STATION AND/OR ONE OR MORE NEIGHBOR WIRELESS BASE STATIONS TO EXECUTE PERFORMANCE TESTS ON BACKHAUL CONNECTION PATHS ESTABLISHED BETWEEN THE FIRST WIRELESS BASE STATION AND THE CORE NETWORK VIA THE ONE OR MORE NEIGHBOR WIRELESS BASE STATIONS — 1634

RECEIVING, BY THE IAB MANAGEMENT NODE, THE RESULTS OF THE PERFORMANCE TESTS FROM THE FIRST WIRELESS BASE STATION AND THE ONE OR MORE NEIGHBOR WIRELESS BASE STATIONS WHICH EXECUTED THE PERFORMANCE TESTS — 1636

MAKING SAID SELECTION BASED ON A WIRELESS BACKHAUL CONNECTION PATH SCORE OF THE SECOND WIRELESS BACKHAUL CONNECTION PATH BETWEEN THE FIRST WIRELESS BASE STATION AND THE THIRD WIRELESS BASE — 1638

MAKING SAID SELECTION BASED ON WIRELESS BACKHAUL CONNECTION PATH SCORES FOR POTENTIAL AND/OR ACTUAL WIRELESS BACKHAUL CONNECTION PATHS AVAILABLE FOR THE FIRST WIRELESS BASE STATION — 1640

1642

SELECTING, BY THE IAB MANAGEMENT NODE, THE THIRD WIRELESS BASE STATION FROM A PLURALITY OF NEIGHBOR WIRELESS BASE STATIONS BASED ON ONE OR MORE OF THE FOLLOWING: (i) AN AMOUNT OF BACKHAUL CAPACITY THAT THE NEIGHBOR WIRELESS BASE STATION CAN PROVIDE, (ii) A NUMBER OF PRACH REQUESTS RECEIVED BY THE NEIGHBOR WIRELESS BASE STATION DURING A PREDETERMINED PERIOD OF TIME (E.G., A FIRST PERIOD OF TIME), (iii) A NUMBER OF USER EQUIPMENT DEVICES CONNECTED TO AND/OR BEING SERVICED BY THE NEIGHBOR WIRELESS BASE STATION, (iv) DISTANCE FROM THE FIRST WIRELESS BASE STATION TO THE NEIGHBOR WIRELESS BASE STATION, (v) WIRELESS FREQUENCY BAND OR BANDS SUPPORTED AT THE NEIGHBOR WIRELESS BASE STATION FOR A WIRELESS BACKHAUL CONNECTION BETWEEN THE FIRST WIRELESS BASE STATION AND THE NEIGHBOR WIRELESS BASE STATION, (vi) CHANNEL OR CHANNELS AVAILABLE FOR USE FOR A WIRELESS BACKHAUL CONNECTION BETWEEN THE FIRST WIRELESS BASE STATION AND THE NEIGHBOR WIRELESS BASE STATION, (vii) UPLINK THROUGHPUT FOR A WIRELESS BACKHAUL CONNECTION PATH BETWEEN THE NEIGHBOR WIRELESS BASE STATION AND FIRST WIRELESS BASE STATION, (viii) DOWNLINK THROUGHPUT FROM THE NEIGHBOR WIRELESS BASE STATION TO THE FIRST WIRELESS BASE STATION, (ix) AMOUNT OF LOADING AT THE NEIGHBOR WIRELESS BASE STATION, (x) AVERAGE UPLINK MESSAGE LATENCY FOR MESSAGES COMMUNICATED FROM THE FIRST WIRELESS BASE STATION TO THE NEIGHBOR WIRELESS BASE STATION, (xi) AVERAGE DOWNLINK MESSAGE LATENCY FOR MESSAGES COMMUNICATED FROM THE NEIGHBOR WIRELESS BASE STATION TO THE FIRST WIRELESS BASE STATION, (xii) AVERAGE UPLINK MESSAGE LATENCY FOR MESSAGES COMMUNICATED FROM THE FIRST WIRELESS BASE STATION TO THE CORE NETWORK VIA THE NEIGHBOR WIRELESS BASE STATION, (xiii) AVERAGE DOWNLINK MESSAGE LATENCY FOR MESSAGES COMMUNICATED FROM THE CORE NETWORK TO THE FIRST WIRELESS BASE STATION VIA THE NEIGHBOR WIRELESS BASE STATION

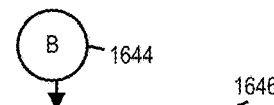

B — 1644

1646

DETERMINING, BY THE IAB MANAGEMENT NODE, SESSION ESTABLISHMENT INFORMATION (E.G., FREQUENCY BAND INFORMATION, CHANNEL INFORMATION, BANDWIDTH INFORMATION (E.G., BANDWIDTH PART INFORMATION), AND/OR IP ADDRESS INFORMATION FOR THE FIRST WIRELESS BASE STATION AND THE THIRD WIRELESS BASE STATION) FOR THE SECOND WIRELESS BACKHAUL CONNECTION PATH BETWEEN THE FIRST WIRELESS BASE STATION AND THE THIRD WIRELESS BASE STATION

1648

ALLOCATING AND/OR OBTAINING AN ALLOCATION OF BANDWIDTH/SPECTRUM (E.G., LICENSED SPECTRUM (CITIZENS BROADBAND RADIO SERVICE (CBRS) PRIORITY ACCESS LICENSE (PAL) SPECTRUM, UNLICENSED SPECTRUM (E.G., CBRS GENERAL AUTHORIZED ACCESS (GAA) SPECTRUM) OR A COMBINATION OF LICENSED AND UNLICENSED SPECTRUM (E.G., CBRS PAL AND GAA SPECTRUM) FROM A SPECTRUM ACCESS SYSTEM) AND ONE OR MORE CHANNELS TO BE UTILIZED FOR THE SECOND WIRELESS BACKHAUL CONNECTION PATH BETWEEN THE FIRST WIRELESS BASE STATION AND THE THIRD WIRELESS BASE STATION

1650

DETERMINING IAB PARAMETERS FOR ESTABLISHING AN IAB BACKHAUL CONNECTION PATH FROM THE FIRST WIRELESS BASE STATION TO THE THIRD WIRELESS BASE STATION, SAID IAB PARAMETERS INCLUDING ONE OR MORE OF THE FOLLOWING: INFORMATION IDENTIFYING THE FIRST WIRELESS BASE STATION AS THE CHILD IAB NODE AND THE THIRD WIRELESS BASE STATION AS THE PARENT IAB DONOR, AND MESSAGE ROUTING INFORMATION

1652

DETERMINING INSTRUCTIONS/RULES FOR THE FIRST WIRELESS BASE STATION ON HOW TO MAKE ROUTING DECISIONS FOR DATA STREAMS BASED ON AVAILABLE WIRELESS BACKHAUL CONNECTION PATHS (E.G., HOW TO DETERMINE WHETHER A DATA STREAM IS TO BE ROUTED VIA THE FIRST WIRELESS BACKHAUL CONNECTION PATH OR THE SECOND WIRELESS BACKHAUL CONNECTION PATH – DATA STREAMS FROM SENSORS ARE TO BE ROUTED USING THE SECOND WIRELESS BACKHAUL CONNECTION PATH AS IT HAS A HIGHER UPLINK THROUGHPUT AND/OR CAPACITY THAN THE FIRST WIRELESS BACKHAUL CONNECTION PATH, ROUND ROBIN SELECTION OF AVAILABLE WIRELESS BACKHAUL CONNECTION PATHS AS THE AVAILABLE WIRELESS BACKHAUL CONNECTION PATHS HAVE SIMILAR PERFORMANCE CHARACTERISTICS AND SIMILAR LOADING CONDITIONS ON THE FIRST AND SECOND WIRELESS BASE STATIONS , DATA STREAMS FOR VIDEO APPLICATIONS ARE TO BE ROUTED VIA THE FIRST WIRELESS BACKHAUL CONNECTION AS IT HAS HIGHER DOWNLINK THROUGHPUT AND/OR CAPACITY THAN THE SECOND WIRELESS BACKHAUL CONNECTION PATH)

1654

COMMUNICATING, BY THE IAB MANAGEMENT NODE, THE DETERMINED SESSION ESTABLISHMENT INFORMATION FOR THE SECOND WIRELESS BACKHAUL CONNECTION PATH TO THE FIRST WIRELESS BASE STATION AND THE THIRD WIRELESS BASE STATION

1656

ESTABLISHING, BY THE FIRST WIRELESS BASE STATION AND THE THIRD WIRELESS BASE STATION, THE SECOND WIRELESS BACKHAUL CONNECTION PATH BETWEEN THE FIRST WIRELESS BASE STATION AND THE THIRD WIRELESS BASE STATION, SAID SECOND WIRELESS BACKHAUL CONNECTION PATH BEING AN IAB BACKHAUL CONNECTION PATH

1658

UTILIZING THE SECOND WIRELESS BACKHAUL CONNECTION PATH TO COMMUNICATE DATA FROM THE FIRST WIRELESS BASE STATION TO THE CORE NETWORK VIA THE THIRD WIRELESS BASE STATION

1660

COMMUNICATING, BY THE FIRST WIRELESS BASE STATION, DATA IN IAB BACKHAUL ADAPTION PROTOCOL PACKETS TO THE THIRD WIRELESS BASE STATION VIA THE SECOND WIRELESS BACKHAUL CONNECTION PATH

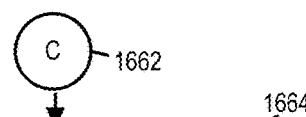

C — 1662

1664

CONTINUOUSLY MONITOR, BY THE IAB MANAGEMENT NODE, THE PERFORMANCE OF THE WIRELESS BACKHAUL CONNECTION PATHS IN THE SYSTEM AND THE CONDITIONS AT THE WIRELESS BASE STATIONS (E.G., IAB NODES AND IAB DONORS)

REQUEST, BY THE IAB MANAGEMENT NODE, OSS PROVIDE INFORMATION/METRICS ON WIRELESS BACKHAUL CONNECTION PATHS INCLUDING THE SECOND WIRELESS BACKHAUL CONNECTION PATH AND WIRELESS BASE STATION CONDITIONS INCLUDING THE CONDITIONS AT THE FIRST, SECOND, AND THIRD WIRELESS BASE STATIONS (E.G., NUMBER OF UE CONNECTION REQUESTS RECEIVED BY EACH WIRELESS BASE STATION IN A GIVEN PERIOD OF TIME, LOADING ON THE WIRELESS BASE STATION, CONGESTION AT THE WIRELESS BASE STATION OR BACKHAUL CONNECTION PATHS UTILIZED BY THE WIRELESS BASE STATION) — 1668

RECEIVE, BY THE IAB MANAGEMENT NODE, INFORMATION/METRICS ON WIRELESS BACKHAUL CONNECTION PATHS INCLUDING THE SECOND WIRELESS BACKHAUL CONNECTION PATH AND WIRELESS BASE STATION CONDITIONS INCLUDING THE CONDITIONS AT THE FIRST, SECOND, AND THIRD WIRELESS BASE STATIONS (E.G., NUMBER OF UE CONNECTION REQUESTS RECEIVED BY EACH WIRELESS BASE STATION IN A GIVEN PERIOD OF TIME, LOADING ON THE WIRELESS BASE STATION, CONGESTION AT THE WIRELESS BASE STATION OR BACKHAUL CONNECTION PATHS UTILIZED BY THE WIRELESS BASE STATION) — 1670

REQUEST, BY THE IAB MANAGEMENT NODE, WIRELESS BASE STATIONS PERFORM WIRELESS BACKHAUL CONNECTION PATH PERFORMANCE TESTS AND REPORT RESULTS TO THE IAB MANAGEMENT NODE — 1672

RECEIVE, BY THE IAB MANAGEMENT NODE, WIRELESS BACKHAUL CONNECTION PATH PERFORMANCE RESULTS FROM WIRELESS BASE STATIONS — 1674

GENERATE PERFORMANCE METRICS FOR THE WIRELESS BACKHAUL CONNECTION PATHS INCLUDING THE FIRST AND SECOND WIRELESS BACKHAUL CONNECTION PATHS FROM THE INFORMATION/METRICS AND/OR PERFORMANCE TEST RESULTS RECEIVED FROM THE OSS AND/ OR THE WIRELESS BASE STATIONS — 1676

STORE THE GENERATED PERFORMANCE METRICS FOR THE WIRELESS BACKHAUL CONNECTION PATHS INCLUDING THE FIRST AND SECOND WIRELESS BACKHAUL CONNECTION PATHS GENERATED FROM THE INFORMATION/METRICS AND/OR PERFORMANCE TEST RESULTS RECEIVED FROM THE OSS AND/OR THE WIRELESS BASE STATIONS ALONG WITH INFORMATION ON THE CONDITIONS AT THE WIRELESS BASE STATIONS AND THE TIME THE TESTS WERE PERFORMED AND/OR THE TIME THE METRICS WERE GENERATED AND/OR COLLECTED — 1678

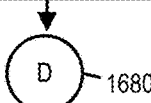

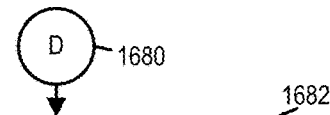

D ~ 1680

1682

DYNAMICALLY AND IN REAL TIME OR NEAR REAL TIME MODIFY THE WIRELESS BACKHAUL CONNECTION PATHS IN THE SYSTEM TO INCREASE NETWORK BACKHAUL PERFORMANCE AND/OR EFFICIENCY IN RESPONSE TO THE MONITORED PERFORMANCE OF THE WIRELESS BACKHAUL CONNECTIONS AND WIRELESS BASE STATION CONDITIONS/STATUS

1684

GENERATING INSTRUCTIONS, BY THE IAB MANAGEMENT NODE, FOR ONE OR MORE IAB DONORS AND/OR IAB CHILD NODES TO PERFORM ONE OR MORE OF THE FOLLOWING OPERATIONS: (i) IMPLEMENT A NEW IAB WIRELESS BACKHAUL CONNECTION PATH, (ii) TERMINATE AN EXISTING IAB WIRELESS BACKHAUL CONNECTION PATH, (iii) TRANSFER A DATA STREAM FROM ONE IAB WIRELESS BACKHAUL CONNECTION PATH TO A DIFFERENT IAB WIRELESS BACKHAUL CONNECTGION PATH, (iv) DEDICATE ADDITIONAL BANDWIDTH CAPACITY TO AN EXISTING IAB WIRELESS BACKHAUL CONNECTION PATH, AND (v) REDUCE BANDWIDTH CAPACITY FOR AN EXISTING IAB WIRELESS BACKHAUL CONNECTION PATH

1686

SENDING THE GENERATED INSTRUCTIONS, BY THE IAB MANAGEMENT NODE, TO THE ONE OR MORE IAB DONORS AND/OR IAB CHILD NODES

1688

DETERMINING, BY THE IAB MANAGEMENT NODE, BASED ON THE INFORMATION/METRICS GENERATED AND/OR OBTAINED FROM THE CONTINUOUS MONITORING INCLUDING THE MONITORING OF THE FIRST WIRELESS BACKHAUL CONNECTION PATH, THE SECOND WIRELESS BACKHAUL CONNECTION PATH, THE CONDITIONS AT THE FIRST WIRELESS BASE STATION, THE CONDITIONS AT THE SECOND WIRELESS BASE STATION, THE CONDITIONS AT THE THIRD WIRELESS BASE STATION (E.G., UE CONNECTION REQUEST INFORMATION FOR THE FIRST WIRELESS BASE STATION, UE CONNECTION REQUEST INFORMATION FOR THE SECOND WIRELESS BASE STATION, UE CONNECTION REQUEST INFORMATION FOR THE THIRD WIRELESS BASE STATION, CELL LOADING AT THE FIRST WIRELESS BASE STATION, CELL LOADING AT THE SECOND WIRELESS BASE STATION, AND/OR CELL LOADING AT THE THIRD WIRELESS BASE STATION) WHETHER OR NOT TO ADD AN ADDITIONAL WIRELESS BACKHAUL CONNECTION PATH FOR THE FIRST WIRELESS BASE STATION OR TERMINATE AN EXISTING BACKHAUL CONNECTION PATH FOR THE FIRST WIRELESS BASE STATION (E.G., THE FIRST WIRELESS BACKHAUL CONNECTION PATH OR THE SECOND WIRELESS BACKHAUL CONNECTION PATH)

1690

IN RESPONSE TO DETERMINING TO ADD AN ADDITIONAL WIRELESS BACKHAUL CONNECTION PATH, (i) SELECTING A FOURTH WIRELESS BASE STATION TO BE AN IAB PARENT DONOR FOR THE FIRST WIRELESS BASE STATION, AND (ii) SENDING ONE OR MESSAGES TO ESTABLISH AN ADDITIONAL WIRELESS BACKHAUL CONNECTION PATH FOR THE FIRST WIRELESS BASE STATION BETWEEN THE FIRST WIRELESS BASE STATION AND THE SELECTED FOURTH WIRELESS BASE STATION

1692

IN RESPONSE TO DETERMINING TO TERMINATE THE FIRST WIRELESS BACKHAUL CONNECTION PATH, SENDING INSTRUCTIONS TO THE FIRST WIRELESS BASE STATION AND/OR THE SECOND WIRELESS BASE STATION TO TERMINATE THE FIRST WIRELESS BACKHAUL CONNECTION PATH

FIGURE 16F        C ~ 1662

METHODS AND APPARATUS FOR INTEGRATED ACCESS BACKHAUL WITH MULTIPLE PARENT BASE STATIONS

FIELD OF INVENTION

The present invention relates to methods and apparatus for providing wireless backhaul services. More particularly, the present invention relates to methods and apparatus for providing multi-parent Integrated Access and Backhaul (IAB) donor wireless backhaul services in Integrated Access and Backhaul wireless networks.

BACKGROUND OF THE INVENTION

Wireless communications faces various challenges in terms of deployment. For example, in some use cases of deployment, it is hard to get wired or fiber-optic backhaul to the cell sites (also referred to a wireless base stations) or in some cases the cell sites are themselves mobile, i.e., the cell sites might be moved depending on coverage and capacity requirements. In situations where wired backhaul isn't an option, it is too complicated and/or is not economically feasible (e.g., too expensive to be commercially practical for return on investment), wireless backhaul is an option. Wireless backhaul allows sites without wired backhaul to operate as normal sites extending the wireless coverage footprint of a wireless network.

Integrated Access and Backhaul (IAB) was introduced in 3GPP Release 16 for New Radio as discussed in the 3GPP Technical Reference (TR) 38.874 v16.0.0, "Study on integrated access and backhaul (Release 16)," dated Dec. 18, 2018. This feature enables standardized support for in-band wireless backhaul links, enabling flexible and very dense deployment of New Radio (NR) wireless cells without the need for densifying the wired transport network proportionately. A typical use case is where Integrated Access and Backhaul is operated in millimeter-wave spectrum where large carrier bandwidths are available for wireless backhaul.

By way of background, an Integrated Access Backhaul-node (IAB-node) is a Radio Access Network (RAN) node that supports wireless access to User Equipment devices (UEs) and also acts as wireless backhaul for the access traffic. An IAB-donor is a RAN node which provides User Equipment's interface to the core network and wireless backhauling scheduling for IAB-nodes. The receiver functionalities at an IAB-node that would normally belong to a New Radio User Equipment device are referred to as mobile termination (MT). In a multi-hop scenario, the upstream IAB-node is referred to as a parent node, while a downstream IAB-node is known as a child node.

The 3GPP Release 16 for New Radio requirements support a network architecture option 1a for Integrated Access and Backhaul, where the donor is disaggregated into a gNB-CU (gNB-control unit) and a gNB-DU (gNB-distributed unit).

Integrated Access and Backhaul is implemented in a one parent base station to one child base station relationship or one parent base station to many base stations relationship. FIG. 1 shows a one parent to two child base station relationship. The wireless base station providing backhaul to other wireless base stations is referred to as a parent node or IAB donor. The wireless base stations which are provided backhaul services from the parent nodes are referred to as child nodes or IAB nodes. A parent node can have multiple children nodes and children nodes (i.e., multi-hop parent-child relationship. A wireless base station which is a parent node has to support both access for user equipment devices as well backhaul for its children nodes. Therefore, the quality of performance provided to end users by the child node may be very limited (e.g., when there not a sufficient amount of wireless backhaul bandwidth for the number of users being serviced by a child node).

As the legend 101 indicates FIG. 1 illustrates a one-hop Integrated Access Backhaul network. The IAB network 100 has four wireless access links and two IAB wireless backhaul links. The one-hop integrated access and backhaul (IAB) network 100 of FIG. 1 includes a parent node 102 which is an IAB donor connected to a fiber transport 130, a child node 1 104, a child node 2 106, and user equipment devices 110, 112, 114, and 116. The UE 110 is connected to the child node 1 104 via wireless access link 126. The UE 112 is coupled to the parent node 102 via wireless access link 122. The UE 114 is connected to the parent node 102 via wireless access link 124. The UE 116 is connected to the child node 2 106 via wireless access link 128. The child node 1 104 and child node 2 106 are IAB nodes which are children to the parent node 102. The child node 1 104 is connected to the parent node 102 via a wireless backhaul link 118. The child node 2 106 is connected to parent node 102 via wireless backhaul link 120. The parent node 102 is an IAB donor node connected to a network 140 (e.g., a core network) via fiber transport 130.

The 3GPP Release 16 New Radio requirements for Integrated Access and Backhaul introduced a new backhaul adaptation layer (BAP) above the Radio Link Control Layer for backhaul links. Diagram 200 of FIG. 2 illustrates FIG. 4.2.1-1 from the 5G, NR; Backhaul Adaptation Protocol (BAP) specification (3GPP TS 38.340 version 16.1.0 Release 16 (ETSI TS 138 340 V16.1.0 (2020-07). The 3rd Generation Partnership Project (3GPP) European Telecommunications Standards Institute (ETSI) Technical Specification (TS) 138 340 V16.1.0 (2020-07) 5G; NR: Backhaul Adaptation Protocol (BAP) specification (3GPP TS 38.340 version 16.1.0 Release 16) is hereby incorporated by reference in its entirety. FIG. 2 diagram 200 illustrates the structure of the Backhaul Adaptation Protocol (BAP) layer and its position above the Radio Link Control Layer. As described in the TS 38.340, "Backhaul Adaptation Protocol (BAP) specification," dated the new backhaul adaptation layer supports functions such as data transfer, routing of packets to next hop, determination of backhaul adaptation protocol destination and path for packets from upper layers, determination of egress Radio Link Control channels for packets routed to next hop, differentiating traffic to be delivered to upper layers from traffic to be delivered to egress link, flow control feedback signaling, and backhaul radio link failure indication. A functional view of the BAP sub-layer is shown in diagram 300 of FIG. 3. Diagram 300 is based on FIG. 4.2.2-1 from TS 38.340, "Backhaul Adaptation Protocol (BAP) specification".

As described in the TS 38.340 specification section 4.2.2, the IAB-node, the BAP sublayer contains one BAP entity at the MT (Mobile Termination) function and a separate co-located BAP entity at the Distributed Unit (DU) function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the BackHaul (BH) link. Backhaul RLC channel is a Radio Link Control (RLC) channel between two nodes, which is used to transport backhaul packets. The Ingress RLC channel is a Backhaul RLC channel on which a packet is received by a node.

Egress RLC channel is a Backhaul RLC channel on which a packet is transmitted by a node. An Ingress link is a radio link on which a packet is received by a node. An Egress link is a radio link on which a packet is transmitted by a node.

In the example of FIG. 3 as described in the TS 38.340 specification section 4.2.2, the receiving part on the BAP entity delivers BAP Protocol Data Units (PDUs) to the transmitting part on the collocated BAP entity. It should also be noted that alternatively, the receiving part may deliver BAP Service Data Units (SDUs) to the collocated transmitting part. When passing BAP SDUs, the receiving part removes the BAP header and the transmitting part adds the BAP header with the same BAP routing ID as carried on the BAP PDU header prior to removal. Passing BAP SDUs as described is functionally equivalent to passing BAP PDUs, in implementation.

Diagram 202 of FIG. 2 which is FIG. 6.2.2-1 of the TS 38.340 specification illustrates the BAP data Protocol Data Unit (PDU) structure that conveys the PDU header and upper layer data. It includes the following parameters/fields: (i) DESTINATION field which has a length of 10 bits and carries the BAP address of destination of IAB node or IAB-donor node; (ii) PATH field which has a length of 10 bits and carries the BAP path identity; (III) Data field which is has variable bit length and carries the BAP Service Data Unit (i.e., the Internet Protocol packet); (iv) R field which has a length of 1 bit and is reserved for future use and is set to zero in Release 16 of the specification; and (v) D/C field which has a length of 1 bit and indicates whether the BAP PDU is a BAP Data PDU or a BAP Control PDU.

The BAP specifications, e.g., Release 16 and Release 17 IAB specifications, only support a single Radio Access Technology which is New Radio. Meanwhile, many Mobile Network Operators (MNOs) and Mobile Service Operators (MSOs) have already deployed wireless backhaul systems that are based on proprietary Radio Access Technologies (RATs) or Long Term Evolution (LTE) or Wi-Fi/WiGig technologies. For example, IEEE 802.11ad (WiGig) is currently utilized by some operators for wireless backhaul in the 60 GHz unlicensed band.

From the foregoing, it will be appreciated that there is a need for new and/or improved methods and apparatus to solve the technological problem of how to provide backhaul services that can provide quality performance to end users in an efficient and economical manner to locations where wired backhaul is not available, not practical and/or not economical. Furthermore, it will be appreciated that there is a need for new and/or improved methods and apparatus to solve the technological problem of how to efficiently and economically utilize a network's wireless spectrum to expand a network's coverage area while providing quality service to all user equipment devices whether they are connected to a base station having a wired backhaul connection or to a Integrated Access an Backhaul node which relies on wireless backhaul connection to a parent IAB donor. There is a further need for new and/or improved methods and apparatus for implementing wireless networks having multiple multi-IAB donor parent nodes providing services to the same child nodes. There is a further need for new and/or improved methods and apparatus for managing wireless IAB backhaul connections in multi-IAB donor parent node wireless networks to optimize the network efficiency (e.g., quality of service for user equipment devices, coverage area, and/or spectral efficiency). There is a further need for new and/or improved methods and apparatus of how to utilize multi-Radio Access Technology including licensed and unlicensed spectrum for providing IAB services. Furthermore, there is a need for new and/or improved methods and apparatus that can improve the efficiency, robustness and adaptability to traffic loads of Integrated Access and Backhaul networks through the support of multi-Radio Access Technologies and the management of multiple IAB backhaul connections to multiple IAB donor nodes which provide wired backhaul connections to a core network. There is a further need for new and/or improved methods and apparatus for dynamically monitoring and managing wireless backhaul communications links among wireless base stations to provide load balancing and/or optimization of network resources such as for example spectrum usage.

SUMMARY OF THE INVENTION

The present invention includes novel methods and apparatus for providing a technological solution to the problem of how to provide backhaul services that can provide quality performance to end users in a robust, efficient and economical manner to locations where wired backhaul is not available, not practical and/or not economical. Various embodiments of the present invention provide new and/or improved methods and apparatus to solve the technological problem of how to efficiently and economically utilize a network's wireless spectrum to expand a network's coverage area while providing quality service to all user equipment devices whether they are connected to a base station having a wired backhaul connection or to a Integrated Access an Backhaul node which relies on wireless backhaul connection to a parent IAB donor. Various embodiments of the present invention provide new and/or improved methods and apparatus for implementing wireless networks having multiple multi-IAB donor parent nodes providing services to the same child nodes. Various embodiments of the present invention provide new and/or improved methods and apparatus for managing wireless IAB backhaul connections in multi-IAB donor parent node wireless networks to optimize the network efficiency (e.g., quality of service for user equipment devices, coverage area, and/or spectral efficiency). Various embodiments of the present invention provide new and/or improved methods and apparatus of how to utilize multi-Radio Access Technology including licensed and unlicensed spectrum for providing IAB services. Various embodiments of the present invention provide new and/or improved methods and apparatus for improving the efficiency, robustness and adaptability to traffic loads of IAB networks through the support of multi-Radio Access Technologies (e.g., CBRS spectrum, cellular spectrum, licensed and unlicensed spectrum, millimeter wave spectrum, Wi-Fi spectrum, plurality of different wireless protocols and interfaces) and the management of multiple IAB backhaul connections to multiple IAB donor nodes which provide wired backhaul connections to a core network. Various embodiments of the present invention provide new and/or improved methods and apparatus for dynamically monitoring and managing wireless backhaul communications links among wireless base stations to provide load balancing and/or optimization of network resources such as for example spectrum usage. Various embodiments of the present invention include novel methods and apparatus to solve one or more of the problems identified above.

By using one or more of the techniques described herein a wireless backhaul connection management node or server typically which is part of or attached to an Operations Support System can manage a wireless communications system's Integrated Access and Backhaul network connections to provide for multi-parental wireless backhaul connections from a child IAB node to multiple different IAB donors. The ability to have multi-parental wireless backhaul connection paths for child IAB node wireless base stations provides many advantages as discussed above including an increase in backhaul data transmission efficiency, efficiency of spectrum usage, and an increase in the number of the user equipment devices services along with an increase in the quality of wireless services provided and an expanded coverage area.

An exemplary wireless communications method embodiment in accordance with the present invention includes the steps of: receiving, at a backhaul management node, user equipment connection information for a first base station, the first base station having a first wireless backhaul connection path to a second base station; determining, by the backhaul management node, whether or not a second wireless backhaul connection path is to be established for the first base station based on the received user equipment connection request information; and in response to determining to establish the second wireless backhaul connection path for the first base station: sending, by the backhaul management node, a message to establish the second wireless backhaul connection from the first base station to a third base station, said second and third base stations being connected to a core network via a wired and/or fiber backhaul connection.

Another exemplary method in accordance with an embodiment of the present invention includes the steps of: receiving, at an Integrated Access and Backhaul (IAB) management node, user equipment device connection request information (e.g., PRACH request count) for a first wireless base station, said first wireless base station being an IAB child node having a first wireless backhaul connection path to a second wireless base station, said second wireless base station being a first IAB parent node; determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station. In some embodiments, the second wireless backhaul connection path is a connection path to a third wireless base station, said third wireless base station being a second IAB parent node.

In some embodiments, the first IAB parent node is a first IAB donor with a fiber-optic or wired backhaul connection to the core network; and the second IAB parent node is a second IAB donor with a fiber-optic or wired backhaul connection to the core network. In various embodiments, the received user equipment device connection request information is a first count of the number of Physical Random Access Channel (PRACH) requests received by the first wireless base station during a first period of time. In some embodiment the step of determining, by the IAB management node, whether or not a second wireless backhaul connection path is to be established for the first wireless base station based on the received user equipment device connection request information for the first wireless base station includes: monitoring, by the IAB management node, the received user equipment device connection request information for the first wireless base station to determine if the number of connection requests received by the first wireless base station during a first period of time exceeds a first threshold value; and in response to determining the number of connection requests received from user equipment devices by the first wireless base station during the first period of time exceeds the first threshold value, determining that the second wireless backhaul connection is to be established.

In some embodiments, the method further includes the step of: selecting, by the IAB management node, the third wireless base station from a plurality of neighbor wireless base stations based on measured backhaul connection path performance or predicted backhaul connection path performance.

In some embodiments of the method, the method further includes the step of: selecting, by the IAB management node, the third wireless base station from a plurality of neighbor wireless base stations based on measured backhaul connection path performance metrics. In some such embodiments, the step of selecting, by the IAB management node, the third wireless base station from a plurality of neighbor wireless base stations based on measured backhaul connection path performance metrics includes: sending messages to said one or more neighbor wireless base stations requesting the one or more neighbor wireless base stations which receive the message execute backhaul connection path performance tests on a backhaul connection path between the neighbor wireless base station which received the message and the core network or OSS; receiving measured backhaul connection path performance results from the one or more neighbor wireless base stations, said one or more wireless base stations including the third wireless base station; generating and/or determining said measured backhaul connection path performance metrics from said measured backhaul connection path results; and comparing the measured backhaul connection path performance metrics for each backhaul connection path to each other and/or to a set of performance criteria for the second wireless backhaul connection path to determine which neighbor wireless base station can provide a wireless backhaul connection path which best meets or exceeds a set of performance criteria for the second wireless backhaul connection path (e.g., which backhaul connection path has sufficient backhaul bandwidth/capacity and/or downlink and uplink throughput or latency levels sufficient to meet the requirements of the first wireless base station). In some embodiments, the method further includes the steps of: maintaining, by the IAB management node, historical performance characteristics and/or metrics of wireless backhaul connection paths provided by parent wireless base stations (e.g., neighbor IAB donors which previously provided wireless backhaul connections to the first wireless base station); and utilizing said historical performance characteristics and/or metrics to predict wireless backhaul connection path performance which can be provided by neighbor parent wireless base station (e.g., neighbor IAB donors).

In some embodiments, the message to establish the second wireless backhaul connection path for the first wireless base station includes instructions and/or information for the third wireless base station to establish the second wireless backhaul connection path between the third wireless base station and the first wireless base station, said second wireless backhaul connection path being an IAB backhaul connection path. In various embodiments, the method further includes the steps of: continuously monitoring the performance of IAB backhaul connection paths in a wireless network; continuously monitoring status of IAB parent nodes and IAB child nodes; dynamically and in real time or near real time modifying the IAB backhaul connection paths in the wireless network to increase network backhaul performance and/or efficiency based on and/or in response to the performance of IAB backhaul connection paths monitored performance and/or in response to the status of the IAB parent nodes and IAB child nodes monitored status. In some such embodiments, the step of dynamically modifying the IAB backhaul connection paths in the wireless network includes sending instructions from the IAB management node to IAB parent nodes to perform one or more of the following operations: (i) implement a new IAB backhaul connection path, (ii) terminate an existing IAB backhaul connection path, (iii) transfer a data stream from one IAB backhaul connection path to a different IAB backhaul connection path, (iv) dedicate additional bandwidth capacity to an existing IAB backhaul connection path, and (v) reduce bandwidth capacity for an existing IAB backhaul connection path.

The present invention is also applicable to and includes apparatus and systems such as for example, apparatus and systems that implement one or more of the steps of the method embodiments. An exemplary communications system in accordance with the present invention includes an Integrated Access and Backhaul (IAB) management node, said IAB management node including memory and a first processor, said first processor configured to control the IAB management node to perform the following operations: receiving, at the IAB management node, user equipment device connection request information (e.g., PRACH request count) for a first wireless base station, said first wireless base station being an IAB child node having a first wireless backhaul connection path to a second wireless base station, said second wireless base station being a first IAB parent node; determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 12 illustrates an exemplary table for a first wireless base station including information about neighbor wireless base stations along with performance metrics for wireless backhaul connection paths between the wireless base station and the neighbor wireless base stations.

FIG. 16 illustrates the combination of FIGS. 16A, 16B, 16C, 16D, 16E, and 16F.

FIG. 16A illustrates the steps of the first part of an exemplary method in accordance with one embodiment of the present invention.

FIG. 16B illustrates the steps of the second part of an exemplary method in accordance with one embodiment of the present invention.

FIG. 16C illustrates the steps of the third part of an exemplary method in accordance with one embodiment of the present invention.

FIG. 16D illustrates the steps of the fourth part of an exemplary method in accordance with one embodiment of the present invention.

FIG. 16E illustrates the steps of the fifth part of an exemplary method in accordance with one embodiment of the present invention.

FIG. 16F illustrates the steps of the sixth part of an exemplary method in accordance with one embodiment of the present invention.

DETAILED DESCRIPTION

The current invention is applicable to wireless networks, e.g., New Radio 5G wireless networks and Citizens Broadband Radio Service (CBRS) networks), that provide wireless communications services, e.g., broadband services to user equipment devices. In various embodiments of the present invention, the wireless communications network implements a multi-Radio Access Technology Integrated Access and Backhaul (IAB) system architecture. Both IAB-nodes and IAB-donors may, and in some embodiments do, employ multiple Radio Access Technologies on one or more frequency bands (in licensed and/or unlicensed spectrum), for both access and backhaul communications links. Wireless backhaul communications links are also referred to herein as wireless backhaul connection paths. In some embodiments, the IAB-nodes and IAB-donors use multiple Radio Access Technologies simultaneously for different data streams from the same user equipment device as different paths or routes are used to transmit the data of the different streams. Various embodiments of the invention provide new and/or improved methods and apparatus for integrated wireless backhaul utilizing multiple wireless backhaul connection paths between a child wireless base station and multiple parent wireless base stations, the parent wireless base stations having a optic or wired backhaul connection to the wireless network's core network. With multiple channels/bands being utilized for wireless backhaul connection paths between a child wireless base station location and multiple parent wireless base stations, the child base station can server more user equipment devices with a better quality of service and better performance. Various embodiments of the present invention are able to achieve better wireless network efficiency and performance through the management of the wireless backhaul connection paths by an Integrated Access and Backhaul (IAB) manager function which is implemented on a node or server connected or coupled to the wireless network's Operations Support System or included in the Operations Support System. In some embodiments, the OSS and/or the IAB manager function is incorporated into functionality in the core network of the wireless network. Various embodiments of the present invention are applicable to both general wireless networks such as cellular networks as well as networks with shared managed spectrum such as CBRS wireless networks.

Figure 10:
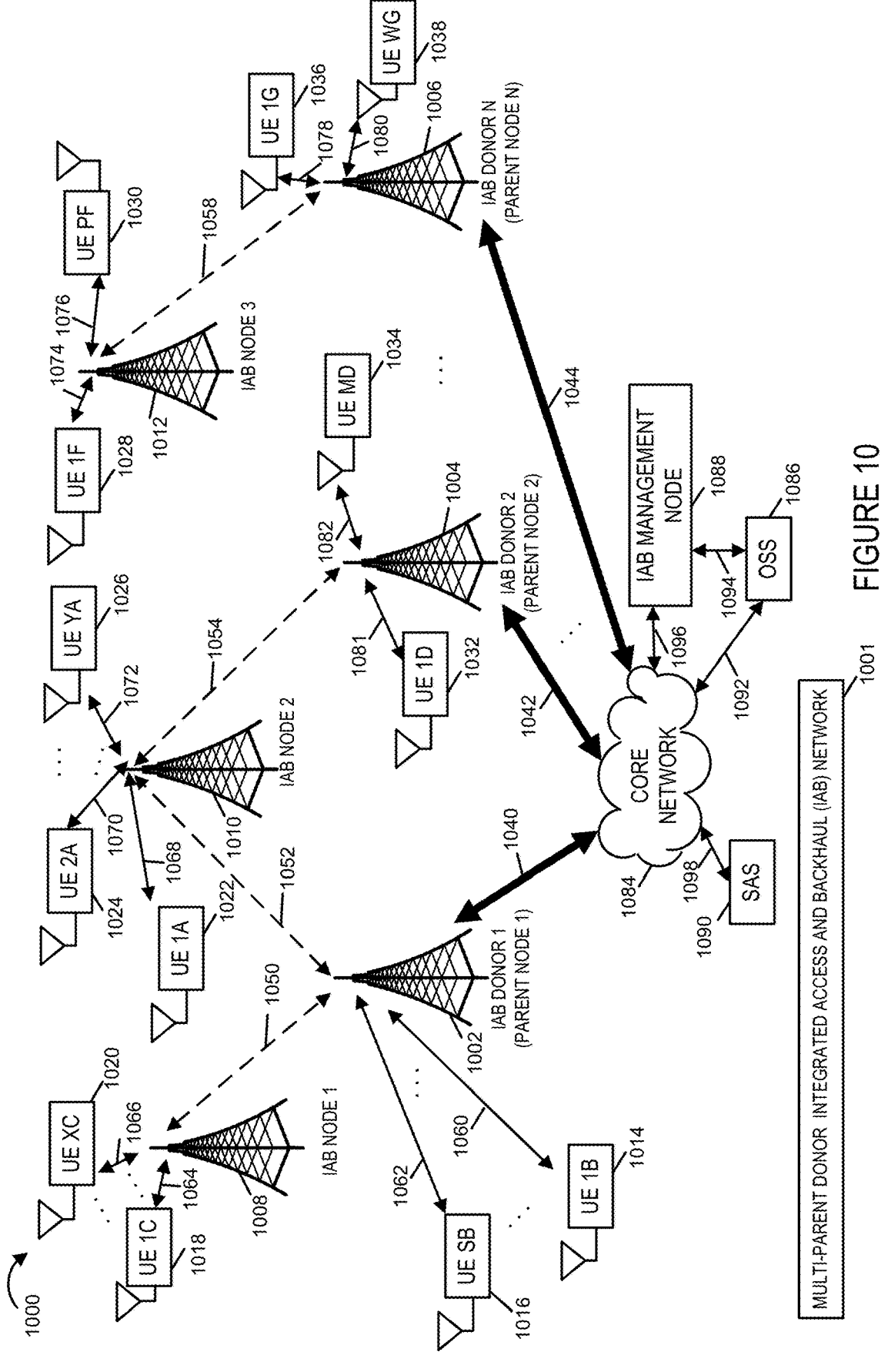
FIG. 10 illustrates an exemplary system in accordance with an embodiment of the present invention.

FIG. 10 illustrates an exemplary communications system 1000 illustrated as a wireless network communications system having an architecture implemented in accordance with an embodiment of the present invention. The communications system 1000 is a multi-RAT Integrated Access and Backhaul system. As the legend 1001 indicates communications system 1100 illustrates a multi-parent donor Integrated Access and Backhaul network. It is to be understand that the wireless base stations may operate utilizing one or more radio access technologies to provide wireless access to user equipment device as well as wireless backhaul links. The particular radio access technologies may be, and in some embodiments are, based on the existing technology deployed by the wireless operator and/or employed by a wireless base station. In some embodiments, the radio access technology is based on one or more environmental factors in which the system is deployed, e.g., geography, topology, type of traffic to be communicated, distances between base stations, coverage areas, density of user equipment devices, number of user equipment devices deployed, available spectrum (e.g., licensed spectrum such as Citizens Broadband Radio Service (CBRS) Priority Access License (PAL) spectrum and/or unlicensed spectrum such as CBRS General Authorized Access (GAA) spectrum, Wi-Fi spectrum, cellular spectrum, millimeter spectrum), etc. The ellipse symbol ( . . . ) indicates additional elements of the same type.

The communications system 1000 includes a plurality of wireless base stations including Integrated Access and Backhaul capabilities (e.g., 3rd Generation Partnership Project 5G New Radio Backhaul Adaptation Protocol capabilities) and support for a plurality of different radio access technologies (i.e., wireless base station 1002 (i.e., Integrated Access and Backhaul (IAB) parent donor 1), wireless base station 1004 (i.e., IAB parent donor 2), . . . , wireless base station N 1006 (i.e., IAB donor N, N being an integer greater than 2), wireless base station 1008 (i.e., IAB node 1), wireless base station 1010 (i.e., IAB node 2), wireless base station 1012 (i.e., IAB node 3), a plurality of wireless endpoint devices (i.e., User Equipment device 1B (UE 1B) 1014, . . . , UE SB 1016 (S being an integer greater than 1), UE 1C 1018, . . . , UE XC 1020 (X being an integer greater than 1), UE 1A 1022, UE 2A 1024, . . . , UE YA 1026 (Y being an integer greater than 1), UE 1F 1028, . . . , UE PF 1030 (P being an integer greater than 1), UE 1D 1032, . . . , UE MD 1034 (M being an integer greater than 1), UE 1G 1036, . . . , UE WG 1038 (W being an integer greater than 1), a core network 1084, an Operations Support System 1086, an Integrated Access and Backhaul (IAB) management node 1088, an optional Spectrum Access System 1090, a plurality of wired and/or fiber optic backhaul communications links 1040, 1042, . . . 1044, a plurality of wireless access links 1060, . . . , 1062, 1064, . . . , 1066, 1068, 1070, . . . 1072, 1074, 1076, 1078, 1080, 1081, 1082, a plurality of wireless backhaul communications links 1050, 1052, 1054, . . . , 1058 (e.g., IAB wireless backhaul links sometimes referred to as connections or routes), and wired links 1092, 1094, 1096, 1098.

The wireless base stations 1002, 1004, . . . , 1006 are each an IAB donor and IAB parent. The IAB donors 1002, 1004, . . . , 1006 are coupled and/or connected to the core network 1084 via backhaul communications links 1040, 1042, . . . , 1044 respectively. The backhaul communications links 1040, 1042, . . . , 1044 are wired and/or fiber-optic communications links. In some embodiments, one or more of the backhaul communications links 1040, 1042, . . . , 1044 includes a plurality of backhaul communications links including fiber-optic links and wired (e.g., co-axial) links which connect the IAB donor to the core network via different paths or routes (e.g., a first direct fiber-optic backhaul connection to the core network and a second non-direct backhaul connection via a cable network system). The wireless base station IAB donor 1 1002 is connected to wireless base station IAB node 1 1008 via wireless backhaul communications link 1050. The wireless base station IAB donor 1 1002 is connected to wireless base station IAB node 2 1010 via wireless backhaul communications link 1052. The wireless base station IAB donor 2 1004 is connected to wireless base station IAB node 2 1010 via wireless backhaul communications link 1054. The wireless base station IAB donor N 1004 is connected to wireless base station IAB node 3 1012 via wireless backhaul communications link 1058.

The wireless base station IAB donor 1 1002 is a parent node to: (i) wireless base station IAB node 1 1008, and (ii) wireless base station IAB node 2 1010. The wireless base station IAB donor 1 1002 provides wireless backhaul services to IAB node 1 1008 and IAB node 2 1010 via the wireless backhaul communications links 1050 and 1052 respectively. Wireless base station IAB node 1 1008 and wireless base station IAB node 2 1010 are child IAB nodes to wireless base station IAB donor 1 1002.

The wireless base station IAB donor 2 1004 is a parent node to wireless base station IAB node 2 1010. The wireless base station IAB donor 2 1004 provides wireless backhaul services to IAB node 2 1010 via the wireless backhaul communications link 1054. Wireless base station IAB node 2 1010 is a child IAB node to wireless base station IAB donor 2 1004.

As discussed above, the wireless base station IAB node 2 1010 has multiple parents which provide it backhaul services. It is a child node to wireless base station IAB donor 1 1002 and to wireless base station IAB node 2 1004.

The wireless base station IAB donor N 1006 is a parent node to wireless base station IAB node 3 1012. The wireless base station IAB donor N 1006 provides wireless backhaul services to IAB node 3 1012 via the wireless backhaul communications link 1058. Wireless base station IAB node 3 1012 is a child IAB node to wireless base station IAB donor N 1006.

The IAB node 1 1008, IAB node 2 1010, and IAB node 3 1012 only have wireless backhaul connections to their parent nodes. They do not have a wired and/or fiber-optic backhaul connection to the core network 1084. The wireless backhaul communications links 1050, 1054, . . . , 1058 are IAB backhaul links. As will be discussed in detail below, the IAB management node 1088 manages the wireless backhaul connections/links between wireless base station parent nodes and wireless base station child nodes which provides many benefits to the system including, among other things, enhancing the efficiency, effectiveness, quality of service, and coverage area of the wireless network of the communications system 1000.

Wireless access links 1060, . . . , 1062 connect UE 1B 1014, . . . , UE SB 1016 to wireless base station IAB donor 1 1002 respectively. Wireless access links 1064, . . . , 1066 connect UE 1C 1018, . . . , UE XC 1020 to wireless base station IAB node 1 1008 respectively. Wireless access links 1068, 1070, . . . , 1072 connect UE 1A 1022, UE 2A 1024, . . . , UE YA 1026 to wireless base station IAB node 2 1010 respectively. Wireless access links 1074, . . . , 1076 connect UE 1F 1028, . . . , UE PF 1030 to wireless base station IAB node 3 1012 respectively. Wireless access links 1078, . . . , 1080 connect UE 1G 1036, UE WG 1038 to wireless base station IAB donor N 1006 respectively. Wireless access links 1081, . . . , 1082 connect UE 1D 1018, . . . , UE MD 1034 to wireless base station IAB node 2 1004 respectively. In some embodiments, one or more of the IAB nodes and/or one or more of the IAB donors of the system are multi-RAT Integrated Access and Backhaul devices with Station receiver functionality in addition to Mobile Termination functionality.

The plurality of wireless devices (i.e., User Equipment device 1B (UE 1B) 1014, . . . , UE SB 1016 (S being an integer greater than 1), UE 1C 1018, . . . , UE XC 1020 (X being an integer greater than 1), UE 1A 1022, UE 2A 1024, . . . , UE YA 1026 (Y being an integer greater than 1), UE 1F 1028, . . . , UE PF 1030 (P being an integer greater than 1), UE 1D 1032, . . . , UE MD 1034 (M being an integer greater than 1), UE 1G 1036, . . . , UE WG 1038 (W being an integer greater than 1), are devices with wireless interfaces such as for example, smartphones, computers, mobile devices, smart devices, laptops, mobile phones, tablet, Wi-Fi access points, customer premises equipment devices providing wireless services to wireless devices on a customer premises (e.g., within a building such as a home). In many instances, the wireless devices are endpoint point devices. The wireless devices (i.e., UE devices) may be, and in some embodiments do, have multiple wireless interfaces to support multiple wireless frequency bands and protocols. In some embodiments, the user equipment devices are dual subscriber dual subscription devices which have dual SIM cards and wireless interfaces allowing operation on multiple frequency bands and wireless networks operated by different wireless operators.

The core network 1084 may be, and in some embodiments is a 5G core network, including a plurality of nodes, servers and/or network equipment devices for implementing core network functions (e.g., an User Plane Function (UPF), a Network Slice Selection Function (NSSF), an Authentication Server Function (AUSF), an Unified Data Management Function (UDM), an Access and Mobility Management Function (AMF), a Session Management Function (SMF), a Policy Control Function (PCF), and a Application Function (AF).

The core network 1084 is coupled and/or connected to the IAB Management Node 1088 via communications link 1096.

The OSS 1086 is coupled and/or connected to the core network 1084 via communications link 1092. The OSS 1086 is coupled to the IAB management node 1088 via communications link 1094. The IAB management node 1088 is coupled and/or connected to the core network 1084 via communications link 1096. In some embodiments, the communications link 1096 does not exist and the IAB management node 1088 is coupled to the core network 1084 via the OSS 1086 and the communications links 1094 and 1092.

The IAB management node 1088 manages the wireless networks usages of the wireless backhaul communications links of the system and the wireless base stations which are IAB nodes and IAB donors. In some embodiments, the IAB management node 1088 is a server or network equipment device. In some embodiments, the IAB management node 1088 is part of the OSS 1086 or the core network 1084. In some embodiments, the OSS 1086 is part of the core network 1084. In some embodiments, the IAB management node 1088 is implemented in a cloud. A node may be a server or network equipment. In some embodiments, the IAB management node is implemented as a distributed function across multiple servers and/or devices.

In some embodiments, the IAB management node 1088 is implemented as a network service function in the OSS 1086, core network 1084 or a cloud. In some embodiments, the IAB management node 1088 is implemented as a distributed function in the OSS 1086 and/or core network 1084 and/or cloud with different operations and functions ascribed to the IAB management node 1088 described herein being implemented on different nodes/servers/devices in the core network 1084, and/or the OSS 1086, and/or a cloud. In some embodiments, functions and/or operations performed by the IAB management node 1088 as described herein are implemented on one or more nodes, servers or devices in the OSS 1086 to provide an IAB management function. In some embodiments, the functions and/or operations performed by the IAB management node 1088 as described herein are implemented on one or more nodes, servers, or devices in a cloud. In some embodiments, the functions and/or operations performed by the IAB management node 1088 as described herein are implemented as a function on a node, server or device in the core network 1084.

The Operations Support System 1086 configures and continuously monitors the network of the system 1000 collects information on the system and generates metrics from the collected information. The OSS 1086 has configuration and operational information on the network equipment and communications links of the system 1000 (such as wireless base stations configuration and capabilities (e.g., locations, wireless frequency bands supported, channels supported, spectrum allocated to base station, whether the base station is a single cell or multiple sector cell, what wireless protocols and frequency supported by the wireless base station, whether or not the wireless base station has a wired or fiber-optic backhaul communications link or connection to the core network, as well as key performance metrics-number of user equipment connections received at a wireless base station over a period of time (e.g., Physical Random Access Channel (PRACH) request messages received), number of UE connections at the wireless base station (% of cell loading-UE connections as a percentage of total UE connections supported), bandwidth utilized, bandwidth available, frequency bands supported, frequency band available for wireless backhaul links, channels being used, channels available for wireless backhaul links, uplink and downlink throughput and data rates, type of traffic a base station is handling uplink dominated traffic type, downlink dominated traffic type or balanced uplink and downlink traffic type, IAB nodes within the coverage area of other IAB nodes and IAB donors (e.g., neighbor lists for each wireless base station), distances between neighbor wireless base stations, communications link latency (e.g., average latency), session information, application information such as type of traffic corresponding to the application (e.g., sensor application will have uplink dominated data traffic, video downloading application, such as the Youtube application, will have downlink dominated data traffic). Some of the metrics are obtained via having various elements of the system 1000 execute performance tests and other metrics collected as part of the systems operations in which the wireless base stations and/or user equipment devices and/or the core network elements reporting and/or providing the information from which the OSS can determine and/or generate the metrics and key performance indicators. The OSS provides information on the system 1000, it collects and/or generates to the IAB management node 1088 (e.g., upon request or as a service function. In some embodiments, the IAB management node 1088 registers for notifications to be provided from the OSS 1086 upon the occurrence of an event (e.g., number of PRACH requests received by an IAB node within a period of time being greater than one or more threshold values, number of PRACH requests received by a IAB node falling below one or more threshold values). In various embodiments, the IAB management node 1088 is responsible for the continuous monitoring and collection of information/data discussed above with respect to the wireless backhaul communications links and wireless base stations and obtains the information from the OSS 1086 and/or the wireless base stations. In some embodiments, the IAB management node 1088 requests tests (e.g., performance tests) to be performed by wireless base stations for use in generating information and metrics from which determinations can be made on adding and/or terminating wireless backhaul connections/links and/or for making wireless base station wireless backhaul routing decisions with respect to which wireless backhaul communications link or connection to utilize for different types of applications, data streams, traffic types when multiple wireless backhaul connection paths are available to a wireless base station (e.g., when an IAB node has multiple IAB donor parents).

The IAB management node 1088 in some embodiments, sends messages to the OSS 1086 to implement or establish a new IAB wireless backhaul connection between an IAB node (e.g., IAB node 2 1010) and an addition IAB donor (e.g., IAB donor N 1006). The OSS 1086 upon receiving such a message may, and in some embodiments does, either forward the message to the IAB donor and the IAB node. In some embodiments, it generate additional messages with session information to establish the wireless backhaul connection or link between IAB donor and the IAB node including for example address information.

The wireless base stations may be, and in some embodiments are, implemented as gNodeBs, eNodeBs, and/or CBSDs. When one or more of the wireless base stations of system 1000 are CBSDs, the optional Spectrum Access System 1090 manages spectrum allocation in among the CBSDs (e.g., so that CBSDs do not interfere with incumbent users' (such as for example the Navy's) usage of the spectrum or priority access licensee usage). The IAB management node 1088 further manages the usage of the spectrum (e.g., by determining how the spectrum allocated to a CBSD is to be utilized for wireless access connections to support UEs or for wireless backhaul connections/link). In some embodiments, the IAB management node 1088 will also interact with a CBRS Proxy which is not shown but interfaces with the SAS 1090 on behalf of multiple CBSDs in connection with requests and responses (e.g., spectrum inquiry, allocation and usage requests). The IAB management node may request spectrum inquiries to determine best available spectrum with least interference for a CBSD as part of determining what additional backhaul connections/ links to establish, and what spectrum to request to be allocated to a CBSD when a new wireless backhaul link/ connection is to be established or additional bandwidth is to be added to an existing wireless backhaul link/connection.

In some embodiments, the IAB management node 1088 continuously monitors the performance of IAB backhaul connection paths/links in the system 1000, continuously monitors the status of the IAB donors and IAB nodes of system 1000, and dynamically and in real time or near real time modifies the IAB backhaul connection paths/links in the system 1000 to increase network backhaul performance and/or efficiency. For example, so that the system 1000 can provide access to a larger number of user equipment devices with a higher quality of service and/or so that spectral interference from wireless access links and backhaul communication links are minimized.

While for the sake of simplicity in explaining the invention system 1500 only illustrates four wireless base stations and a few wireless endpoint devices, it will be appreciated that system 1500 typically includes a large plurality of wireless base stations through which a large number of wireless devices, e.g., user equipment devices and stations, access the wireless network and through which the wireless devices are provided services.

Figure 4:
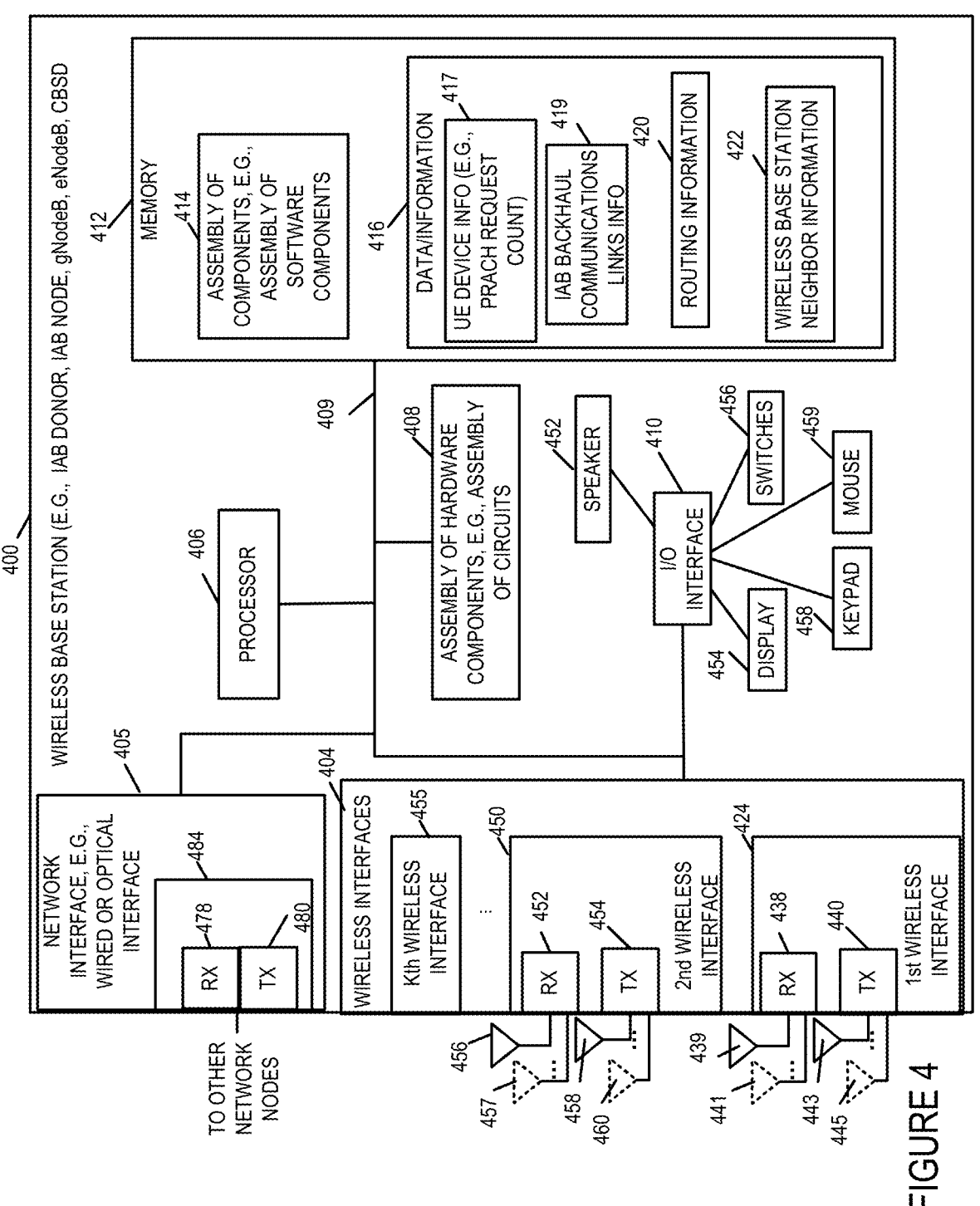
FIG. 4 illustrates details of an exemplary wireless communications node, e.g., wireless base station, Integrated Access and Backhaul (IAB) donor, IAB node, gNodeB, eNodeB, Citizens Broadband Radio Service Device (CBSD) in accordance with an embodiment of the present invention.

FIG. 4 is a drawing of an exemplary wireless base station 400, which may be implemented as an IAB donor, an IAB node, a gNodeB, an eNodeB, a CBSD in accordance with an exemplary embodiment. Exemplary wireless base station 400, includes a wireless interface 404, a network interface 405, e.g., a wired or optical interface which may be, and in some embodiments is, utilized to connect the wireless base station 400 to a core network, e.g., when the wireless base station is implemented as an IAB donor, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. While a single network interface 405 is included in the exemplary embodiment, in some embodiments multiple network interfaces are included in the wireless base station 400 (e.g., for coupling the wireless base station to the core network via different backhaul connection network technologies (e.g., fiber optic cable network, cable system via a cable modem) and/or to other wireless base stations. Wireless interfaces 404 include a plurality of wireless interfaces including first wireless interface 424, second wireless interface 450, . . . , Kth wireless interface 455 (K being an integer greater than 2). In some embodiments, each wireless interface implements a different Radio Access Technology with at least one wireless interface implementing 5G New Radio radio access technology. Other exemplary radio access technologies that may be implemented include cellular and CBRS radio access technology. The wireless interfaces are used to communicate with the UE devices, mobile terminals, and other wireless base stations, IAB donor or IAB nodes. The first wireless interface 424 is for example a 5G New Radio RAT wireless interface used for Integrated Access and Backhaul and is used to communicate with User Equipment devices and other wireless base stations, IAB donor or IAB nodes. In some embodiments, the second and some of the additional wireless interfaces are non-3GPP Radio Access Technology interface, e.g., 802.11 ad radio access technology, 802.11 ay radio access technology, 802.11 ac radio access technology, or 802.11 ax radio access technology, a Wi-Fi or WiGig radio access technology. In some embodiments, there a plurality of wireless interfaces for each type of Radio Access Technology. In various embodiments, the different wireless interfaces allow the wireless base station 400 to communicate with other devices using different frequency bands such as millimeter wave frequency band, cellular frequency band, CBRS frequency band, etc. In some embodiments, the wireless base station, IAB donor or IAB node only has the capability to support one type of radio access technology which is the 5G New Radio radio access technology. Devices which have multi-RAT interfaces are multi-RAT devices. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441, M being an integer greater than 1), via which wireless base station 400 can receive wireless signals from other wireless communications devices including a second wireless communications device, e.g., a user equipment device or another wireless base station, IAB donor, or IAB node. Wireless transmitter 440 is coupled to a plurality of wireless transmit antennas (transmit antenna 1 443, . . . , transmit antenna N 445, N being an integer greater than 1) via which the wireless base station 400 can transmit signals to other wireless communications devices including a second wireless communications device, e.g., user equipment device or another wireless base station, IAB donor, or IAB node.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., another wireless base station, IAB donor, IAB node, mobile terminal, user equipment device, STA wireless device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to other networks and/or devices, e.g., core network, Operations Support System, Spectrum Access System, internet, or other wireless base stations. When the wireless base station is an IAB donor it is coupled to another network, e.g., core network, via a wire or fiber optic transport cable. In some embodiments, wireless base station does not include the network interface 405. IAB nodes, e.g., or wireless base stations which are IAB nodes typically do not include network interface 405 and are not connected to a core network via a wire or fiber optic cable. In various embodiments, each of the wireless interfaces includes one or more processors or processing circuitry, e.g., BAP layer processing entity or unit, RLC layer processing unit, MAC layer processing unit, physical layer processing unit, for performing processing required in connection with receiving and transmitting messages for example using a particular radio access technology.

Memory 412 includes an assembly of components 414, e.g., an assembly of software components, and data/information 416. Data/information 416 includes UE device information 419, routing information 420, and wireless base station neighbor information 422. The UE device information 419 may, and in some embodiments does, include UE connection information (UE PRACH request count per time period, UE loading (e.g., number of UEs connected to the base station, backhaul demand on the base station), UE backhaul requirements SLA. IAB Backhaul communications links information 419 in some embodiments includes information about the wireless base station's active and/or past IAB wireless backhaul communications links (e.g., establishment information, session information, spectrum allocated (frequency band/channel(s)), routing information/ criteria, wireless base station ID of far end wireless base station, performance metrics). The routing information 420 in some embodiments includes routing table provided by the IAB management node for use in determining how to route data streams (e.g., which wireless backhaul connection path of a plurality of wireless backhaul connection paths available to utilize for a data stream). The wireless base station neighbor information 422 includes information on the wireless base station with which the wireless base station can wirelessly communicate. For example, the wireless base station information 422 may and in some embodiments includes identifying information for the neighbor wireless base station (e.g., base station ID), strength and quality of signal being received from the neighbor wireless base station. This information may be reported to the IAB management node for determining wireless backhaul connection paths between IAB donor and IAB nodes.

While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to a plurality of other wireless base stations and thousands of user equipment devices. The wireless base station/IAB donor/IAB node information includes device profile record(s), information on the RATs supported by the device (e.g., RAT availability, capability, and performance statistics). In some embodiments, one or more of the wireless base stations/IAB donors/IAB nodes discussed and/or shown in the FIGS. 10, 11, 15, 16, and 17 and/or in connection with the methods discussed herein including wireless base stations/IAB donors/IAB nodes 1002, 1004, 1006, 1008, 1010, 1012, 1512, 1514, 1520, 1522, 1702, 1704, and 1706 are implemented in accordance with the wireless base station/IAB donor/IAB node 400. The routing information 420 includes the path identity and information about the paths and routes, e.g., wireless backhaul RAT routes between the base station which is an IAB node child base station and its IAB donor(s), multi-RAT availability, multi-RAT capability, and performance metrics on backhaul communications links. In some embodiments the various antennas of the wireless base station 400 form an antenna array with the antennas pointing in different directions.

Figure 5:
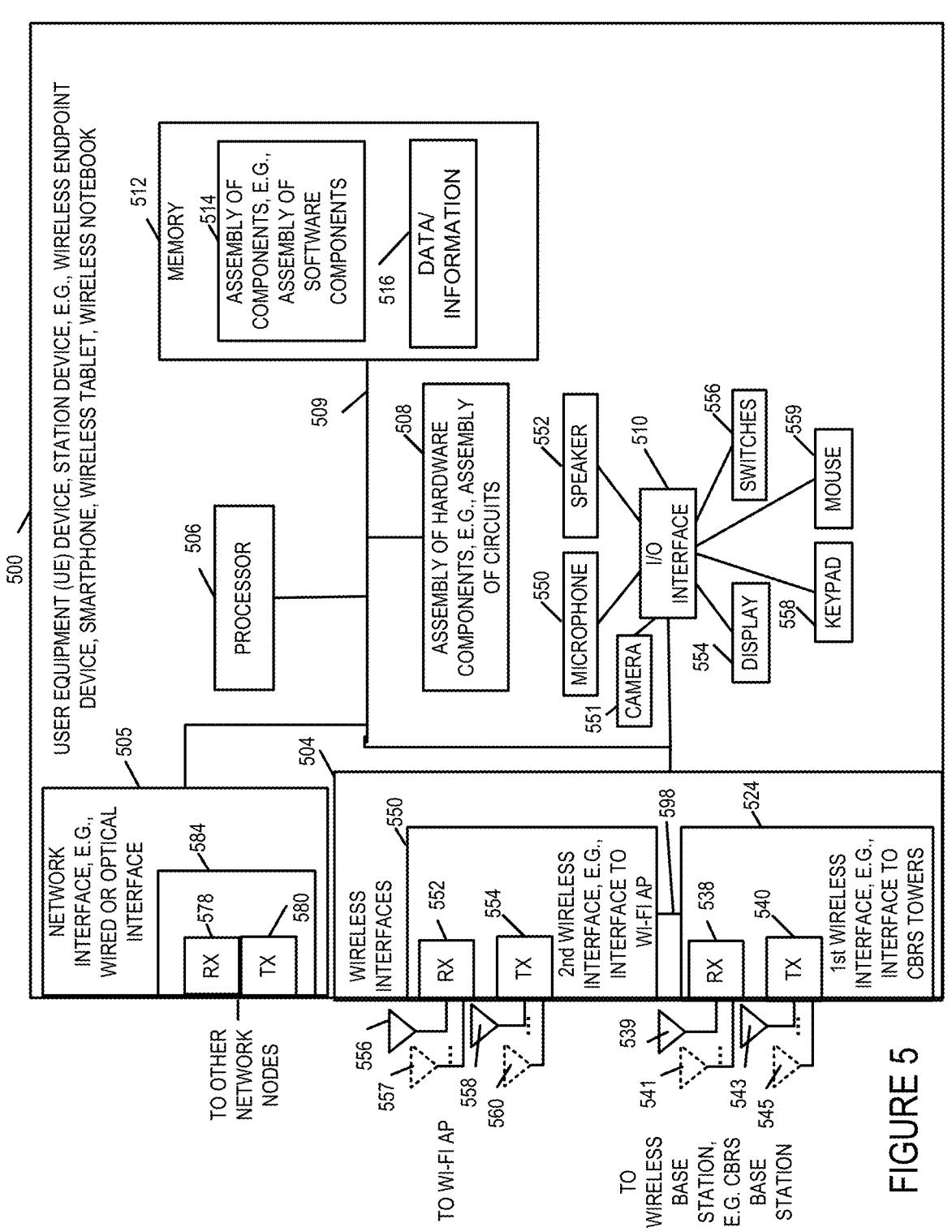
FIG. 5 illustrates details of an exemplary User Equipment (UE) device/station terminal, in accordance with an embodiment of the present invention.

FIG. 5 is a drawing of an exemplary user equipment (UE) device 500 in accordance with an exemplary embodiment. UE device 500 is, e.g., a computer, a mobile device such as a smart phone, wireless tablet or wireless notebook, a smartTV, internet cable box, internet enabled device. UE device 500 includes Radio Access Technology device capabilities for at least one Radio Access Technology, e.g., 5G New Radio radio access technology, CBRS radio access technology, cellular radio access technology, or a non-3GPP RAT such as for example WiGig or 802.11 ad radio access technology, 802.11 ay radio access technology, 802.11 ac radio access technology, or 802.11 ax radio access technology so that the UE can wirelessly communicate with a wireless base station, IAB node or IAB donor. UE device 500 is also optionally enabled to communicate using more than one wireless protocol or RAT. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., 5G New Radio RAT wireless base station or IAB donor or IAB node. The second wireless interface is used to communicate with a Wi-Fi Access Point or another wireless base station that supports a different wireless RAT when the first and second wireless interfaces support different RAT. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . receive antenna M 541), via which user equipment device 500 can receive wireless signals from other wireless communications devices including a wireless base station, e.g., wireless base station 1010 when the UE is UE 1022. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., a wireless base station. In some embodiments the various antennas form an antenna array with the antennas pointing in different directions. In some embodiments, one or more of the antennas are included inside the housing of the user equipment device and the user equipment device may include one or more connections to which exterior antennas may be connected for example when the wireless device is a fixed wireless device.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol or a wireless base station using a different RAT protocol than the first wireless interface. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a non-3GPP RAT wireless interface and may be, and in some embodiments is, a Wi-Fi wireless interface or a WiGig wireless interface. The communications link 598 couples the 1st wireless interface to the 2nd wireless network so the two interfaces can communicate, e.g., when a data stream is being received over two different interfaces simultaneously and the two wireless interfaces re-assembly the data stream based on data packet sequence numbers included in the received messages.

Memory 512 includes an assembly of components 514, e.g., an assembly of software components, and data/information 516.

In some embodiments, one or more of the user equipment devices shown in the FIGS. 10, 11, 15, 16 and 17 or discussed herein for example in connection with the methods described including for example UE devices UE 1B 1014, . . . , UE SB 1016, UE 1C 1018, . . . , UE XC 1020, UE 1A 1022, UE 2A 1024, . . . , UE YA 1026, UE 1F 1028, UE PF 1030, UE 1D 1032, UE MD 1034, UE 1G 1036, UE WG 1038, UEs 1510, UEs 1710, UEs 1712, UEs 1714, UEs 1716 are implemented in accordance with exemplary user equipment device 500. While the UE device 500 has been illustrated as a dual mode device that has two wireless interfaces 550 and 524, the UE device 500 may, and in some embodiments, is not a dual mode device but instead is a single mode operation device with a single wireless interface either wireless interface 1 524 which is enable to communicate with a wireless base station using a first wireless RAT protocol, e.g., CBRS wireless protocol, IAB protocol, a 5G New Radio RAT, 802.11 ad RAT, 802.11 ay RAT, 802.11 ac RAT, 802.11 ax RAT wireless protocol, or wireless interface 2 550, which is a Wi-Fi interface which is enabled to communicate with a Wi-Fi Access Point or router or one of the previously mentioned protocols.

Figure 6:
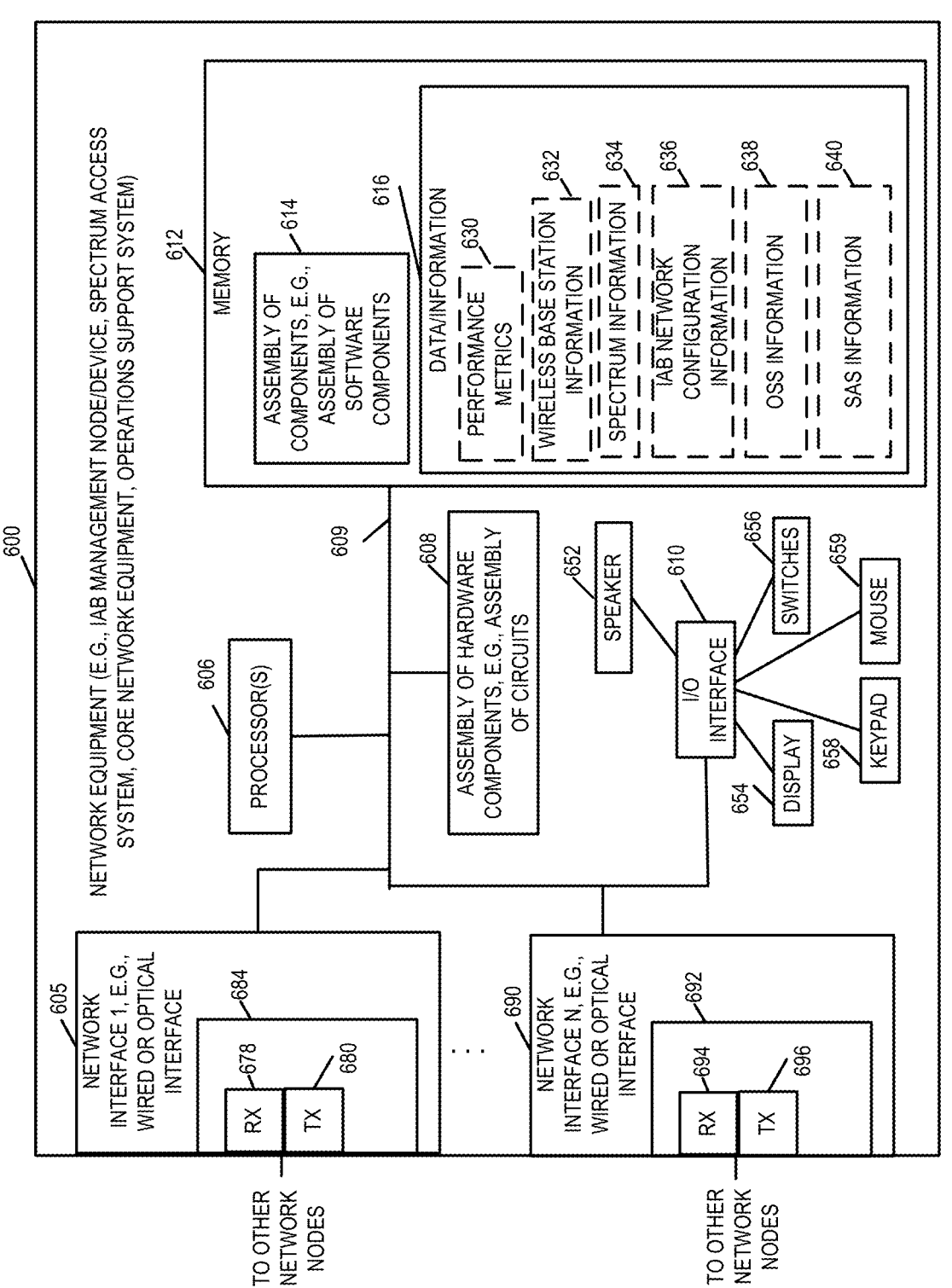
FIG. 6 illustrates network equipment (e.g., network device, Integrated Access and Backhaul (IAB) management node/device/server, Spectrum Access System (SAS), core network equipment, Operations Support System) in accordance with an embodiment of the present invention.

FIG. 6 is a drawing of an exemplary network equipment device, server or node, e.g., IAB management node/device, Spectrum Access System, core network equipment, Operations Support System in accordance with an exemplary embodiment. The network equipment device 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the network equipment device 600. Network interface 605 includes a receiver 678 and a transmitter 680. The network interface 605 is typically used to communicate with other devices, e.g., IAB management node, a wireless base station, core network equipment, OSS, databases, SAS. In some embodiments, receiver 678 and transmitter 680 are part of a transceiver 684. Network interface 690 includes a receiver 694 and a transmitter 696. The network interface 690 is typically used to communicate with other devices, e.g., other network nodes in a core network, OSS, IAB management node, etc. In some embodiments, receiver 694 and transmitter 696 are part of a transceiver 692. Memory 612 includes an assembly of component 614, e.g., an assembly of software components, and data/information 616. Data/information 616 includes performance metrics 630, wireless base station information 632, spectrum information 634, IAB network configuration information 636, OSS information 638 and SAS information 640. The specific information included in data/information 616 depends on the specific network equipment device implemented. For example, SAS information may only be included when the network device is implemented as Spectrum Access System.

The performance metrics include metrics on the current and historical performance of the wireless base stations and communications links of the network including for example, network congestion, spectrum efficiency, wireless base station loading, spectrum usage, spectrum interference, backhaul connection path capacity, downlink and uplink throughput, average latency per backhaul connection path, base station loading, base station received PRACH request count per time period, UE connection information for base station, UE connection request information for base stations.

The wireless base station information includes a profile for each wireless base station including the radio access technologies supported by the wireless base station, base station ID, whether the base station has a wired or fiber-optic or no backhaul connection to the core network or no landline connection to the core network, whether the wireless base station is a IAB donor or an IAB node, status/condition of the wireless base station (e.g., number of UEs connected, backhaul demand from UEs connected, available backhaul capacity, backhaul performance characteristics, performance metrics, neighbor base stations (e.g., neighbor base station IDs), what if any wireless backhaul connection paths are being implemented by the wireless base station, band/channel information for available for implementing wireless backhaul connections with other wireless base stations).

Spectrum information 634 includes spectrum allocated for each wireless backhaul connection path (e.g., band/channel information allocated and for which backhaul connection path (e.g., to which IAB donor), PAL and/or GAA channel information) as well as in some embodiments spectrum (band/channel) available at a wireless base station for use as wireless backhaul connection paths. The IAB network configuration information 636 includes information about the configuration and communications links of the wireless network including for example information on each of the wireless base stations including radio access technologies supported, which wireless base stations have wired and/or fiber-optic backhaul connection paths to the core network, which wireless base stations are IAB donors, which wireless base station do not have a wired or fiber-optic connection to the core network, which wireless base stations are IAB nodes, spectrum granted to and being utilized by different wireless base stations for what purpose, e.g., to provide wireless services to user equipment devices or to provide wireless backhaul for another wireless base station, and performance metrics about the communications links of the IAB network. OSS information 638 includes performance metrics for the wireless network including the wireless base stations of the network, configuration information for the wireless network, Radio Access Technologies supported by the wireless base stations, user equipment device information for user equipment devices connected to the wireless network, information on wireless base station loading, PRACH request count received by each of the wireless base stations for a period of time, and backhaul communications link/connection path performance metrics for the backhaul connection paths in the network. SAS information 640 includes information tracking of spectrum assignment, grant and usage within the wireless network, e.g., when the wireless network is a shared spectrum network such as a CBRS network.

In some embodiments, the network equipment devices discussed in the Figures and/or in connection with the embodiments of the present invention are implemented in accordance with description of network equipment device 600. For example, network equipment devices in the core network (e.g., NSSF, AUSF, UDM, AMF, SMF, PCF, AF, UPF), IAB management node, Operations Support System, and Spectrum Access System, discussed in FIGS. 10, 11, 15, 16, and 17 may be, and in some embodiments are, implemented in accordance with the network equipment device 600.

Figure 7:
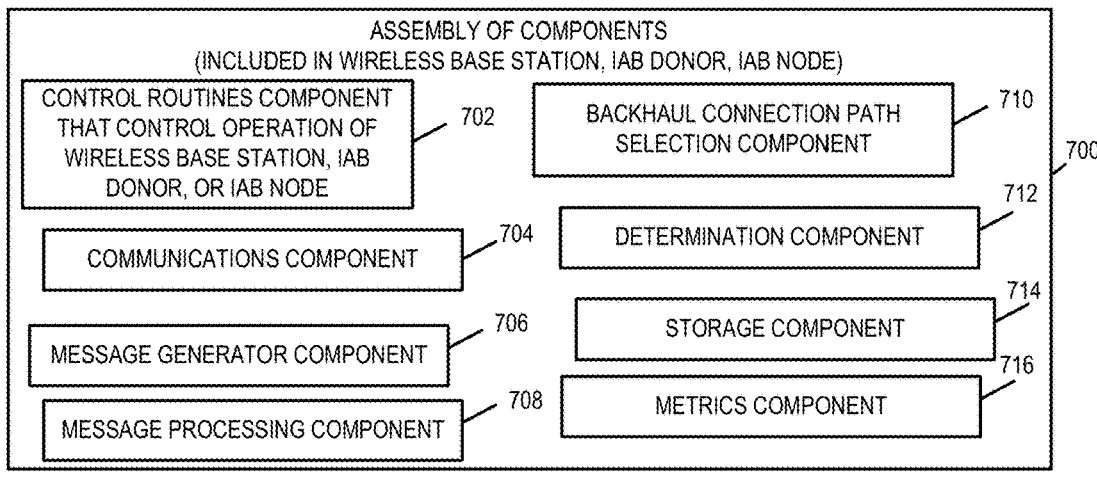
FIG. 7 illustrates an exemplary assembly of components for a wireless base station, IAB donor, IAB node in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a backhaul connection path selection component 710, a determination component 712, a storage component 714, an IAB component 716, and a metrics component 716.

The control routines component 702 is configured to control operation of the wireless base station/IAB donor/IAB node. The communications component 704 is configured to handle communications, e.g., transmission and reception of messages, and protocol signaling for the wireless base station/IAB donor/IAB node. The message generator component 706 is configured to generate messages for transmission to other devices. The message processing component 708 is configured to process received messages and is sometimes a sub-component of communications component 704. The backhaul connection path selection component 710 is configured to select which wireless backhaul connection path from a plurality of wireless backhaul connection paths to use for communicating data received from a UE. The determination component 712 makes various determinations for the wireless base station/IAB donor/IAB node including for example, determining the selection of the wireless backhaul connection path to utilize for a data stream, determining the number of UE PRACH request messages received in a period of time, determining backhaul performance metrics for the wireless base station. The storage component 714 controls the storage and retrieval of information and data in the memory and buffers of the wireless base station/IAB donor/IAB node. The metrics component 716 is configured to measure and track the performance of metrics for backhaul connection paths/communications links employed by the wireless base station/IAB donor/IAB node as well as conditions at the wireless base station/IAB donor/IAB node (e.g., PRACH request count and cell loading at the wireless base station).

It should be understood that not all wireless base stations, IAB donor/IAB nodes need to implement each of the components of the assembly of components 700 as different devices may, and in some embodiments do, implement different components.

Figure 8:
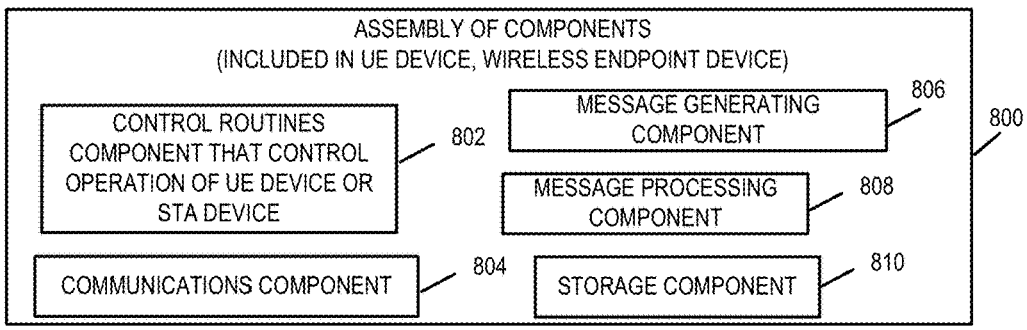
FIG. 8 illustrates an exemplary assembly of components for a user equipment device or terminal in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures.

Thus the assembly of components 800 includes various components that perform functions of corresponding one or more described and/or illustrated steps of an exemplary method.

Assembly of components 800 includes a control routines component 802 that is configured to control the operation of the UE device or station, a communications component 804 that is configured to handle communications, e.g., transmission and reception of messages, and protocol signaling for the user equipment device, a message generator component 806 that is configured to generate messages for transmission to other devices, a message processing component 808 that is configured to process received messages and a storage component 810 that controls the storage and retrieval of information and data in the memory of the UE.

Figure 9:
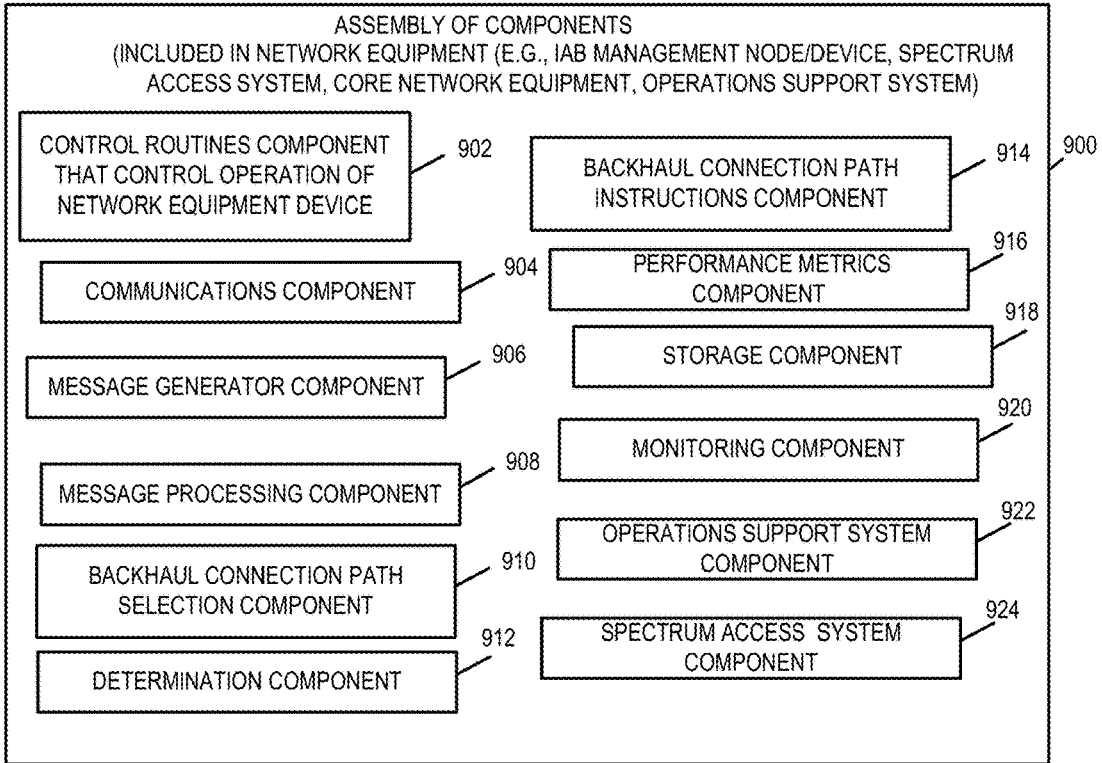
FIG. 9 illustrates an exemplary assembly of components for network equipment in accordance with an embodiment of the present invention.

FIG. 9 is a drawing of an exemplary assembly of components 900 which may be included in a network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the network equipment device 600, with the components controlling operation of the network equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a backhaul connection path selection component 910, determinator component 912, a backhaul connection path instruction component 914, a performance metrics component 916, a storage component 918, a monitoring component 920, an Operations Support System component 922, and a Spectrum Access System component 924.

The control routines component 902 is configured to control operation of the network equipment device. The communication component 904 is configured to handle communications, e.g., transmission and reception of messages, and protocol signaling for the network equipment device. The message generator component 906 is configured to generate messages for transmission to other devices. The message processing component 908 is configured to process messages and implement procedures/operations in response to messages or based on the contents of messages. This includes messages received from other devices, e.g., messages from wireless base stations, core network, and OSS. The backhaul connection path selection component selects a wireless backhaul connection path from a plurality of available or potential wireless backhaul connection paths for a wireless base station (e.g., IAB node). The determinator component 912 is configured to make determinations and decisions for the network equipment device including for example which wireless backhaul connection path meets the needs of an IAB node wireless base station. The backhaul connection path instructions components generates instructions (such as for example to execute performance tests or establish a wireless backhaul connection path) to be sent to other devices (e.g., OSS, wireless base station, etc.). The performance metrics component 916 generates and maintains performance metrics for the wireless network including performance metrics for backhaul connection paths and wireless base stations. The storage component 918 is configured to manage the storage, and retrieval of data and/or instructions to/and from memory, and/or storage devices coupled and/or connected to the network equipment device, e.g., wireless network performance metrics, backhaul connection paths metrics and specifications, wireless base station information, etc. The monitoring component 920 monitors operations in the system including conditions at wireless base stations (e.g., loading conditions. backhaul connection path demands, UE connection information), and backhaul connection path performance (capacity/bandwidth usage/availability, downlink/uplink throughput, latency), spectrum usage efficiency of the wireless network. The Operations Support System component 922 is configured to oversee the operation and configuration of the system and performs the functions and operations of the OSS described in connection with methods 1500 and 1600 disclosed herein including executing performance tests, relaying information between the IAB management node and the wireless base stations, collecting and providing metrics to the IAB management node. The Spectrum Access System component 924 is configured to manage resources (e.g., spectrum) of a wireless network (e.g., CBRS network) including registering base stations, responding to spectrum inquiries, responding to spectrum grant requests, determining spectrum availability, evaluating spectrum based on location and interference, grant spectrum for use by base stations, suspend spectrum grants, release spectrum grants, de-register base stations. The SAS component 924 is configured in some embodiments to perform the operations of a CBRS SAS.

The specific components of the assembly of components 900 included in any particular network equipment device may, and typically does vary depending on the specific network equipment device and the functionality required for the device and/or the operations the network equipment device is responsible for performing.

Figure 14:
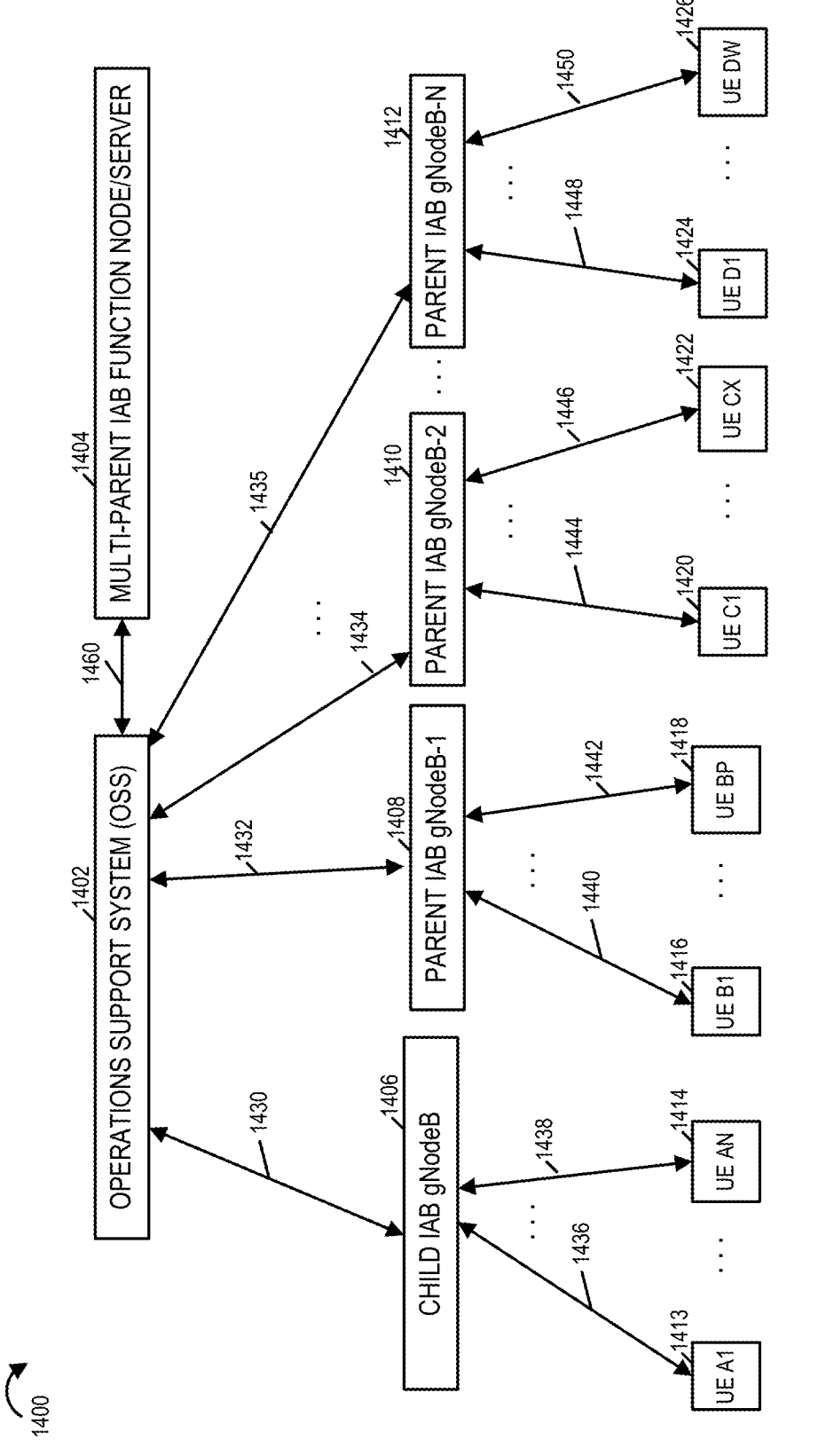
FIG. 14 illustrates an exemplary system architecture diagram for an embodiment of the present invention.

FIG. 14 illustrates an exemplary system architecture hierarchy 1400 in accordance with an embodiment of the present invention. The first lowest level elements of the system architecture hierarchy 1400 are the user equipment devices UE A1 1413 . . . . UE AN 1414, UE B1 1416, . . . , UE BP 1418, UE C1 1420, . . . , UE CX 1422, UE D1 1424, . . . , UE DW 1426. The second level elements of the system architecture are the wireless base stations implemented as gNodeBs which include the child IAB gNodeB 1406, parent IAB gNodeB-1 1408, parent IAB gNodeB-2 1410, parent IAB gNodeB-N 1412. The third level elements of the system architecture hierarchy 1400 which are at the top of the hierarchy are the Operations Support System (OSS) 1402 and the multi-parent IAB function node/server 1404. In some embodiments, the multi-parent IAB function node/server 1404 is part of the OSS 1402. multi-parent IAB function node/server 1404. The user equipment devices are allocated resources (e.g., spectrum to utilize for wireless communications) from the wireless base stations of the second level elements of the system. The user equipment devices UE A1 1413 . . . . UE AN 1414 are connected to and provided services by the child IAB gNodeB 1406 represented by links 1436, . . . , 1438. The user equipment devices UE B1 1416, . . . , UE BP 1418, are connected to and provided services by the parent IAB gNodeB-1 1408 represented by links 1440, . . . , 1442. The user equipment devices UE C1 1420, . . . , UE CX 1422 are connected to and provided services by the parent IAB gNodeB-1 1410 represented by links 1444, . . . , 1446. The user equipment devices UE D1 1424, . . . , UE DW 1426 are connected to and provided services by the parent IAB gNodeB-N 1412 represented by links 1448, . . . , 1450. The IAB wireless base stations of the second level of the system architecture are allocated resources, e.g., spectrum for communicating with user equipment devices and other wireless base stations, and controlled/managed by the OSS 1402 and multi-parent IAB function node/server 1404 which are on the highest level of the system architecture. The wireless base stations 1406, 1408, 1410, and 1412 receive instructions (e.g., to establish wireless backhaul connection path between base stations), requests (e.g., to perform performance tests of the established wireless backhaul connections, to provide information such as for example, UE connection request information, backhaul connection path performance metric information, base station condition/status and/or configuration and/or capability information) and information (e.g., backhaul connection path session establishment information) from the multi-parent IAB function node/server 1404 and OSS 1402 as part of the multi-parent IAB function node/server 1404 operations to manage the Integrated Access and Backhaul network of the system. The links 1430, 1432, 1434, . . . , 1435 represent the functional communications between the child IAB gNode B 1406 and the OSS 1402, parent IAB gNodeB-1 and the OSS 1402, the parent IAB gNodeB-2 and the OSS 1402, . . . , and the parent IAB gNodeB-N, and the OSS 1402, respectively. The child IAB gNodeB 1406 communications path to the OSS 1402 includes a backhaul connection path via one of its parent IAB gNodes (e.g., parent IAB gNodeB-1, parent IAB gNodeB-2, . . . , parent IAB gNodeB-N). The OSS 1402 acts as an intermediary device between the IAB gNodeBs and the multi-parent IAB function node/server in this exemplary architecture. The OSS 1402 collects information and metrics such as backhaul usage and performance metrics, UE request information, spectrum allocation information, cell or base station loading information, wireless base station capabilities (e.g., Radio Access Technologies) supported, location information from the IAB gNodeBs and provides it to the multi-parent function node/server 1404. The IAB gNodeB utilizes the information received from the IAB gNodeBs provided by the OSS 1402 to determine how the IAB network should be dynamically configured and/or re-configured such as for example which parent IAB gNodeB's should provide backhaul connections for the child IAB gNodeB based on the loading of the parent IAB gNodeB's and the child IAB gNodeB (e.g., number of PRACH requests received by child IAB gNodeB received from UEs over a first period of time). The multi-parent IAB function node/server 1404 manages the IAB wireless base stations and their wireless backhaul connections to provide a better quality of service with has better efficiency, effectiveness and timeless than the standard IAB system through the utilization of multi-parent IAB backhaul connections for child IAB nodes. In this exemplary system architecture the parent IAB gNodes are preferably all connected to the core network via an optical or wired backhaul connection. The link 1460 represents a connection path and the exchange of information, messages, instructions, requests, and commands between the OSS 1402 and the multi-parent IAB function node/server 1404. The system architecture hierarchy described above allows for the multi-parent IAB function node/server 1404 to effectively and efficiently monitor and manage the IAB wireless backhaul connection paths of the IAB network of the wireless base stations on the second level of the system. It should be appreciated that the wireless base stations implemented as gNodeB's on the second level of the system architecture 1400 are only exemplary and other types of wireless base station such as for example eNodeB base stations may be, and sometimes are, implemented.

Figures 15, 15A:
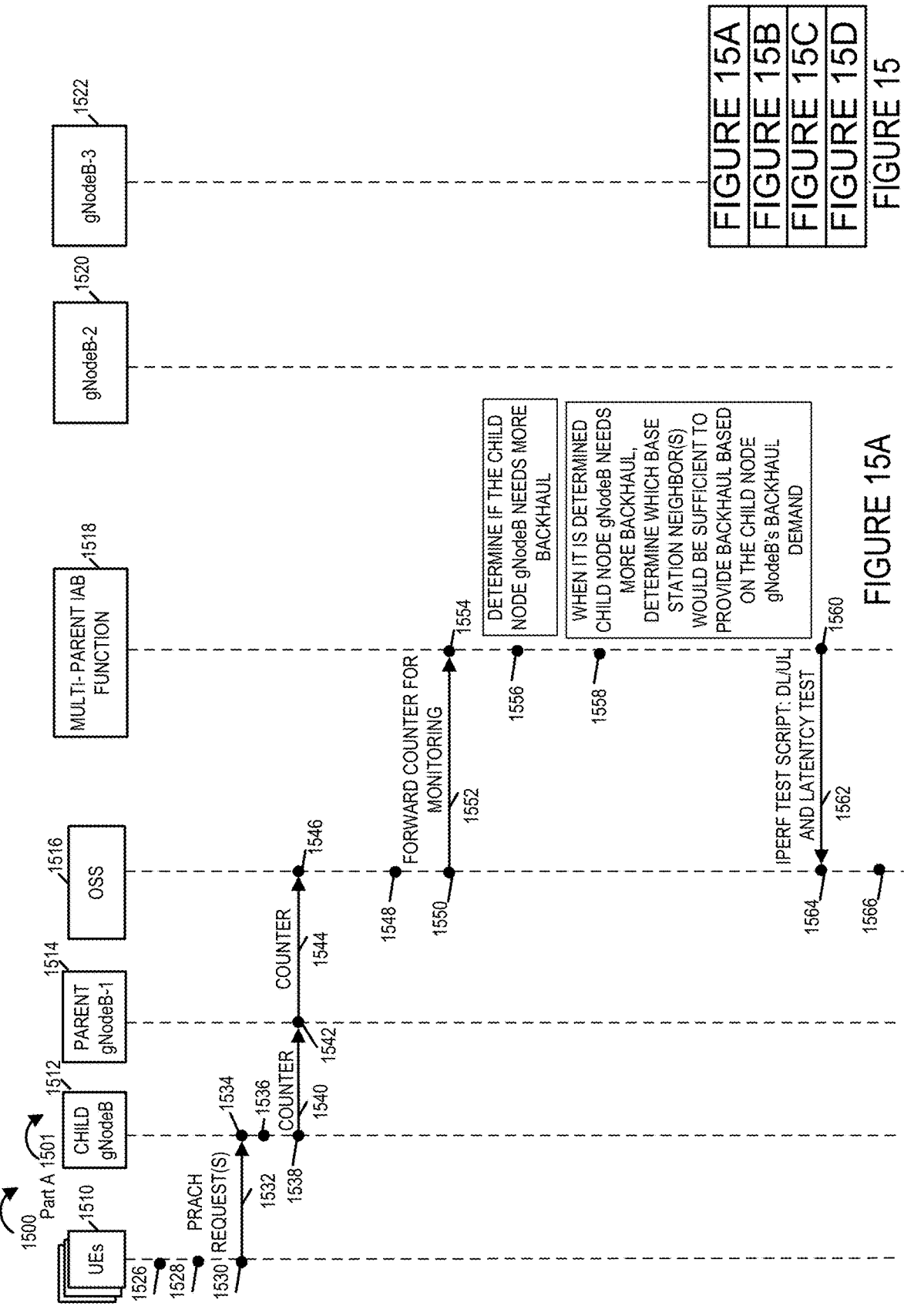
FIG. 15 illustrates the combination of FIGS. 15A, 15B, 15C, and 15D.
FIG. 15A is the first part of a signaling diagram which illustrates the steps and signaling of an exemplary method in accordance with an embodiment of the present invention.
Figure 15B:
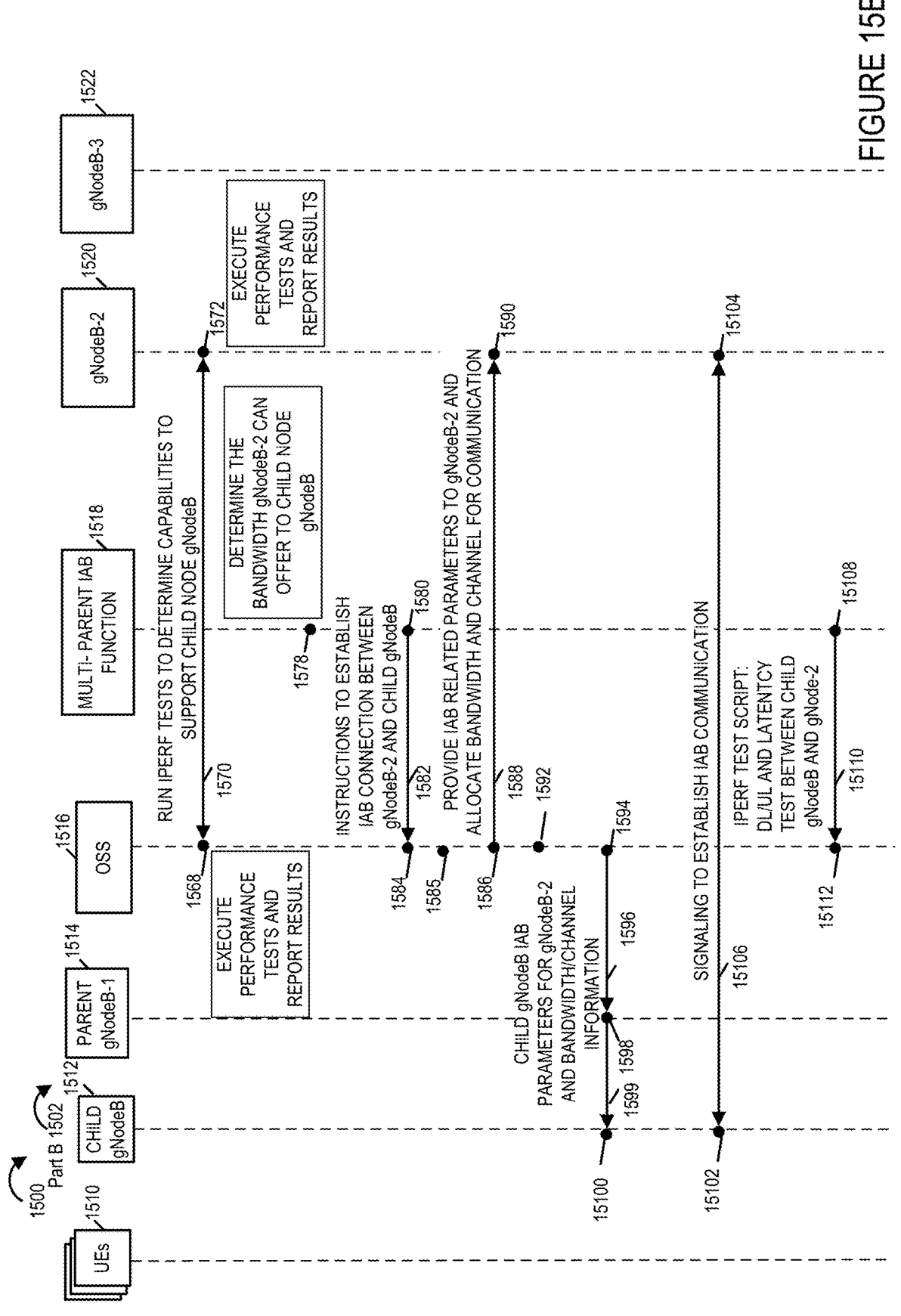
FIG. 15B is the second part of a signaling diagram which illustrates the steps and signaling of an exemplary method in accordance with an embodiment of the present invention.
Figure 15C:
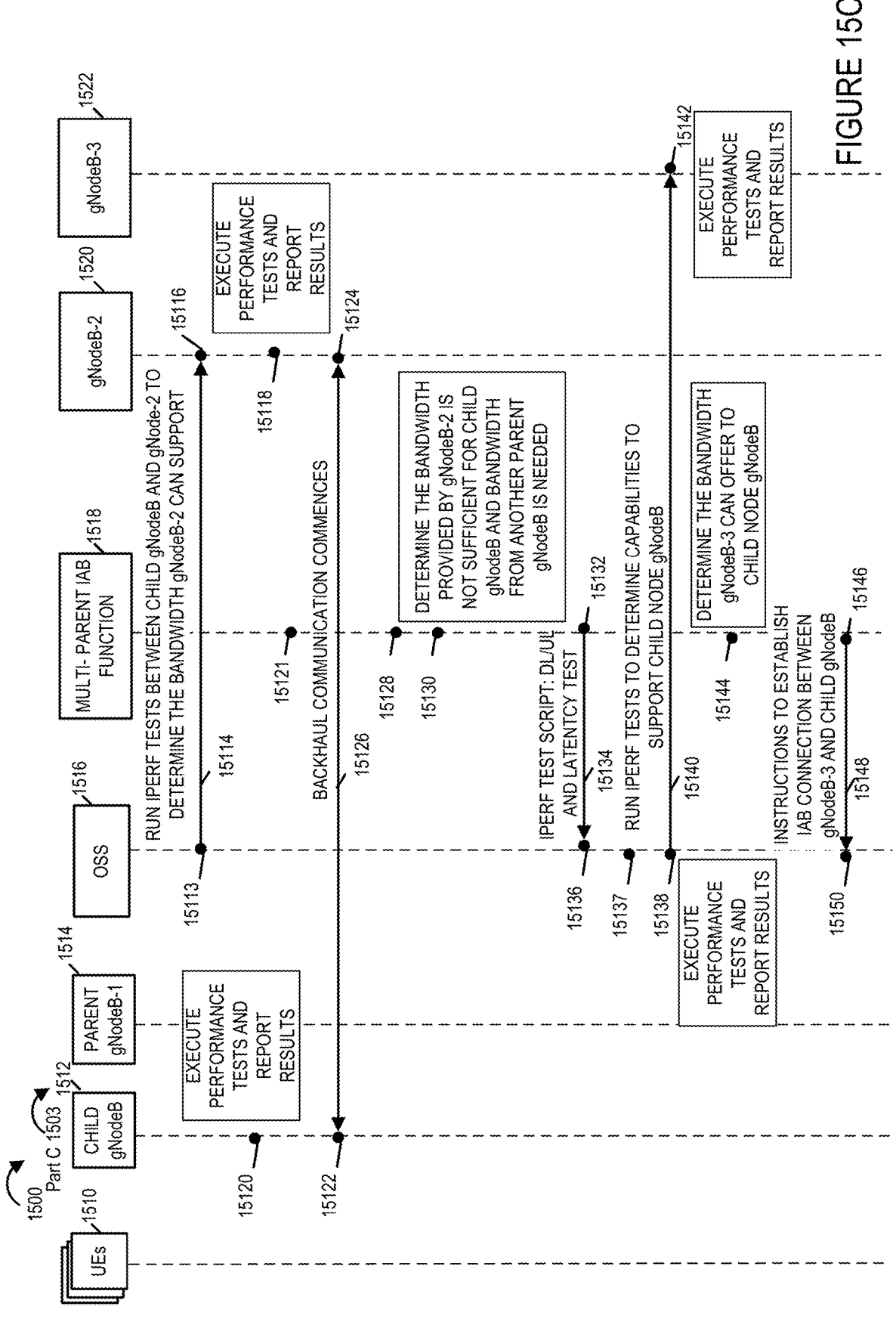
FIG. 15C is the third part of a signaling diagram which illustrates the steps and signaling of an exemplary method in accordance with an embodiment of the present invention.
Figure 15D:
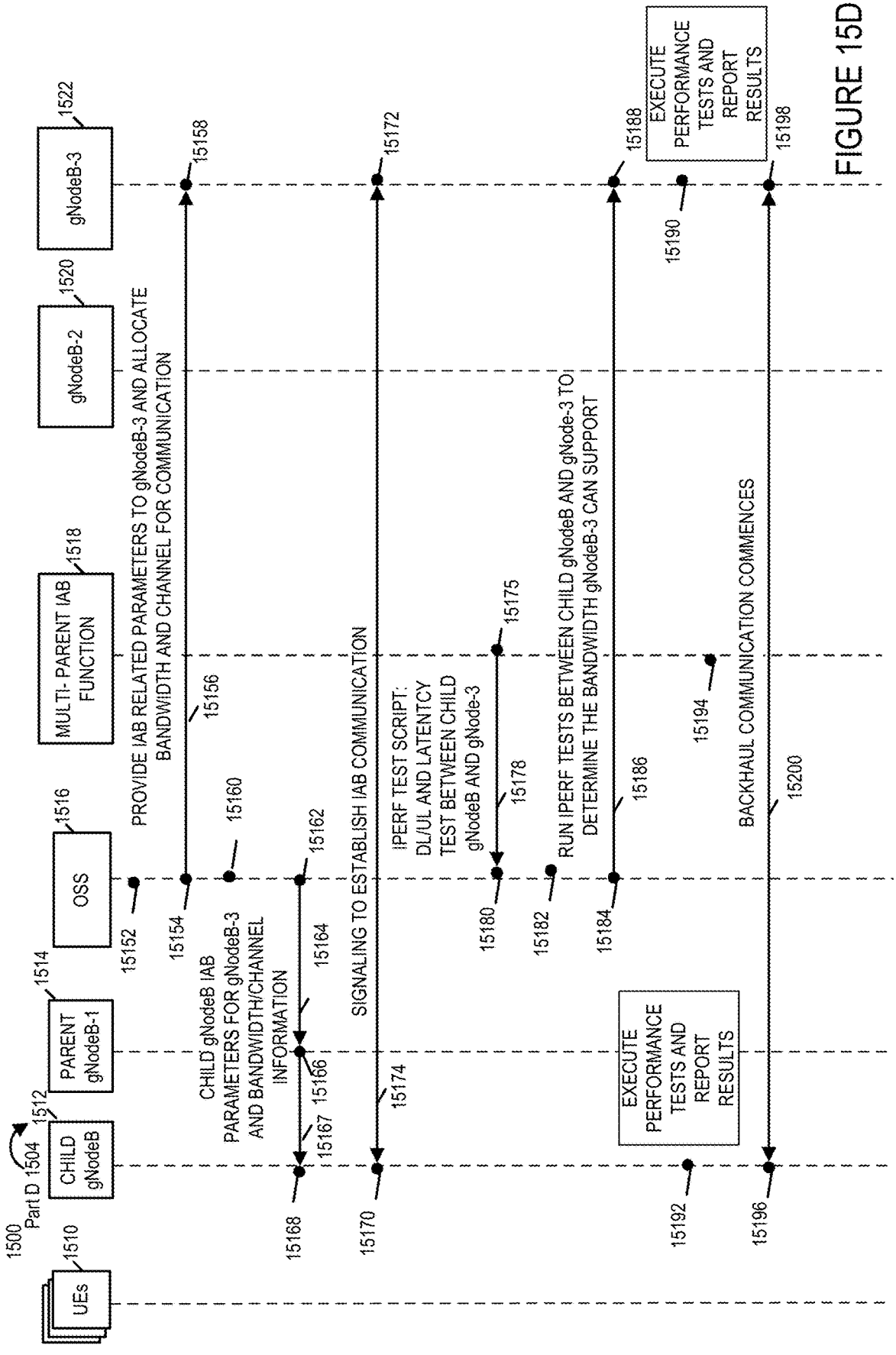
FIG. 15D is the fourth part of a signaling diagram which illustrates the steps and signaling of an exemplary method in accordance with an embodiment of the present invention.

FIG. 15 comprises FIG. 15A, FIG. 15B, FIG. 15C, and FIG. 15D. FIG. 15A is the first part (Part A 1501) of a signaling diagram which illustrates the steps and signaling of an exemplary method in accordance with an embodiment of the present invention. FIG. 15B is the second part (Part B 1502) of a signaling diagram which illustrates the steps and signaling of an exemplary method in accordance with an embodiment of the present invention. FIG. 15C is the third part (Part C 1503) of a signaling diagram which illustrates the steps and signaling of an exemplary method in accordance with an embodiment of the present invention. FIG. 15D is the fourth part (Part D 1504) of a signaling diagram which illustrates the steps and signaling of an exemplary method in accordance with an embodiment of the present invention.

While it will be readily understood that additional steps and signaling are performed in connection with communicating information, messages, and packets between devices, the method 1500 focuses on and discusses the steps and signaling for understanding the invention. Elements or steps with the same reference numbers used in different figures are the same or similar and those elements or steps will not be described in detail again. The signaling diagram/method 1500 is implemented by a system including a plurality of user equipment devices including UEs 1510, a child gNodeB 1512, a parent gNodeB-1 1514, an Operations Support System 1516, a multi-parent Integrated Access Backhaul (IAB) function node 1518, a gNodeB-2 1520, and a gNodeB-3 1522. Each of the wireless base stations child gNodeB 1512, parent gNodeB-1 1514, gNodeB-2 1520 and gNodeB-3 1522 provide services to wireless devices (e.g., user equipment devices such as for mobile phones, smartphones, laptops, etc.). The user equipment devices UEs 1510 are within the coverage area of the child gNodeB 1512. The child gNodeB 1512 is an IAB node which does not have a wired or optical backhaul communications link/connection path to a core network. The parent gNodeB-1 1514, gNodeB-2 1520, and gNodeB-3 1522 are neighbor wireless base stations to the child gNodeB 1512 and each have a wired or fiber-optic backhaul communications link/connection path the core network. The parent gNodeB-1 1514, gNodeB-2 1520, and gNodeB-3 1522 communicate with the OSS 1516 via the core network 1516. The multi-parent IAB function node 1518 is coupled and/or connected to the OSS 1516 via a wired communications link. The parent gNodeB-1 1514, gNodeB-2 1520, and gNodeB-3 1522 are IAB donors and the child gNodeB 1512 is an IAB node. Step 1526 is the start of the signaling method 1500. At step 1526, the child gNodeB 1512 has a single IAB wireless backhaul connection path to parent gNodeB-1 1514 and use its to communicate with a core network of the system, the OSS and the multi-parent IAB function node 1518.

Figure 11:
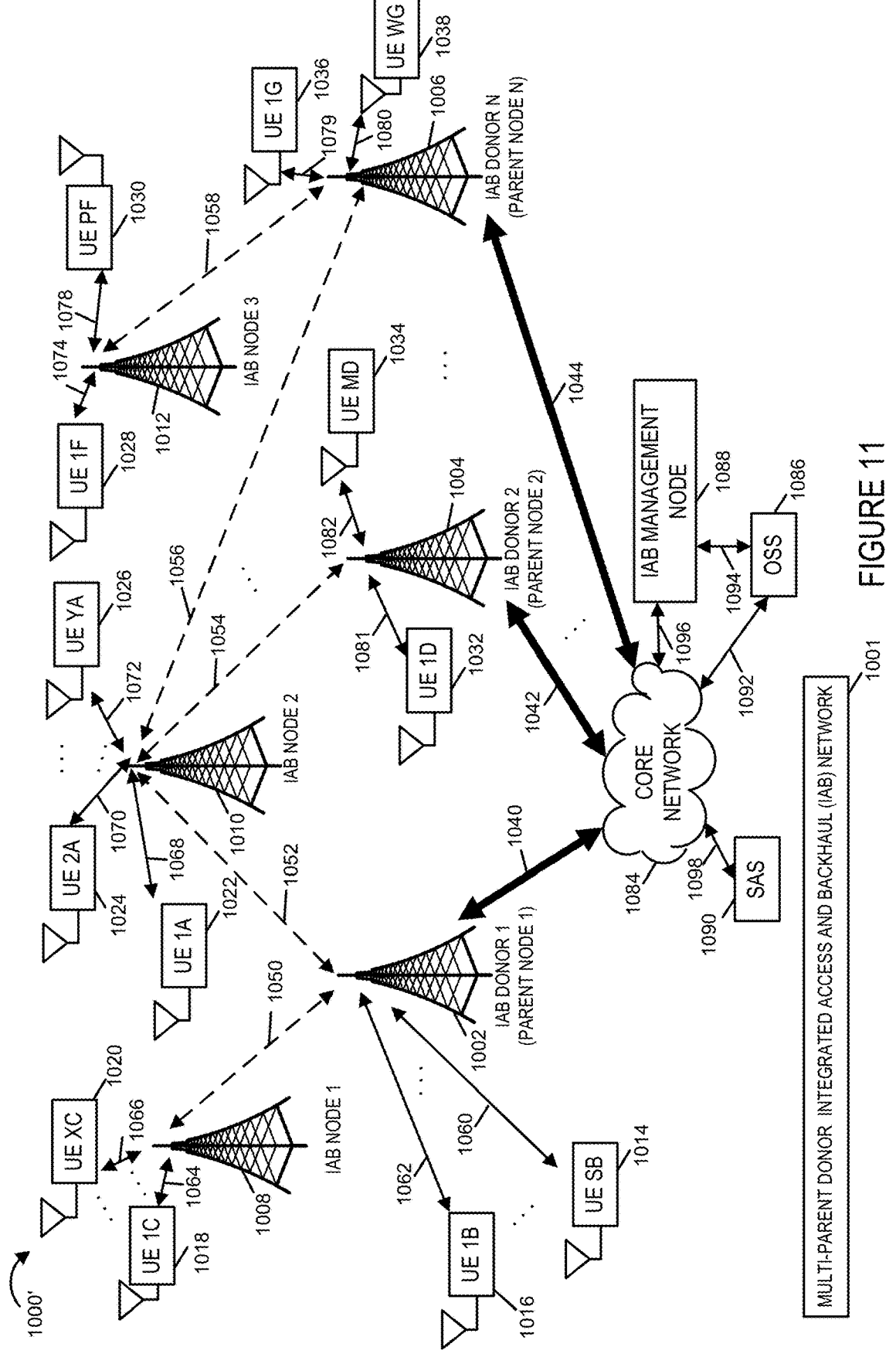
FIG. 11 illustrates changes to the exemplary system of FIG. 10 in accordance with an embodiment of the present invention.

The signaling diagram/method 1500 may be, and in some embodiments is, implemented using exemplary system 1000 and 1000' of FIGS. 10 and 11 respectively. System 1000' being system 1000 modified to include an additional wireless backhaul connection link 1056 between wireless base station IAB node 2 1010 and wireless base station IAB donor N 1006. In such embodiments, the UEs 1510 are UE 1A 1022, UE 2A 1024, . . . , UE YA 1026, child gNodeB 1512 is wireless base station IAB node 2 1010, the parent gNodeB-1 1514 is wireless base station IAB donor 1 1002, the OSS 1516 is OSS 1086, the multi-parent IAB function node 1518 is IAB management node 1088, the gNodeB-2 1520 is wireless base station IAB donor 2 1004, and gNodeB-3 1522 is wireless base station IAB donor N 1006. At the start step 1526 the wireless backhaul communications link 1052 between the wireless base station IAB 2 1010 and the wireless base station IAB donor 1 1002 has been established but no wireless backhaul communications links have yet been established between the wireless base station IAB node 2 1010 and the wireless base station IAB donor 2 1004 and the wireless base station IAB donor N 1006.

It should be understood that the method 1500 is not limited to the exemplary system 1000 and 1000' and may be, and in some embodiments is used, on other systems and system configurations.

The method 1500 commences at start step 1526 shown on method 1500 part A 1501 on FIG. 15A. Operation proceeds from step 1526 to step 1528. In step 1528 one or more of the user equipment devices 1510 generate PRACH request message(s) 1532. Operation proceeds from step 1528 to step 1530. In step 1530, the one or more UEs 1510 which generated the PRACH request messages transmit the PRACH request messages 1532 wirelessly to the child gNodeB 1512. The PRACH messages 1532 represent messages sent over a first period of time as each of the one or more UEs attempt to connect and obtain resources (e.g., spectrum for communicating with child gNodeB 1512). These messages need not be, but can be, sent simultaneously. Operation proceeds from step 1530 to step 1534. In step 1534, the child gNodeB 1512 receives the PRACH request messages from the one or more UEs 1510 which transmitted the PRACH request messages during the first period of time. Operation proceeds from step 1534 to step 1536. In step 1536, a routine in the child gNodeB 1512 counts the number of PRACH request messages received during the first period of time to generate a PRACH request count. The PRACH request count will be referred to as the counter. The counter containing the value of the PRACH request count. Operation proceeds from step 1536 to step 1538. In step 1538, the child gNodeB 1512 generates and transmits the counter message 1540 which include the PRACH request count for the first period of time. The counter message 1540 is transmitted over a first wireless backhaul connection path between the child gNodeB 1512 and its parent gNodeB-1 1514 (e.g., wireless backhaul communications link/connection path 1052 of system 1000). Operation proceeds from step 1538 to step 1542. At step 1542, the parent gNodeB-1 1514 receives the counter message 1540, generates counter message 1544 based on counter message 1540, and transmits the generated counter message 1544 to the OSS 1516 over a fiber-optic backhaul connection path (e.g., fiber optic backhaul connection path 1040 of system 1000 and via a core network (e.g., core network 1084 of system 1000)). In some embodiments, the message 1544 includes the PRACH requests count for other child wireless base stations for which the parent gNodeB-1 is providing wireless backhaul services (e.g., wireless base station IAB node 1 1008 of system 1000) in addition to the child gNodeB 1512 PRACH request count with each of the child node's PRACH request counts identified by associating the PRACH request count with a unique wireless base station identifier. Operation proceeds from step 1542 to step 1546. In step 1546, the OSS 1546 receives the counter message 1544 from the parent gNodeB-1 1514. Operation proceeds from step 1546 to step 1548.

In step 1548, the OSS 1516 generates message 1552 based on counter message 1544. The message 1552 includes the PRACH count for the child gNodeB 1514. In some embodiments, the message 1552 includes the PRACH count information for other wireless base stations which are children of the parent gNodeB-1 1514. In some embodiments, the message 1552 includes for the first period of time PRACH count information and a corresponding base station identifier for a plurality of wireless base stations (e.g., in some embodiments the OSS obtains the PRACH count for each wireless base station in the IAB network for the first period of time and transmits the PRACH count value along with a base station identifier to the multi-parent IAB function node 1518 within one reporting message 1552). The PRACH count information for the first child gNodeB 1512 is transmitted to the multi-parent IAB function node 1518 for monitoring purposes. The multi-parent IAB function node 1518 monitors and generates metrics on the wireless base stations in the network used for making wireless backhaul connection path decisions. Operation proceeds from step 1548 to step 1550. In step 1550, the OSS 1516 transmits the message 1552 with the PRACH request count for the child gNodeB 1512 to the multi-parent function node 1518 via wired connection (e.g., communications link 1094 of system 1000). Operation proceeds from step 1550 to step 1554.

In step 1554, the multi-parent IAB function node 1518 receives the message 1552 and processes the message 1552. As part of processing the message 1552, the multi-parent function node 1518 extracts the child gNodeB 1512 PRACH request count for the first period of time from the message 1552. Operation proceeds from step 1554 to step 1556. In step 1556, the multi-parent IAB function node 1518 determines if the child gNodeB 1512 needs more backhaul capacity and/or an additional wireless backhaul connection path based on the child gNodeB 1512 PRACH request count for the first period of time. In some embodiments, the multi-parent IAB function node 1518 makes the determination of whether the child gNodeB 1512 needs additional backhaul by comparing the gNodeB 1512 PRACH request count for the first period of time to a first threshold value and if the PRACH request count has increased from the last reported PRACH request from the gNodeB 1512 so that it exceeds the first threshold value then it determines that the child gNodeB 1512 needs more backhaul capacity and/or an additional wireless backhaul connection path. Operation proceeds from step 1556 to step 1558. In step 1558, in response to determining that the child gNodeB 1512 needs more backhaul, the multi-parent IAB function node 1518 determines which wireless base station neighbor(s) of the child gNodeB 1512 would be able to provide sufficient backhaul based on the child gNodeB 1512's backhaul demand. The child gNodeB 1512's backhaul demand may be, and in some embodiments is, determined based on the child gNodeB 1512's PRACH request count for the first period of time. The multi-parent IAB function node 1518 makes an initial determination of the parent gNodeB-2 1520. Operation proceeds from step 1558 to step 1560.

In step 1560, the multi-parent function node 1518 generates and transmits to the OSS 1516 a message 1562 including performance tests to be executed to determine the backhaul capacity or bandwidth available from the gNodeB-2 1520 to the core network that can be provided to the child gNodeB 1512. In some embodiments, the message 1562 includes one or more iPerf test scripts for testing downlink and uplink throughput and latency performance of the fiber-optic backhaul connection path between the gNodeB-2 1520 and the core network. In this example, message 1562 includes information identifying the gNodeB-2 1520 as the wireless base station's whose fiber-optic backhaul connection path's performance and capacity is to be tested. Operation proceeds from step 1560 to step 1564. In some embodiments, the backhaul capacity/bandwidth of a plurality of IAB donor neighbor wireless base stations of the child gNode 1512 are tested to determine the neighbor wireless base stations's backhaul bandwidth or capacity available for the child gNodeB 1512. In step 1564, the OSS 1516 receives the message 1562. Operation proceeds from step 1564 to step 1566.

In step 1566, the OSS generates test message(s) 1570 for testing gNodeB-2 1520 based on the information received in message 1562 (e.g., iPerf test scripts received). Operation proceeds from step 1566 to step 1568 illustrated on part B 1502 on FIG. 15B. In steps 1568 and 1572, the OSS 1516 and gNodeB-2 1520 execute performance tests (e.g., the iPerf test scripts received from the multi-parent IAB function node 1518) to determine the capabilities of the gNodeB-2 1520 to support backhaul services for the child gNodeB 1512. The performance tests include the exchange of message(s) 1570 used to determine available backhaul capacity/bandwidth between the gNodeB-2 1520 and the core network and/or OSS 1516, downlink and uplink throughput and transmission latency. The gNodeB-2 1520 and OSS 1516 report the performance test results to the multi-parent IAB function node 1518. Operation proceeds from steps 1568 and 1572 to step 1578. In step 1578, the multi-parent IAB function node 1518 determines the bandwidth the gNodeB-2 1520 can offer to the child gNodeB 1512 based on the reported test results and determines that it is sufficient to meet the child gNodeB's backhaul demands. Operation proceeds from step 1578 to step 1580. In step 1580, the multi-parent IAB function node 1518 generates message 1582 and transmits the message 1582 to the OSS 1516. The message 1582 includes instructions and information (e.g., IAB related parameters) to establish an IAB wireless connection path between gNodeB-2 1520 and the child gNodeB 1512. Operation proceeds from step 1580 to step 1584. In step 1584, the OSS 1516 receives and processes the message 1582 from the multi-parent IAB function node 1518. Operation proceeds from step 1584 to 1585. In step 1585, the OSS 1516 generates message 1588 based on message 1582. Message 1588 includes instructions and/or information for establishing a wireless backhaul connection path between the gNodeB-2 1520 as a parent IAB donor and child gNodeB which is a child IAB node. The message includes IAB parameters and information on allocated bandwidth and channel information for the wireless backhaul connection path. In some embodiments, the IAB related parameters include session establishment information including address information for the child gNodeB 1512 and information identifying the IAB parent child relationship to be established identifying the IAB donor parent and IAB node child for example by base station identifier. In some embodiments, the bandwidth and channel information is provided by the multi-parent IAB function node 1518 in message 1582. In some embodiments, the bandwidth allocation and channel information is obtained by the OSS 1516 or the multi-parent IAB function 1518 from a Spectrum Access System for example when CBRS spectrum is being utilized for the wireless backhaul connection path between to be established between the gNodeB-2 1520 and the child gNodeB 1512. Operation proceeds from step 1585 to step 1586.

In step 1586, the OSS 1516 communicates to gNodeB-2 1520 the message 1588 with the IAB related parameters and allocated bandwidth information and channel information for the wireless backhaul connection path to be established between the gNodeB-2 1520 and child gNodeB 1512. Operation proceeds from step 1586 to steps 1590 and 1592. In step 1590, the gNodeB-2 receives the message 1590.

In step 1592, the OSS 1516 generates the message 1596. Message 1596 includes instructions and/or information for establishing the wireless backhaul connection path between the gNodeB-2 1520 as a parent IAB donor and child gNodeB 1512 which is the child IAB node. The message includes IAB parameters and information on allocated bandwidth and channel information for the wireless backhaul connection path to be established. In some embodiments, the IAB related parameters include session establishment information including address information for the parent gNodeB-2 1520 and information identifying the IAB parent child relationship to be established identifying the IAB donor parent and IAB node child for example by base station identifier. Operation proceeds from step 1592 to step 1594. In step 1594, the OSS 1516 transmits the message 1596 to parent gNodeB-1 1514 via the core network and the gNodeB-1 1514's fiber optic backhaul connection path. Operation proceeds from step 1594 to step 1598. In step 1598, the parent gNodeB-1 1514 receives the message 1596, generates message 1599 based on message 1596, and transmits the message 1599 to the child gNodeB 1512. Message 1599 include the contents of the message 1596 (e.g., instructions to establish a wireless backhaul connection path between the child gNodeB 1512 and the gNodeB-2 1520, IAB related parameters, and bandwidth and channel information for the wireless backhaul connection path to be established). Operation proceeds from step 1598 to step 15100. In step 15100, the child gNodeB receives and processes the message 1599. Operation proceeds from steps 15100 to step 15102. Operation proceeds from step 1590 to step 15102.

In steps 15102 and 15104, the child gNodeB 1512 and gNodeB-2 1520 generate and exchange messages 15106 to establish an IAB wireless connection path between the child gNodeB 1512 and the gNodeB-2 1520 as its parent using the instruction and information included in message 1599 and 1588. In various embodiments of the invention, the signaling to establish the IAB communications backhaul connection between the IAB donor and the IAB node (child) is based on and/or utilizes the standard IAB communication establishment procedures in which the IAB donor appears as a wireless base station (e.g., gNodeB) to the IAB node (child) and the IAB node (child) appears as a wireless endpoint device (e.g., user equipment device) to the IAB donor. The IAB node and IAB donor wireless base stations may, and in some embodiments do, utilize standard messaging exchanges to establish the IAB backhaul communications link/connection path. The information/signaling to establish the IAB communications link includes signaling and information for the child gNodeB which is an IAB node to attach, the channel to use, the bandwidth part to use, gNodeB Id of the node. The OSS will have the IAB node (child gNodeB 1512) act as a UE towards the IAB donor (parent gNodeB-2 1520) and establish a link for data exchange. The gNodeB ID of the IAB donor (parent gNodeB-2 1520) is important to the child gNodeB 1512 so that it can distinguish the parent gNodeB 1522 from other neighbor wireless base stations. The gNodeB ID of the IAB child node (child gNodeB 1512) is important and the node information to discern it from regular user equipment devices to the IAB donor (gNodeB-2 1520). In addition, a time grant (e.g., spectrum time grant) based on the dwell time (how long a UE would typically stays within that node's coverage area) of the UE will be used which may be renewed if the UE exceeds the dwell time. The above described information (e.g., gNodeB IDs of IAB donor and IAB child node, attachment information, spectrum allocation information (band, channel information, grant time, and/or bandwidth part information) is included in the IAB parameter information and/or with it.

Operation proceeds from steps 15102 and 15104 to step 15108. In step 15108, the multi-parent IAB function node 1518 generates and transmits message 15110 to OSS 1516. The message 15110 includes instructions and/or information for performing performance tests on the IAB wireless connection path established between the child gNodeB 1512 and the gNodeB-2 1520. In some embodiments, the message 15110 includes one or more iPerf test scripts for testing downlink and uplink throughput and latency of the wireless connection path between the child gNodeB 1512 and the gNodeB-2 1520. Operation proceeds from step 15108 to step 15112. In step 15112, the OSS 1516 receives the message 15110. Operation proceeds from step 15112 to step 15113 shown on part C 1503 of method 1500 illustrated on FIG. 15C.

In step 15112, OSS 1516 generates and communicates messages 15114 to gNodeB-2 1520. The message 15114 is based on the message 15110 and includes the instructions and/or information to run the performance tests on the IAB wireless connection path established between the child gNodeB 1512 and the gNodeB-2 1520. In some embodiments, the message 15114 includes the one or more Iperf test scripts for testing downlink and uplink throughput and latency included in the message 15110. Operation proceeds from step 15112 to step 15116. In step 15116, the gNodeB-2 1520 receives and processes the message 15114 from the OSS 1516. Operation proceeds from step 15116 to steps 15118 and 15120. In step 15118 and step 15120, the gNodeB-2 1520 and child gNodeB 1512 execute performance tests (e.g., the one or more iPerf scripts for downlink and uplink throughput and latency) and report the results to the OSS 1516 which in turn reports the results to the multi-parent IAB function node 1518. Operation proceeds from steps 15118 and 15120 to step 15121. In step 15121, the multi-parent IAB function determines/confirms from the performance test results in steps 15118 and/or 15120 that the IAB wireless connection path established between the child gNodeB 1512 and the gNodeB-2 1520 provide the required backhaul connection performance needed by the child gNodeB 1512. In some embodiments, the multi-parent IAB function 1518 in response to determining that the IAB wireless connection path established can provide the backhaul connection performance needed by the child gNodeB 1512, communicates instructions to the child gNodeB 1512 and/or the gNodeB-2 1520 to commence backhaul communications using the established IAB wireless connection path. Operation then proceeds from step 15121 to steps 15122 and 15124.

In response to determining based on the results reported from the performance tests, by the multi-parent IAB function node 1518, in step 15121 that the backhaul capacity/bandwidth the gNodeB-2 1520 can support is not sufficient for the needs of the child gNodeB 1512, the multi-parent IAB function node 1518 sends an instruction to the child gNodeB 1512 and gNodeB-2 1520 to commence backhaul operations on the newly established IAB wireless backhaul connection while also determining the amount of additional bandwidth required for the child gNode 1512. Operation then proceeds from step 15121 to steps 15122 and 15124 and step 15130. The monitoring step 15128 is skipped when the determination in step 15121 is that not enough bandwidth is being provided by the gNodeB-2 1520 to support the child gNode 1512 and the multi-parent IAB function node 1518 immediately selects another neighbor wireless base station (e.g., gNodeB-3 1522) to test for providing the required additional backhaul capacity needed to support the child gNodeB 1512.

In steps 15122 and 15124, the IAB wireless connection path established between the child gNodeB 1512 and the gNodeB-2 1520 becomes a wireless backhaul connection path (e.g., wireless backhaul communications link 1054 in system 1000 and 1000') and backhaul communications commences with messages 15126 being generated and exchanged between the child gNodeB 1512 and the gNodeB-2 1520. In some embodiments, this usage of the established wireless connection path between the child gNodeB 1512 and the gNodeB-2 1520 commences in response to instructions from the multi-parent IAB function node 1518. In some embodiments, the usage of the IAB wireless connection path is utilized as a backhaul connection path as soon as it is established without waiting for instructions from the multi-parent IAB function node 1518. At this point the child gNodeB 1512 has two active wireless backhaul connection paths with two different parents. The first wireless backhaul connection path is between the child gNodeB 1512 and the parent gNodeB-1 1514 and the second wireless backhaul connection path is between the child gNodeB 1512 and the gNode-2 1520. The child gNodeB 1512 selecting which of the backhaul connection paths to utilize for different user equipment devices and/or data streams. In some embodiments, the IAB parameters provided by the multi-parent function node 1518 including a routing criteria to be applied to new data streams by the child gNodeB 1512. The routing criteria being used to determine which of the multiple backhaul connection paths of the child gNodeB 1512 to utilize for the new data streams. Operations proceed from step 15122 and 15124 to step 15127.

In step 15128, the multi-parent IAB function node 1518 continuously monitors the status of the conditions at the child gNodeB 1512 and its neighbor wireless base stations including parent gNodeB-1 1514, gNodeB-2 1520 and gNodeB-3 1522 as well as the IAB wireless backhaul connection paths established in the system. Operation proceeds from step 15128 to step 15130.

In step 15130, the multi-parent IAB function node 1518 determines based on the continuous monitoring that the bandwidth provided by the gNodeB-1 1514 and gNodeB-2 15130 is not sufficient for the child gNodeB 1512 and bandwidth from an additional parent gNodeB is needed. The determination may be, and in some embodiments, is based on a reported count of PRACH requests received by the child gNodeB 1512 during a second time period following the commencement of the use of the wireless backhaul connection path between the child gNodeB 1512 and the gNodeB-2 1520. Operation proceeds from step 15130 to step 15132.

In step 15132, the multi-parent function node 1518 generates and transmits to the OSS 1516 a message 15134 including performance tests to be executed to determine the backhaul capacity or bandwidth available from the gNodeB-3 1522 to the core network that can be provided to the child gNodeB 1512. In some embodiments, the message 15134 includes one or more iPerf test scripts for testing downlink and uplink throughput and latency performance of the fiber-optic backhaul connection path between the gNodeB-3 1522 and the core network. In this example, the message 15134 includes information identifying the gNodeB-3 1522 as the wireless base station's whose fiber-optic backhaul connection path's performance and capacity is to be tested. Operation proceeds from step 15132 to step 15136. In some embodiments, the backhaul capacity/bandwidth of a plurality of IAB donor neighbor wireless base stations of the child gNode 1512 are tested to determine the neighbor wireless base stations's backhaul bandwidth or capacity available for the child gNodeB 1512. In step 15136, the OSS 1516 receives the message 15134. Operation proceeds from step 15136 to step 15137.

In step 15137, the OSS generates test message(s) 15140 for testing gNodeB-3 1522 based on the information received in message 15134 (e.g., iPerf test scripts received). Operation proceeds from step 15137 to step 151138. In steps 15138 and 15142, the OSS 1516 and gNodeB-3 1522 execute performance tests (e.g., the iPerf test scripts received from the multi-parent IAB function node 1518) to determine the capabilities of the gNodeB-3 1522 to support backhaul services for the child gNodeB 1512. The performance tests include the exchange of message(s) 15140 used to determine available backhaul capacity/bandwidth between the gNodeB-3 1522 and the core network and/or OSS 1516, downlink and uplink throughput and transmission latency. The gNodeB-3 1522 and OSS 1516 report the performance test results to the multi-parent IAB function node 1518. Operation proceeds from steps 15138 and 15142 to step 15144. In step 15144, the multi-parent IAB function node 1518 determines the bandwidth the gNodeB-3 1522 can offer to the child gNodeB 1512 based on the reported test results and determines that it is sufficient to meet the child gNodeB's backhaul demands. Operation proceeds from step 15144 to step 15146. In step 15146, the multi-parent IAB function node 1518 generates message 15148 and transmits the message 15148 to the OSS 1516. The message 15148 includes instructions and information (e.g., IAB related parameters) to establish an IAB wireless connection path between gNodeB-3 1522 and the child gNodeB 1512. Operation proceeds from step 15146 to step 15150. In step 15150, the OSS 1516 receives and processes the message 15150 from the multi-parent IAB function node 1518. Operation proceeds from step 15150 to 15152 shown on method 1500 part D 1504 on FIG. 15D. In step 15152, the OSS 1516 generates message 15156 based on message 15148. Message 15156 includes instructions and/or information for establishing a wireless backhaul connection path between the gNodeB-3 1522 as a parent IAB donor and child gNodeB 1512 which is a child IAB node. The message includes IAB parameters and information on allocated bandwidth and channel information for the wireless backhaul connection path. In some embodiments, the IAB related parameters include session establishment information including address information for the child gNodeB 1512 and information identifying the IAB parent child relationship to be established identifying the IAB donor parent and IAB node child for example by base station identifier. In some embodiments, the bandwidth and channel information is provided by the multi-parent IAB function node 1518 in message 15156. In some embodiments, the bandwidth allocation and channel information is obtained by the OSS 1516 or the multi-parent IAB function 1518 from a Spectrum Access System for example when CBRS spectrum is being utilized for the wireless backhaul connection path between to be established between the gNodeB-3 1522 and the child gNodeB 1512. Operation proceeds from step 15152 to step 15154.

In step 15154, the OSS 1516 communicates to gNodeB-3 1522 the message 15156 with the IAB related parameters and allocated bandwidth information and channel information for the wireless backhaul connection path to be established between the gNodeB-3 1522 and child gNodeB 1512. Operation proceeds from step 15154 to steps 15158 and 15160. In step 15158, the gNodeB-3 1522 receives the message 15156.

In step 15160, the OSS 1516 generates the message 15164. Message 15164 includes instructions and/or information for establishing the wireless backhaul connection path between the gNodeB-3 1522 as a parent IAB donor and child gNodeB 1512 which is the child IAB node. The message includes IAB parameters and information on allocated bandwidth and channel information for the wireless backhaul connection path to be established. In some embodiments, the IAB related parameters include session establishment information including address information for the parent gNodeB-3 1522 and information identifying the IAB parent child relationship to be established identifying the IAB donor parent and IAB node child for example by base station identifier. Operation proceeds from step 15160 to step 15162. In step 15162, the OSS 1516 transmits the message 15164 to parent gNodeB-1 1514 via the core network and the gNodeB-1 1514's fiber optic backhaul connection path. Operation proceeds from step 15162 to step 15166. In step 15166, the parent gNodeB-1 1514 receives the message 15164, generates message 15167 based on message 15164, and transmits the message 15167 to the child gNodeB 1512. Message 15167 includes the contents of the message 15164 (e.g., instructions to establish a wireless backhaul connection path between the child gNodeB 1512 and the gNodeB-3 1522, IAB related parameters, and bandwidth and channel information for the wireless backhaul connection path to be established). Operation proceeds from step 15166 to step 15168. In step 15168, the child gNodeB 1512 receives and processes the message 15167. Operation proceeds from steps 15168 to step 15170. Operation proceeds from step 15158 to step 15172.

In steps 15170 and 15172, the child gNodeB 1512 and gNodeB-3 1522 generate and exchange messages 15174 to establish an IAB wireless connection path between the child gNodeB 1512 and the gNodeB-3 1522 as its parent using the instruction and information included in message 15156 and 15174. Operation proceeds from steps 15170 and 15172 to step 15175.

In step 15175, the multi-parent IAB function node 1518 generates and transmits message 15178 to OSS 1516. The message 15178 includes instructions and/or information for performing performance tests on the IAB wireless connection path established between the child gNodeB 1512 and the gNodeB-3 1522. In some embodiments, the message 15178 includes one or more iPerf test scripts for testing downlink and uplink throughput and latency of the wireless connection path between the child gNodeB 1512 and the gNodeB-3 1522. Operation proceeds from step 15175 to step 15180. In step 15180, the OSS 1516 receives the message 15178. Operation proceeds from step 15180 to step 15182.

In step 15182, the OSS 1516 generates and communicates message 15186 to gNodeB-3 1522. The message 15186 is based on the message 15178 and includes the instructions and/or information to run the performance tests on the IAB wireless connection path established between the child gNodeB 1512 and the gNodeB-3 1522. In some embodiments, the message 15186 includes the one or more Iperf test scripts for testing downlink and uplink throughput and latency included in the message 15178. Operation proceeds from step 15184 to step 15188. In step 15188, the gNodeB-3 1522 receives and processes the message 15186 from the OSS 1516. Operation proceeds from step 15186 to steps 15190 and 15192. In step 15190 and step 15192, the gNodeB-3 15202 and child gNodeB 1512 execute performance tests (e.g., the one or more iPerf scripts for downlink and uplink throughput and latency) and report the results to the OSS 1516 which in turn reports the results to the multi-parent IAB function node 1518. Operation proceeds from steps 15190 and 15192 to step 15194. In step 15194, the multi-parent IAB function node 1518 determines/confirms from the performance test results reported in steps 15192 and 15190 that the IAB wireless connection path established between the child gNodeB 1512 and the gNodeB-3 1522 provides the required backhaul connection performance needed by the child gNodeB 1512. While in this example the gNodeB-3 1522 has sufficient backhaul capacity/bandwidth, when the multi-parent IAB function node 1518 determines from the results reported in step 15190 and/or 15192 that the gNodeB-3 1522 can not support sufficient additional backhaul capacity/bandwidth needed for the child gNodeB 1512, the multi-parent IAB function node 1518 the process is repeated until additional backhaul connection paths which can provide a sufficient amount of backhaul for the child gNodeB 1512 have been created or the multi-parent IAB function determines to limit the maximum amount of backhaul capacity for the child gNodeB 1512 in view of the conditions at the neighbor wireless base stations. In some embodiments, the multi-parent IAB function 1518 in response to determining that the IAB wireless connection path established can provide the backhaul connection performance needed by the child gNodeB 1512, communicates instructions to the child gNodeB 1512 and/or the gNodeB-3 1522 to commence backhaul communications using the established IAB wireless connection path. Operation proceeds from step 15194 to steps 15196 and 15198.

In steps 15196 and 15198, the IAB wireless connection path established between the child gNodeB 1512 and the gNodeB-3 1522 becomes a wireless backhaul connection path (e.g., wireless backhaul communications link 1056 in system 1000') and backhaul communications commences with messages 151200 being generated and exchanged between the child gNodeB 1512 and the gNodeB-3 1522. In some embodiments, this usage of the established wireless connection path between the child gNodeB 1512 and the gNodeB-3 1522 commences in response to instructions from the multi-parent IAB function node 1518. In some embodiments, the usage of the IAB wireless connection path is utilized as a backhaul connection path as soon as it is established without waiting for instructions from the multi-parent IAB function node 1518. At this point the child gNodeB 1512 has three active wireless backhaul connection paths with three different parents. The first wireless backhaul connection path is between the child gNodeB 1512 and the parent gNodeB-1 1514. The second wireless backhaul connection path is between the child gNodeB 1512 and the gNode-2 1520. The third wireless backhaul connection path is between the child gNodeB 1512 and the gNodeB-3 1522. The child gNodeB 1512 selecting which of the backhaul connection paths to utilize for different user equipment devices and/or data streams. In some embodiments, the IAB parameters provided by the multi-parent function node 1518 includes updated routing criteria to be applied to new data streams by the child gNodeB 1512. The updated routing criteria being used to determine which of the multiple backhaul connection paths of the child gNodeB 1512 to utilize for the new data streams. At this point, the multi-parent IAB function node 1518 continuously monitors the status of the conditions at the child gNodeB 1512 and its neighbor wireless base stations including parent gNodeB-1 1514, gNodeB-2 1520 and gNodeB-3 1522 as well as the IAB wireless backhaul connection paths established in the system and makes determinations as to how to dynamically and in real time re-configure the wireless backhaul network to accommodate changes in the backhaul needs of the child gNodeB 1512 along with its neighbor wireless base stations.

FIG. 16 which comprises the combination of FIGS. 16A, 16B, 16C, 16D, 16E, and 16F illustrates an exemplary method 1600 in accordance with an embodiment of the present invention. FIG. 16A illustrates the steps of the first part of an exemplary method 1600 in accordance with an embodiment of the present invention. FIG. 16B illustrates the steps of the second part of an exemplary method 1600 in accordance with an embodiment of the present invention. FIG. 16C illustrates the steps of the third part of an exemplary method 1600 in accordance with an embodiment of the present invention. FIG. 16D illustrates the steps of the fourth part of an exemplary method 1600 in accordance with an embodiment of the present invention. FIG. 16E illustrates the steps of the fifth part of an exemplary method 1600 in accordance with an embodiment of the present invention. FIG. 16F illustrates the steps of the sixth part of an exemplary method 1600 in accordance with an embodiment of the present invention.

For explanatory purposes the exemplary method 1600 will be explained in connection with the exemplary communications system 1000 illustrated in FIG. 10 although it should be understood that the method may be implemented using other systems and other system configurations then those illustrated in FIG. 10. While it will be readily understood that additional steps and signaling are performed in connection with communicating information, messages, protocol data units, and packets between devices, the method 1600 focuses on and discusses the steps and signaling for understanding the invention.

The method 1600 shown in FIG. 16 will now be discussed in detail. The method starts in start step 1602 shown on FIG. 16A with the nodes and devices in the system, e.g., system 1000, being initialized and becoming operational. Operation proceeds from step 1602 to step 1604.

In step 1604, an Integrated Access and Backhaul (IAB) management node (e.g., IAB management node 1088 of system 1000) receives user equipment device connection information for a first wireless base station (wireless base station IAB Node 2 1010 of system 1000). The first wireless base station is an IAB child node having a first wireless backhaul connection path (e.g., IAB wireless backhaul connection path/link 1052) to a second wireless base station (wireless base station IAB donor 1 1002 of system 1000). The second wireless base station is a parent IAB donor with a fiber-optic or wired backhaul connection (e.g., fiber-optic backhaul link 1040 of system 1000) to a core network (e.g., core network 1084 of system 1000). In some embodiments, the user equipment device connection information is user equipment device connection request information. In some such embodiments, the user equipment device connection request information is a first Physical Random Access Channel (PRACH) request count indicating the number of PRACH request messages are received by the first wireless base station for a first period of time. The user equipment connection for the first wireless base station is received by the IAB management node from the first wireless base station via the core network (e.g., core network 1084) and Operations Support System (OSS) (e.g., OSS 1086 of system 1000). In some embodiments, the first wireless base station reports its user equipment connection information on regular basis to the OSS. Operation proceeds from 1604 to step 1606.

In step 1606, the IAB management node, determines whether or not a second wireless backhaul connection path is to be established for the first wireless base station based on the received user equipment connection information for the first wireless base station. In some embodiments, step 106 includes one or more sub-steps 1608 and 1610. In sub-step 1608, the IAB management node, monitors the received user equipment device connection information (e.g., user equipment device connection request information) for the first wireless base station to determine if the number of connection requests (e.g., a first count of PRACH requests) received by the wireless base station during a first period of time exceeds a first threshold value. In sub-step 1610, in response to determining, the number of connection requests (e.g., the first count of PRACH requests) received from user equipment devices by the first wireless base station during the first period of time exceeds the first threshold value, the IAB management node determines that the second wireless base station connection path is to be established. Operation proceeds from step 1606 to step 1612.

Figure 13:
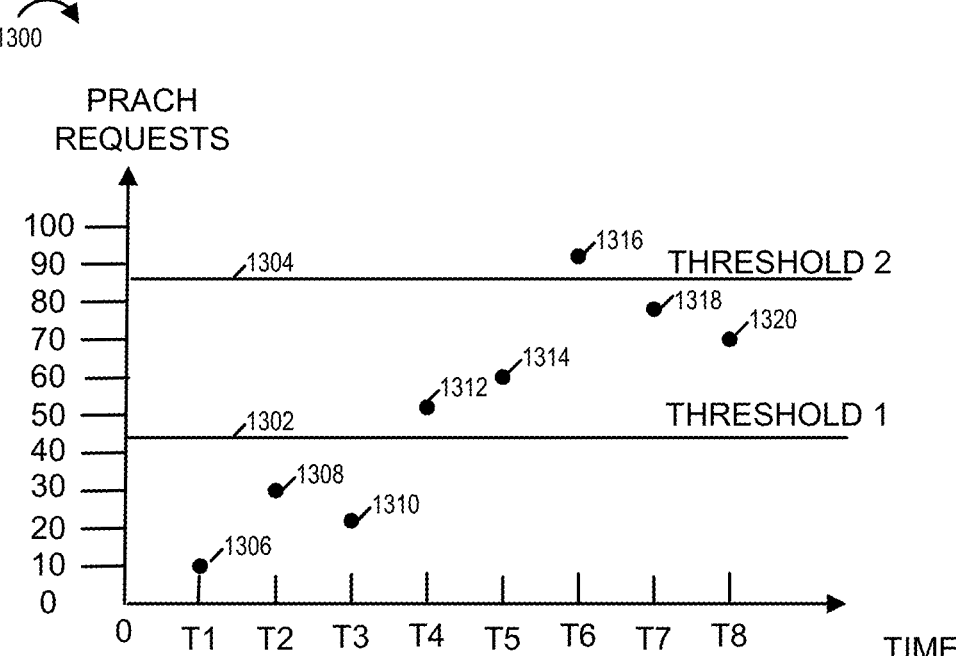
FIG. 13 illustrates a graph plotting the Physical Random Access Channel (PRACH) requests received by a wireless base station versus time.

FIG. 13 illustrates a graph showing the number of PRACH requests received from user equipment devices at a wireless base station vs. time. Dot 1306 represents the count or number of PRACH requests received by the wireless base station from time 0 to T1 which is 10. Dot 1308 represents the count or number of PRACH requests received by the wireless base station from time T1 to T2 which is 30 PRACH requests. Dot 1310 represents the count or number of PRACH requests received by the wireless base station from time T2 to T3 which is 20 PRACH requests. Dot 1312 represents the count or number of PRACH requests received by the wireless base station from time T3 to T4 which is 50 PRACH requests. Dot 1314 represents the count or number of PRACH requests received by the wireless base station from time T4 to T5 which is 60 PRACH requests. Dot 1316 represents the count or number of PRACH requests received by the wireless base station from time T5 to T6 which is 90 PRACH requests. Dot 1318 represents the count or number of PRACH requests received by the wireless base station from time T6 to T7 which is 80 PRACH requests. Dot 1320 represents the count or number of PRACH requests received by the wireless base station from time T7 to T8 which is 70 PRACH requests. In this example, the IAB management node uses the threshold 1 count value 1302 which is 45 PRACH requests and the threshold 2 count value 1304 of 85 PRACH requests to make decisions on the number of wireless backhaul connection paths the wireless base station needs to provide wireless services to the user equipment devices. For example, when the number of PRACH requests received by the wireless base station exceeds the first threshold, the IAB management node may, and in some embodiments does, make the determination to add another wireless backhaul connection path for the wireless base station. This would occur for example at time T4 when the number of PRACH requests went from 20 at time T3 to 50 at time T4. When the number of PRACH requests exceeds the threshold 2, the IAB backhaul management node may make the determination to add an additional wireless backhaul connection path for the wireless base station. Similarly, when the number of PRACH requests falls below the threshold 2 value as occurred for the time period of T6 to T7 when the PRACH request count went from 90 to 80 PRACH requests, the IAB management node, may and in some embodiments does, determine to reduce the number of wireless backhaul connection paths for the wireless base station by terminating one of its wireless backhaul connection paths. In various embodiments, the PRACH request count for a period of time is used in conjunction with other information (e.g., wireless base station loading, wireless backhaul capacity already provided by existing wireless backhaul connection paths, etc.) in determining modify (e.g., add and/or terminate) one or more wireless backhaul connection paths for the wireless base station.

In step 1612, in response to determining to establish a second wireless backhaul connection path for the first wireless base station, sending, by the IAB management node, a message to establish the second wireless backhaul connection path. Operation proceeds from step 1612 via connection node 1614 to step 1616. Step 1616 part A is shown on FIG. 16B and step 1616 part B is shown on FIG. 16C. In step 1616, the IAB management node selects the third wireless base station (e.g., wireless base station IAB donor 2 1004 of system 1000) from a plurality of neighbor wireless base stations (e.g., wireless base station IAB Donor 2 1004, . . . , IAB Donor N 1006 which are neighbors to wireless base station IAB node 2 1010 of system 1000). The neighbor wireless base stations are neighbors to the first wireless base station (e.g., the first wireless base station is within the coverage area of each of the neighbor wireless base stations). Step 1616 includes one or more sub-steps 1618, 1620, 1622, 1632, 1634, 1636, 1638, 1640 and 1642.

In sub-step 1618, the IAB management node after determining to establish the second wireless backhaul connection path for the first wireless base station and prior to sending the message to establish the second wireless backhaul connection, selects the third wireless base station from a plurality of neighbor wireless base stations based on measured backhaul connection path performance (e.g., by instructing/ requesting neighbor wireless base stations perform performance tests on backhaul connection paths before making the selection e.g., before and/or after making the determination to add an additional wireless backhaul link to the first wireless base station) and/or based on predicted backhaul connection path performance. In some embodiments, the backhaul connection paths are the wired or fiber-optic backhaul connection paths between the neighbor wireless base station and the core network and/or OSS. For example do the wired and/or fiber-optic backhaul connection path of the neighbor wireless base station have sufficient backhaul capacity/bandwidth available to meet the additional backhaul capacity/bandwidth needs of the first wireless base station. In some embodiments, the backhaul connection path is a wireless connection path between the neighbor wireless base station and the first wireless base station which is to be utilized for the wireless backhaul connection path for the first wireless base station. In some embodiments, the backhaul connection path is the backhaul connection path from the first wireless base station to the core network or OSS via the neighbor wireless base that is traversing the wireless connection path between the first wireless base station and the neighbor wireless base station and the wired or fiber-optic backhaul connection path between the neighbor wireless base station and the core network and/or OSS.

In sub-step 1620, the IAB management node selects the third wireless base station from a plurality of neighbor wireless base stations based on historical performance characteristics and/or metrics of wireless backhaul connection paths previously provided by neighbor wireless base stations to the first wireless base station.

In sub-step 1622, the IAB management node selects the third wireless base station from a plurality of neighbor wireless base stations based on measured backhaul connection path performance metrics. In some embodiments, the sub-step 1622 includes one or more sub-steps 1624, 1626, 1628, and 1630.

In sub-step 1624, the IAB management node sends messages to one or more neighbor wireless base stations requesting the one or more neighbor wireless base stations execute wireless backhaul connection path performance tests on a wireless backhaul connection path between the neighbor wireless base station which received the message and the first wireless base station.

In sub-step 1626, the IAB management node receives measured wireless backhaul connection path performance results from the one or more neighbor wireless base stations. The one or more neighbor wireless base stations including the third wireless base station.

In sub-step 1628, the IAB management node generates and/or determines the measured wireless backhaul connection path performance metrics from the measured wireless backhaul connection path results.

In sub-step 1630, the IAB management node compares the generated wireless backhaul connection path performance metrics for each wireless backhaul connection path to each other and/or a set of performance criteria for the second wireless backhaul connection path to determine which neighbor wireless base station can provide a wireless backhaul connection path which best meets or exceeds a set of performance criteria for the second wireless backhaul connection path.

In sub-step 1632 shown on FIG. 16C in step 1616 part B, the IAB management node sends instructions to the first wireless base station and/or one or more neighbor wireless base stations to execute performance tests on wireless backhaul connection paths established between the first wireless base station and the one or more neighbor wireless base stations.

In sub-step 1634, the IAB management node sends to the first wireless base station and/or one or more neighbor wireless base stations instructions to execute performance tests on backhaul connection paths established between the first wireless base station and the core network via the one or more neighbor wireless base stations.

In sub-step 1636, the IAB management node receives the results of the performance tests from the first wireless base station and the one or more neighbor wireless base stations which executed the performance tests.

In sub-step 1638, the IAB management node, makes the selection of the third wireless base station from the plurality of neighbor wireless base stations based on a wireless backhaul connection path score of the second wireless backhaul connection path between the first wireless base station and the third wireless base station. In some embodiments, the IAB management node, makes the selection of the third wireless base station from the plurality of neighbor wireless base stations based on a backhaul connection path score generated from historical metrics of previous wireless backhaul connection connections between the third wireless base station and the first wireless base station and/or performance metrics of the current performance status of the backhaul connection between the third wireless base station and the core network (e.g., whether the backhaul fiber-optic or wired connection between the third wireless base station and the core network has the available capacity/bandwidth as well as downlink and uplink throughput and latency characteristics best matching the determined needs of the first wireless base station.

In sub-step 1640, the IAB management node makes the selection of the third wireless base station from the plurality of neighbor wireless base stations based on wireless backhaul connection path scores for potential and/or actual wireless backhaul connection paths available for the first wireless base station. In some embodiments, the IAB management node generates the wireless backhaul connection path scores for potential wireless backhaul connection path based on historical information (e.g., historical performance metrics) about prior wireless backhaul connection paths provided by the neighbor wireless base station for the first wireless base station. In some embodiments, the potential wireless backhaul connection path are not yet established while the actual wireless backhaul connection paths have been established but only for testing purposes and not yet to be utilized for actual wireless backhaul data traffic. In some embodiments, the wireless backhaul connection path score for actual wireless backhaul connection paths is generated by the IAB management node using the results of performance tests executed on the actual wireless backhaul connection paths at or immediately before the selection and/or historical information (e.g., historical performance metrics for wireless backhaul connection paths previously provided to the first wireless base station). In some embodiments, prior to making said selection, the IAB management node, generates a wireless backhaul connection path score for potential (i.e., not yet established) and/or actual (i.e., established for performance testing and evaluation prior to usage for actual data transmission) wireless backhaul connection paths available for the first wireless base station. In some embodiments, prior to making said selection, the IAB management node, generates a backhaul connection path score for available backhaul connection paths as a weighted average of a set of performance metrics (or a normalized set of performance metrics). In some embodiments, the wireless backhaul connection path score is calculated or generated as a weighted sum in accordance with the following formula: wireless backhaul connection path score=(K1*an amount of backhaul capacity that the neighbor wireless base station can provide)+(K2*a number of Physical Random Access Channel (PRACH) requests received by the neighbor wireless base station during a predetermined period of time (e.g., first period of time)+(K3*a number of user equipment devices connected to or being serviced by the neighbor wireless base station)+(K4*a distance from the first wireless base station to the neighbor wireless base station)+(K5*wireless frequency band or bands supported at the neighbor wireless base station for a backhaul connection between the first wireless base station and the neighbor wireless base station)+(K6*channel or channels available for use for a backhaul connection between the first wireless base station and the neighbor wireless base station)+(K7*uplink throughput available at the neighbor wireless base station)+ (K8*downlink throughput available at the neighbor wireless base station)+(K9*amount of loading at the neighbor wireless base station)+(K10*average uplink message latency for messages communicated from first wireless base station to the neighbor wireless base station)+(K11*average downlink message latency for messages communicated from the neighbor wireless base station to the first wireless base station)+(K12*average uplink message latency for messages communicated from first wireless base station to the core network via the neighbor wireless base station)+ (K13*average downlink message latency for messages communicated from the core network to the first wireless base station via the neighbor wireless base station), where K1, K2, K3, K4, K5, K6, K7, K8, K9, K10, K11, K12, and K13 are weighting factors that are adjusted to take into account the importance of each of the items in the particular instance. For example, in some instances K11 and K13 weighting factors for downlink latency are set to zero so they have no affect on the backhaul connection path score generated and backhaul connection path selected. This may be down when the traffic is uplink dominated at the first wireless base station because the first wireless base station is servicing a large number of sensor devices uploading sensor data. Similarly the K values may be adjusted to a higher value if an item is more important such as K10 and K12 putting more weight on the importance of the uplink latency of the backhaul connection path for the backhaul connection path score which is generated. Each of the parameters and/or metrics to which a weighting factor is applied may be assigned a numerical value and/or normalized.

In sub-step 1642, the IAB management node selects the third wireless base station from a plurality of neighbor wireless base stations based on one or more of the following: (i) an amount of backhaul capacity that the neighbor wireless base station can provide via a wireless backhaul connection path and/or neighbor's backhaul connection path to the core network, (ii) a number of PRACH requests received by the neighbor wireless base station during a predetermined period of time (e.g., a first period of time), (iii) a number of user equipment devices connected to and/or being serviced by the neighbor wireless base station, (iv) distance from the first wireless base station to the neighbor wireless base station, (v) wireless frequency band or bands supported at the neighbor wireless base station for a wireless backhaul connection between the first wireless base station and the neighbor wireless base station, (vi) channel or channels available for use for a wireless backhaul connection between the first wireless base station and the neighbor wireless base station, (vii) uplink throughput for the wireless backhaul connection path from first wireless base station to the neighbor wireless base station, (viii) downlink throughput for the wireless backhaul connection path from the neighbor wireless base station to the first wireless base station, (ix) amount of loading being experienced by the neighbor wireless base station, (x) average uplink message latency for messages communicated from the first wireless base station to the neighbor wireless base station, (xi) average downlink message latency for messages communicated from the neighbor wireless base station to the first wireless base station, (xii) average uplink message latency for messages communicated from the first wireless base station to the core network via the neighbor wireless base station, and (xiii) average downlink message latency for messages communicated from the core network to the first wireless base station via the neighbor wireless base station. Operation proceeds from step 1616 via connection node B 1644 to step 1646 shown on FIG. 16D.

In step 1646, the IAB management node determines session establishment information (e.g., frequency band information, channel information, bandwidth information (e.g., bandwidth part information), and/or Internet Protocol (IP) address information for the first wireless base station and the third wireless base station) for the second wireless backhaul connection path (e.g., wireless backhaul connection path/link 1054 of system 1000) between the first wireless base station (e.g., wireless base station IAB node 2 1010 of system 1000) and the third wireless base station IAB donor 2 1004 of system 1000). In some embodiments, step 1646 includes one or more sub-steps 1648, 1650, 1652.

In sub-step 1648, the IAB management node allocates and/or obtains an allocation of bandwidth/spectrum (e.g., licensed spectrum (Citizens Broadband Radio Service (CBRS) Priority Access License (PAL) spectrum, unlicensed spectrum (e.g., CBRS General Authorized Access (GAA) spectrum) or a combination of licensed and unlicensed spectrum (e.g., CBRS PAL and GAA spectrum) from a Spectrum Access System) and one or more channels to be utilized for the second wireless backhaul connection path between the first wireless base station and the third wireless base station.

In sub-step 1650, the IAB management node, determines IAB parameters for establishing an IAB backhaul connection path from the first wireless base station to the third wireless base station. The IAB parameters include one or more of the following: (i) information identifying the first wireless base station as the child IAB node and the third wireless base station as the parent IAB donor, and message routing information.

In sub-step 1652, the IAB management node determines instructions/rules for the first wireless base station on how to make routing decisions for data streams based on the available wireless backhaul connection paths (e.g., how to determine whether a data stream is to be routed via the first wireless backhaul connection path or the second wireless backhaul connection path). For example, data streams from sensors are to be routed using the second wireless backhaul connection path as the IAB management node has determined it has a higher uplink throughput and/or capacity than the first wireless backhaul connection path. Another example, is for the first wireless base station to use a round robin selection of available wireless backhaul connection paths as the IAB management node has determined the available wireless backhaul connection paths have similar performance characteristics and similar loading conditions on the first and second wireless base stations. In another example, the first wireless base station may be, and in some embodiments is, instructed that data streams of video applications are to be routed via the first wireless backhaul connection path as the IAB management node has determined that the first wireless backhaul connection path has higher downlink throughput and/or capacity than the second wireless backhaul connection path.

The second wireless connection path between the first wireless base station and the third wireless base station is an IAB connection path. The third wireless base station is a second parent IAB donor to the first wireless base station which is a child IAB node having multiple parent IAB donors (e.g., wireless base station IAB donor 1 1002 and wireless base station IAB donor 2 1004). The third wireless base station (e.g., wireless base station IAB donor 2 1004 of system 1000) having a fiber-optic or wired backhaul connection (e.g., fiber-optic communications backhaul link 1044 of system 1000) to the core network (e.g., core network 1084 of system 1000). Operation proceeds from step 1646 to step 1654.

In step 1654, the IAB management node communicates the determined session establishment information for the second wireless backhaul connection path to the first wireless base station and the third wireless base station. Operation proceeds from step 1654 to step 1656.

In step 1656, the second wireless backhaul connection path is established between the first wireless base station and the third wireless base station using the communicated session establishment information. The second wireless backhaul connection path is an IAB backhaul connection path. Operation proceeds from step 1656 to step 1658.

In step 1658, the first wireless base station utilizes the second wireless backhaul connection path to communicate data from the first wireless base station to the core network via the third wireless base station. In some embodiments, step 1658 includes sub-step 1660. In sub-step 1660, the first wireless base station communicates the data to the third wireless base station in IAB backhaul adaption protocol packets via the second wireless backhaul connection path. Operation proceeds from step 1658 via connection node C 1662 to step 1664 shown on FIG. 16E.

In step 1664, the IAB management node continuously monitors the performance of the wireless backhaul connection paths in the system (e.g., system 1000) and the conditions at the wireless base stations (e.g., IAB nodes and IAB donors of the system). In some embodiments, step 1664 includes one or more sub-steps 1668, 1670, 1672, 1674, 1676 and 1678.

In sub-step 1668, the IAB management node requests the OSS (e.g., OSS 1086 of system 1000) provide information/metrics on wireless backhaul connection paths including the first and second wireless backhaul connection paths for the first wireless base station and wireless base station conditions including the conditions at the first wireless base station, the second wireless base station, and the third wireless base station (e.g., number of UE connection requests received by the each wireless base station in a given period of time, loading on the wireless base station, congestion at the wireless base station or backhaul connection paths utilized by the wireless base station).

In sub-step 1670, the IAB management node receives information/metrics on wireless backhaul connection paths including the first and second wireless backhaul connection paths for the first wireless base station and wireless base station conditions including the conditions at the first wireless base station, the second wireless base station, and the third wireless base station (e.g., number of UE connection requests received by the each wireless base station in a given period of time, loading on the wireless base station, congestion at the wireless base station or backhaul connection paths utilized by the wireless base station).

In sub-step 1672, the IAB management node requests wireless base stations perform wireless backhaul connection path performance tests and report results to the IAB management node.

In sub-step 1674, the IAB management node receives the wireless backhaul connection path performance results from the wireless base station which performed the requested performance tests.

In sub-step 1676, the IAB management node generates performance metrics for the wireless backhaul connection paths including the first and second wireless backhaul connection paths for the first wireless base station from the information/metrics and/or performance test results received from the OSS and/or the wireless base stations.

In sub-step 1678, the IAB management node stores the generated performance metrics for the wireless backhaul connection paths including the first and second wireless backhaul connection paths generated from the information/metrics and/or performance test results received from the OSS and/or the wireless base stations along with information on the conditions at the wireless base stations and the time the tests were performed and/or the time the metrics were generated and/or collected.

Operation proceeds from step 1664 via connection node D 1680 to step 1682 shown on FIG. 16F. In step 1682, the IAB management node dynamically and in real time or near real time modifies the wireless backhaul connection paths in the system to increase network backhaul performance and/or efficiency in response to the monitored performance of the wireless backhaul connections and wireless base station conditions/status. In some embodiments step 1682 includes one or more sub-steps 1684, 1686, 1688, 1690, and 1692.

In sub-step 1684, the IAB management node generates instructions for one or more IAB donors and/or IAB child nodes to perform one or more of the following operations: (i) implement a new IAB wireless backhaul connection path, (ii) terminate an existing IAB wireless backhaul connection path, (iii) transfer a data stream from one IAB wireless backhaul connection path to a different IAB wireless backhaul connection path, and (iv) dedicate additional bandwidth capacity to an existing IAB wireless backhaul connection path, and (v) reduce bandwidth capacity for an existing IAB wireless backhaul connection path.

In sub-step 1686, the IAB management node sends the generated instructions to the one or more IAB donors and/or IAB child nodes for implementation.

In sub-step 1688, the IAB management node determines based on information/metrics generated and/or obtained from the continuously monitoring including the monitoring of the first wireless backhaul connection path, the second wireless backhaul connection path, the conditions at the first wireless base station, the conditions as the second wireless base station, and the conditions at the third wireless base station, whether or not to add an additional wireless backhaul connection for the first wireless base station or terminate an existing backhaul connection path for the first wireless base station (e.g., the first wireless backhaul connection path or the second wireless backhaul connection path). Exemplary conditions at wireless base stations include one or more of the following: UE connection request information for the first wireless base station, UE connection request information for the second wireless base station, UE connection request information for the third wireless base station, cell or base station loading at the first wireless base station, cell or base station loading at the second wireless base station, and cell or base station loading at the third wireless base station.

In sub-step 1690, in response to determining to add an additional wireless backhaul connection path, the IAB management node performs the following operations: (i) selecting a fourth wireless base station (e.g., wireless base station IAB Donor N 1006 of system 1000) to be an IAB parent donor for the first wireless base station (e.g., wireless base station IAB node 2 1010), and (ii) sending one or more messages to establish an additional wireless backhaul connection path (e.g., IAB wireless backhaul connection path/link 1056 of system 1000' shown on FIG. 11) for the first wireless base station between the first wireless base station and the selected fourth wireless base station. The first wireless base station is a child of the fourth wireless base station which is a parent to the first wireless base station as shown in FIG. 11. The system 1000' shown in FIG. 11 being the system 1000 after the addition of the wireless backhaul connection path 1056 between the wireless base station IAB node 2 1010 and the wireless base station IAB donor N 1006. The wireless base station IAB donor N 1006 being connected to the core network via a fiber optic communications link 1044.

In sub-step 1692, the IAB management node in response to determining to terminate the first wireless backhaul connection path, sends instructions to the first wireless base station and/or the second wireless base station to terminate the first wireless backhaul connection path 1692. Operation proceeds from step 1682 via connection node C 1662 to step 1662 shown on FIG. 16E where the method continues as previously described.

Additional embodiments of invention will now be discussed in which different and/or additional features are implemented. In various embodiments of the method 1600, the IAB management node generates the messages and/or instructions the IAB management node sends to other elements of the system (e.g., instructions to perform performance tests). In some embodiments of the method 1600, in step 1616 includes the following sub-steps: (i) sending backhaul performance test scripts to the OSS, (ii) implementing, by the OSS, the backhaul performance test scripts to determine the backhaul capacity available at one or more of the plurality of neighbor wireless base stations (e.g., wired or fiber-optic backhaul capacity available on the neighbor wireless base stations backhaul connection path), (iii) determining from the results of the backhaul connection performance tests reported by the OSS to the IAB management node which neighbor wireless base stations have the available backhaul capacity required for the first wireless base station, (iv) selecting one of the neighbor wireless base stations that have the available backhaul capacity required for the first wireless base station to provide the second wireless backhaul connection. And, after establishing the second wireless backhaul connection path confirming via backhaul performance tests from the first wireless base station to the third wireless base station and/or the core network that the backhaul services (e.g., backhaul capacity, downlink and uplink throughput and transmission latency) meet the needs of the first wireless base station.

In some embodiments in step 1616 of the method 1600, the selection of the third wireless base station from the plurality of neighbor wireless base stations (e.g., neighbor IAB donors) is made based on one or more of the following: (i) which neighbor wireless base station is lightly loaded (e.g., does not have load over a certain threshold, the threshold being set by an operator based on the operator's policy, e.g., less than 50% loading so that the wireless backhaul connection path does not interfere with wireless access services provided by the neighbor wireless base station to user equipment devices in its coverage area), (ii) proximity of the neighbor wireless base station to the first wireless base station, e.g., by using the distance and frequency band as a way to estimate the quality of the link with shorter distances being of higher quality and more desirable and longer distances being of lower quality and less desirable will taking into account the characteristics of the frequency band being utilized for the wireless backhaul connection path (e.g., frequency band will determine transmission characteristics), and (iii) which neighbor wireless base station will cause the least or no interference (e.g., spectral interference with other transmissions) while using a given wireless channel and/or band for the wireless backhaul connection path between the neighbor wireless base station and the first wireless base station. In some embodiments of the invention, the OSS will look at loading on a parent IAB donor, e.g., how much the parent IAB donor is currently loaded and how much backhaul bandwidth/capacity it can offer while maintaining/reserving some of its available bandwidth for potential increasing of backhaul demand from user equipment devices within its cover area. Initially, an estimated based on calculated load can be utilized and later historical network data collected from the network metrics can be used in determining amount of available bandwidth an IAB donor can make available based on its current conditions including loading.

In some embodiments, the first wireless base station has routing criteria or is provided routing criteria for user equipment device data streams when the first wireless base station has multiple backhaul wireless connection paths to different IAB donor wireless base stations. The routing criteria will be applied by the first wireless base station to user equipment device backhaul traffic (e.g., data streams) so that the user equipment device's service level agreement is met or the first wireless base station uses it best effort to meet service level agreement as closely as possible (e.g., UE's with sessions requiring a low latency will be connected to a backhaul connection path with the least amount of latency connection from the first wireless base station to the core network). Similarly, for user equipment device's with backhaul traffic requiring higher throughput, the first wireless base station will utilize the backhaul connection path that is capable of providing the requisite throughput. In some embodiments, once a backhaul connection path is established for a user equipment device data stream the backhaul connection path remains the same until the data stream is terminated while in some other embodiments the backhaul connection path may be transferred to a backhaul connection path that better matches the requirements of the data stream.

FIG. 12 illustrates a table 1200 which is a record including information about neighbor wireless base stations to a first wireless base station and wireless backhaul connection paths between the first wireless base station and the neighbor wireless base stations. As will be described in detail below the table 1200 includes a listing of neighbor wireless base stations to a first wireless base station and information about the neighbor wireless base stations and performance metrics for wireless backhaul connection path(s) between the neighbor wireless base station and the first wireless base station.

The exemplary table 1200 may be included in memory in IAB backhaul management node and/or in a storage device such as a data base system or data repository accessible to the OSS or the IAB backhaul management node. Table 1200 includes columns 1202, 1204, 1206, 1208, 1210, 1212, 1214 and rows 1216, 1218, 1220, 1222, 1224, and 1226. The entries in row 1216 are labels indicating the information contained in each column. Entries in column 1202 are the identity of the neighbor wireless base station and cell sector (entry row 1216, column 1202). Entries in column 1204 (Distance (m) entry row 1216, column 1204) are the distances between the neighbor wireless base station identified in the same row and first wireless base station in meters. Entries in column 1206 (channels entry row 1216, column 1206) are channels available at the neighbor wireless base station cell sector identified in the same row on which a wireless backhaul connection path can be established using the radio frequency band identified in the same row between the neighbor wireless base station and the first wireless base station. Entries in column 1208 (average latency (ms) entry row 1216, column 1208) are the average latency in milliseconds for backhaul connection paths using between the identified wireless base station cell sector identified in the same row when using the identified channels and frequency band on the same row. The entries in column 1210 (throughput (TP) downlink/uplink (DL/UL) (Mbps) entry row 1216 column 1210) correspond to the throughput available downlink/uplink for a wireless backhaul connection between the neighbor wireless base station cell sector and the first wireless base station using the channels/frequency band designated in the same row. The entries in column 1212 (cell loading % entry row 1216, column 1212) is the amount of current loading (e.g., number of UEs being serviced by the neighbor wireless base station cell sector identified in the same row. The entries in the column 1214 (band entry row 1216, column 1214) are the frequency bandwidths used for a wireless backhaul connection path between the first wireless base station and the neighbor wireless base station identified in the same row.

In the table NWB stands for neighbor wireless base station. The entries in row 1218 correspond to neighbor wireless base 2. The entries in row 1220 also correspond to neighbor wireless base 2. The entries in row 1222 correspond to neighbor wireless base station 3. The entries in row 1224 correspond to neighbor wireless base station 4. The entries in row 1226 ( . . . ) indicate the table includes additional neighbor wireless base station information and the entries in rows 1218, 1220, 1222, and 1224 are only exemplary. Each of the neighbor wireless base stations are IAB donors. The entries in row 1218 as stated above correspond to neighbor wireless base station 2 which is a neighbor to the first wireless base station. The information in row 1218 provides information on IAB wireless backhaul connection paths between the first wireless base station and the neighbor wireless base station 2 for a backhaul connection path on the CBRS band (entry row 1218, column 1214) and for channels 1, 2, 3, (1, 2, 3 combined) (entry row 1218, column 1206). The row 1218 also provides cell loading information on the neighbor wireless base station 2 as 50% (entry row 1218, column 1212) and the neighbor wireless base station 2 is a distance of 300 meters from the first wireless base station (entry row 1218, column 1204). A backhaul connection path between the first wireless base station and the neighbor wireless base station 2 using CBRS frequency band (entry row 1218, column 1214) and channel 1 (entry row 1218, column 1206) has an average latency of 100 ms (entry row 1218, column 1208) and throughput available downlink/ uplink of 50 (entry row 1218, column 1210). A backhaul connection path between the first wireless base station and the neighbor wireless base station 2 using CBRS frequency band (entry row 1218, column 1214) and channel 2 (entry row 1218, column 1206) has an average latency of 110 ms (entry row 1218, column 1208) and throughput available downlink/uplink of 52 (entry row 1218, column 1210). A backhaul connection path between the first wireless base station and the neighbor wireless base station 2 using CBRS frequency band (entry row 1218, column 1214) and channel 3 (entry row 1218, column 1206) has an average latency of 115 ms (entry row 1218, column 1208) and throughput available downlink/uplink of 48 (entry row 1218, column 1210). A backhaul connection path between the first wireless base station and the neighbor wireless base station 2 using CBRS frequency band (entry row 1218, column 1214) and combined channels 1, 2, and 3 (entry row 1218, column 1206) has an average latency of 113 ms (entry row 1218, column 1208) and throughput available downlink/uplink of 410 (entry row 1218, column 1210). The average latency values and throughput values are sometime historical values of previous backhaul connection paths between the first wireless base station and the neighbor wireless base station A cell sector. The information in row 1220 provides information on IAB wireless backhaul connection path between the first wireless base station and the neighbor wireless base station 2 for a backhaul connection path on the 60 GHz band (entry row 1220, column 1214) and for channel 4 (entry row 1220, column 1206). The row 1220 also provides cell loading information on the neighbor wireless base station 2 as 50% (entry row 1220, column 1212) and the neighbor wireless base station 2 is a distance of 300 meters from the first wireless base station (entry row 1220, column 1204). A backhaul connection path between the first wireless base station and the neighbor wireless base station 2 using 60 GHz frequency band (entry row 1220, column 1214) and channel 4 (entry row 1220, column 1206) has an average latency of 80 ms (entry row 1220, column 1208) and throughput available downlink/uplink of 80 (entry row 1220, column 1210). The information in the table 1200 for the neighbor wireless base station 3 in row 1222 and neighbor wireless base station 4 in row 1224 are read the way discussed in connection with neighbor wireless base station 2 discussed above.

Figure 17:
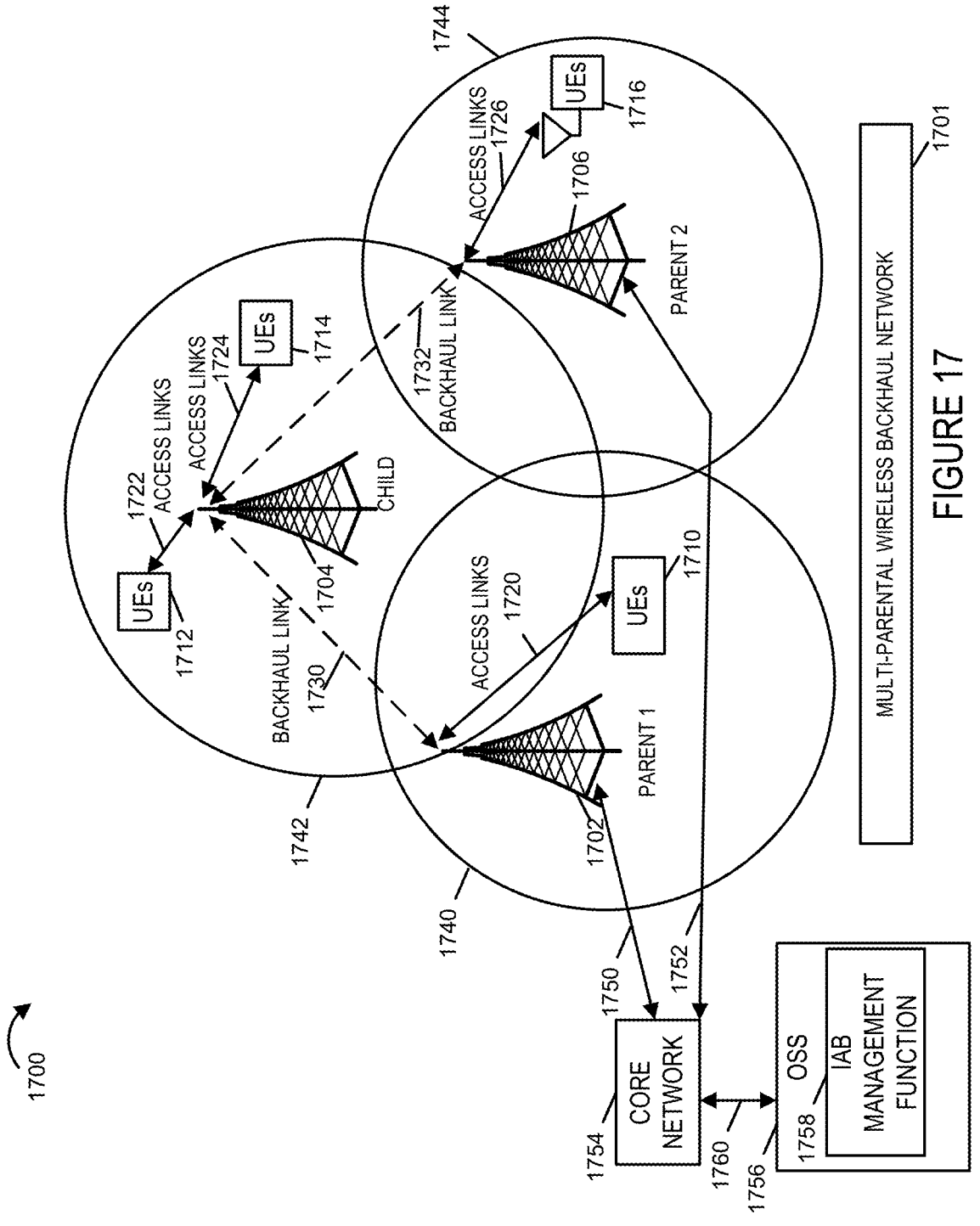
FIG. 17 illustrates another exemplary multi-parental backhaul wireless communications system in accordance with an embodiment of the present invention.

FIG. 17 illustrates another multi-parental wireless backhaul communications system 1700 in accordance with an embodiment of the present invention. The communications system 1700 includes a plurality of wireless base stations (i.e., wireless base station parent 1 1702, wireless base station child 1704, wireless base station parent 2 1706), a plurality of user equipment devices (e.g., wireless devices such as mobile devices, smartphones, laptops, tablets, mobile phones, etc.) (i.e., UEs 1710, UEs 1712, UEs 1714, UEs 1716), a core network 1754, an Operations Support System (OSS) 1756, and a plurality of communications links 1720, 1722, 1724, 1726, 1730, 1732, 1750, 1752, 1760. While for the sake of simplicity in explaining the invention system 1700 only illustrates three wireless base stations and a few wireless endpoint devices, it will be appreciated that system 1700 typically includes a large plurality of wireless base stations through which a large number of wireless devices, e.g., user equipment devices and stations, access the wireless network and through which the wireless devices are provided services.

The wireless base station parent 1 1702 has a wireless coverage area of 1740, the wireless base station child node has a coverage area 1742, and the wireless base station parent 2 has a coverage area of 1744. The wireless base station child 1704 is able to wirelessly communicate with the wireless base station parent 1 1702 and the wireless base station parent 2 1706. The communications links 1720, 1722, 1724, and 1726 are wireless access links. The wireless access links 1720 are used for communications between the user equipment devices 1710 and wireless base station parent 1 1702. The wireless access links 1722 are used for communications between the user equipment devices 1712 and wireless base station child 1704. The wireless access links 1724 are used for communications between the user equipment devices 1714 and wireless base station child 1704. The wireless access links 1726 are used for communications between the user equipment devices 1716 and the wireless base station parent 2 1716.

The communications links 1730 and 1732 are wireless backhaul communications links also referred to as wireless backhaul connection paths. The wireless backhaul communications link 1730 couples and/or connects the wireless base station child 1704 to the wireless base station parent 1 1702. The wireless backhaul communications link 1732 couples and/or connects the wireless base station child 1704 to the wireless base station parent 2 1706.

The communications links 1750 and 1752 are optical (e.g., fiber-optic) backhaul communications links. In some embodiments, the communications links 1750 and 1752 are wired backhaul communications links. The backhaul communications link 1750 connects and/or couples the wireless base station parent 1 1702 to the core network 1754. The backhaul communications link 1752 couples and/or connects the wireless base station parent 2 1706 to the core network 1754. The wireless base station child 1704 has no optical or wired backhaul communications link to the core network 1754 but relies on the wireless backhaul communications links established with other wireless base stations which have a non-wireless (e.g., wired or fiber-optic) backhaul communications link to the core network 1754 (e.g., wireless base station parent 1 1702 and wireless base station parent 2 1704) for communications with the core network 1754.

The communications link 1760 is typically a wired and/or optical communications link that couples the core network 1754 to the OSS 1756. The Operations Support System (OSS) 1756 includes an Integrated Access and Backhaul (IAB) management function which may be, and in some embodiments is, implemented on a node or server of the OSS 1756. In some embodiments, the IAB management function is implemented on a node, server or device separate from but coupled and/or connected to the OSS 1756. For example, in some embodiments the IAB management function is implemented on a node in the cloud.

For explanatory purposes, only three wireless base stations are shown in the system 1700 (one child and two parent wireless base stations). However, it should be understood that a large number of both parent and child wireless base stations are typically implemented.

An exemplary method embodiment of the invention will now be discussed in connection with the system 1700. Consider for example, the child wireless base station child 1704 of system 1700 as initially being connected to only one wireless base station parent (i.e., wireless base station parent 1 1720) to get backhaul to support the user equipment devices UEs 1712 and UEs 1714. However, as the UE connection requests, e.g., Physical Random Access Channel requests) come from multiple UEs indicative of the increased demand, the core network 1754 provides this information to the OSS 1756. The OSS 1756 (e.g., the IAB management function 1758 of the OSS 1756, based on this information determines if the load has exceeded a threshold, e.g., a threshold based on the wireless network's policy regarding wireless base station, cell or cell sector loading. The OSS 1756 (e.g., IAB management function 1758 of the OSS 1756) can then determine which one of the neighbor parent wireless base stations with a wired or optical connection to the core network 1754 can support the high demand on the child wireless base station 1704. The OSS 1754 (e.g., the IAB management function 1758 of the OSS 1754) will determine the lightly loaded sites (i.e., wireless base stations) from the neighbor parent wireless base stations and determine the channels/bands for a wireless backhaul connection path or link. This will allow the child site (i.e., wireless base station child 1704) to support additional user equipment load (e.g., the wireless base station child 1704 will be able to provide wireless services to additional user equipment devices and/or additional backhaul capacity to existing user equipment devices to which the wireless base station child 1704 is providing services). In this example, the OSS 1754 (e.g., the IAB management function 1758 of the OSS 1754) determines the wireless base station parent 1706 is lightly loaded and can provide the backhaul performance needed for the wireless base station child 1704. As a result, the OSS 1754 (e.g., the IAB management function 1758) determines that the wireless backhaul communications link 1732 should be implemented/established as well as the channels/bands for the wireless backhaul communications path 1732 and sends this information to the wireless base station child 1704 and the wireless base station parent 2 1706 which establish the wireless backhaul communications link 1732 using the information provided (e.g., channels/bands for the wireless backhaul communications link).

The wireless base stations of the system 1700 (e.g., wireless base station parent 1 1702, wireless base station child 1704, and wireless base station parent 2 1706) report PRACH requests and subsequent PRACH request counts regularly (e.g., on a regular periodic basis) A PRACH counter of the OSS 1756 (e.g., to the IAB management function 1758 of the OSS 1756) will maintain a count of the PRACH requests received during each reporting time period for each of the wireless base stations of the system 1700.

The OSS 1756 (e.g., the IAB management function 1758 of the OSS 1756) is aware of the neighbor wireless base stations and these reported PRACH counts will be used to determine potential parent wireless base stations depending on the load on the neighbor wireless base stations. The load will once again be determined by the OSS 1756 (e.g., the IAB management function 1758) for wireless base station child 1704 for example by the PRACH counts during time periods and trends on the other neighboring wireless base stations. The OSS 1756 will then takes actions to dynamically re-configure the backhaul communications links between the children wireless base stations and parent wireless base stations of the wireless network to make the network more efficient and able to support additional user equipment devices with better quality of service. For example, by adding additional wireless backhaul connections between child and parent wireless base stations when needed, terminating backhaul connection no longer needed and/or adjusting backhaul capacity on one or more established wireless backhaul links to adjust to changing traffic patterns and wireless base station loading conditions. In addition, the OSS 1756 (e.g., the IAB management function 1758) will support routing of traffic depending on latency and/or throughput requirements to ensure packets are efficiently routed through the appropriate parent wireless base station of the multiple parent wireless base stations providing backhaul connection services to the child wireless base station. For example, the wireless base station child 1704 will determine based on criteria provided by the OSS 1756 (e.g., IAB management function 1758 of the OSS 1756) or receive instructions from the OSS 1756 (e.g., IAB management function 1758 of the OSS 1756) as to which wireless backhaul link 1730 or 1732 to utilize for a data stream.

Figure 1:
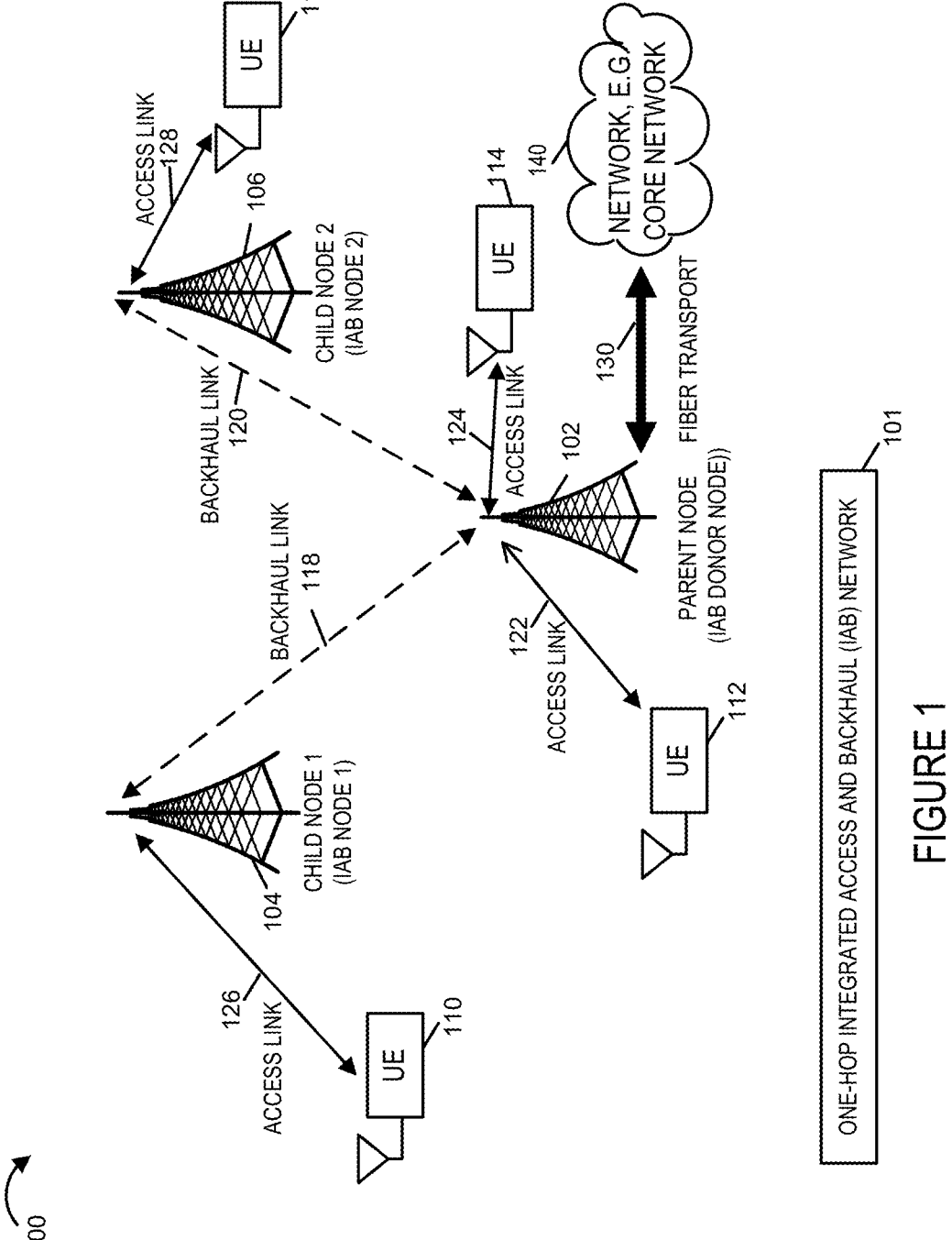
FIG. 1 illustrates an exemplary one-hop Integrated Access and Backhaul wireless communications network.
Figure 2:
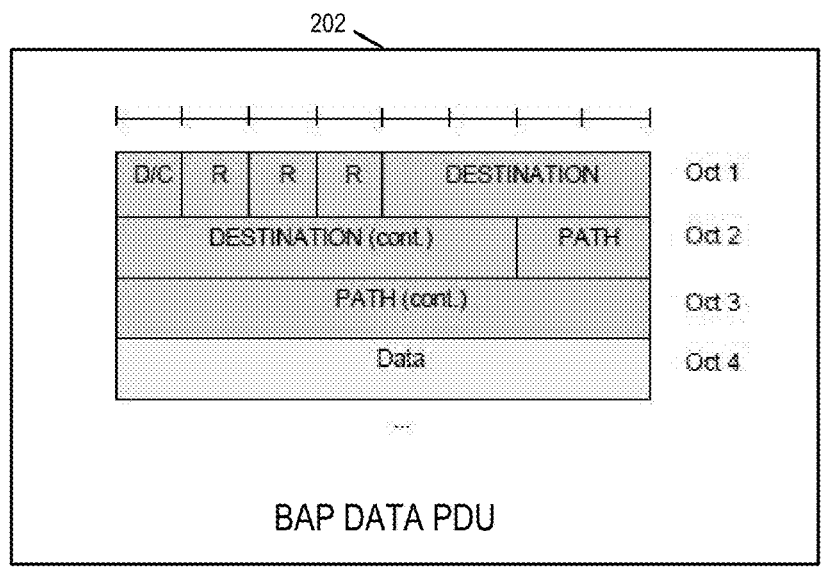
FIG. 2 illustrates the structure of the Backhaul Adaptation Protocol (BAP) layer and its position above the Radio Link Control Layer and the details of the structure of a Backhaul Adaptation Protocol-Protocol Data Unit
Figure 3:
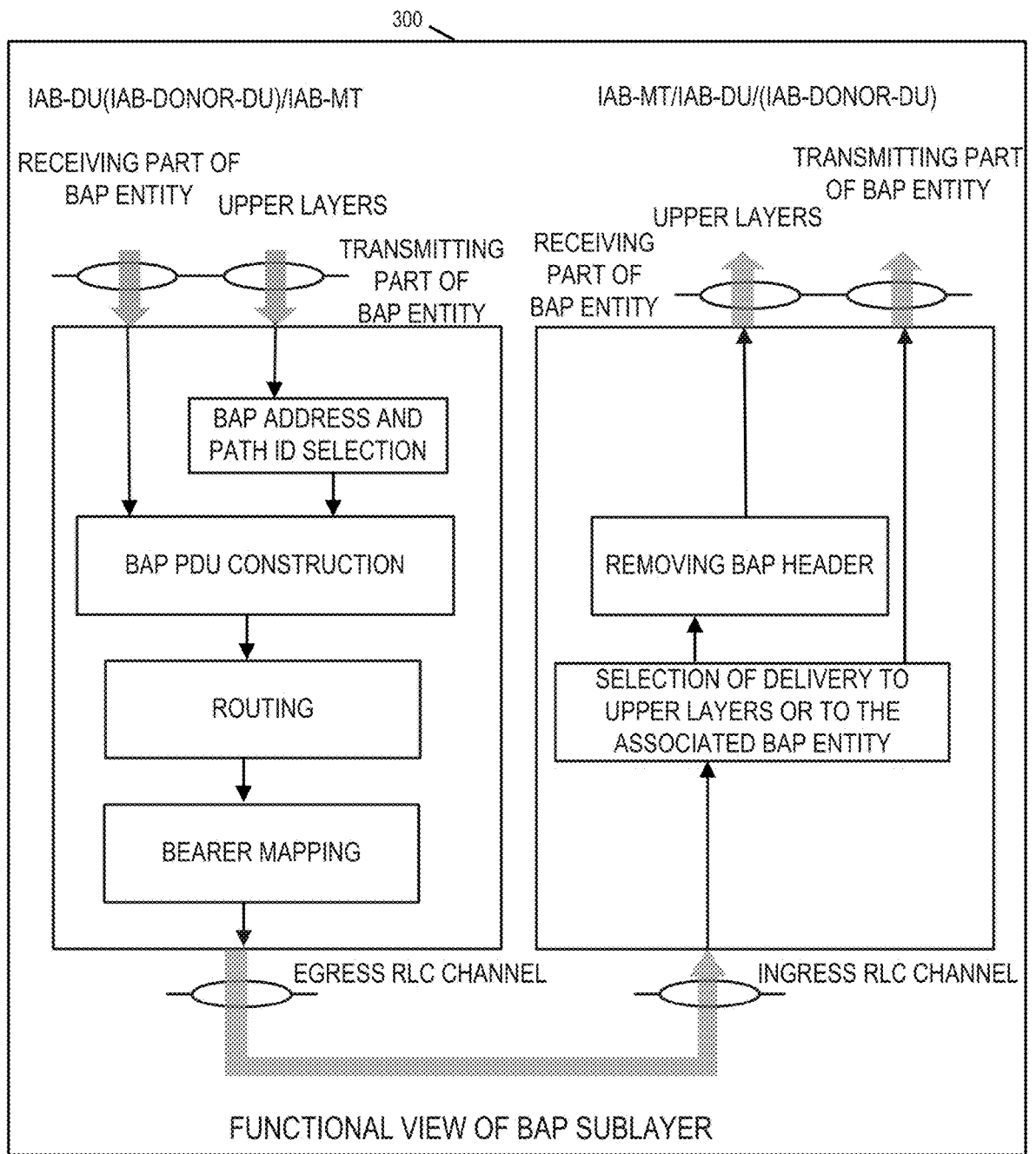
FIG. 3 illustrates a functional view of the Backhaul Adaptation Protocol sub-layer.

FIG. 3 discussed above shows a plot of PRACH requests vs. time. As the request count for a period of time exceeds the first threshold value, the OSS 1756 (e.g., the IAB management function 1758 of the OSS 1756) will work on (e.g., perform operations to) establishing one or more backhaul communications links with one or more neighbors. The OSS 1756 (e.g., the IAB management function 1758 of the OSS 1756) has previously established this with wireless base stations that usually trend low in terms of traffic or have dedicated wireless base station sectors to provide backhaul for wireless base station children.

The OSS 1756 (e.g., the IAB management function 1758 of the OSS 1756) will run performance test(s) (e.g., iperf test) to validate the network performance of the backhaul communications link(s) (e.g., throughput in downlink and uplink and latency). The OSS 1756 may send messages with instructions and/or requests to a child wireless base station and/or the parent wireless base stations to perform the performance tests and report the results. After the performance tests have been executed and results reported, the OSS 1756 (e.g., the IAB management function 1758 of the OSS 1756) updates records including information on the neighbor wireless base stations and backhaul communications links. The records may be kept in the form of tables in memory or a storage device. FIG. 12 illustrates an exemplary record table 1200 with information on neighbor wireless base stations and backhaul communications links between a child wireless base station and its neighbor wireless base stations. The throughput uplink and downlink and average latency values indicate symmetrical uplink and downlink results in the table 1200. In some embodiments, the uplink and downlink results will be different for a channel. The table 1200 includes information on current neighbors and performance tests on backhaul connections. The table is updated and/or additional records/tables are created as new information and performance related data/parameters/metrics are collected. In this way historical information on the past performance of wireless backhaul communications links is maintained and accessible to the OSS 1756 (e.g., the IAB management function 1758 of the OSS 1756) for use in selecting and/or determining which neighbor wireless base stations to select for a child wireless base station to provide a backhaul communications link and the parameters based on the conditions at the child wireless base station and the neighbor wireless base stations.

In some embodiments, a record or table is maintained for each child wireless base station without a wired or fiber-optic backhaul communications link to the core network 1754 by the OSS 1756 (e.g., the IAB management function 1758 of the OSS 1756) having two sections, a historical section and a current section. The historical section includes information on what performance parameters/metrics have been achieved in the past and the current section includes what performance parameters/metrics are currently being achieved, e.g., obtained by running performance tests and/or monitoring of current wireless backhaul links. The table 1200 illustrates exemplary information that would be contained in both the historical section and the current section for a particular child wireless base station (e.g., child wireless base station 1704 of system 1700). In some embodiments, an indication of when the information was collected is also included such as for example a date and/or time at which the information was collected. Based on the demand and needs of user equipment devices for a child wireless base station, one or more appropriate neighbor wireless base stations will be selected as parents based on the information included in the table (e.g., based on the historical and/or current neighbor base station conditions and performance parameters/metrics). In some embodiments, the appropriate neighbor base station is selected based on meeting a set of performance criteria determined by the OSS 1756 (e.g., IAB management function 1758 of the OSS 1756) for the child base station based on conditions at the child wireless base station (e.g., cell loading, PRACH request counts received during a period of time).

The parent wireless base stations (e.g., wireless base station parent 1 1702 and wireless base station parent 2 1706 of system 1700) will use appropriate carriers (e.g., spectrum bandwidth and/or channels) to ensure that there is no or minimal spectrum interference when the wireless base stations communicate with the child wireless base station for backhaul purposes. In some embodiments, one or more of the wireless base station are multiple sector wireless base stations in which case the wireless base station will be analyzed on a sector basis when determining what backhaul communications links to establish and what carriers to utilize. Among the methods utilized to ensure that there is no or minimal spectrum interference is to use allocated bandwidth by segregating the bandwidth into carriers for the backhaul communications link. In addition, the child and parent wireless base stations may use a point to point link to establish the wireless backhaul connection path to minimize and/or eliminate spectrum interference caused by the wireless backhaul communications link between the child wireless base station and the parent wireless base station. For communications systems utilizing CBRS spectrum, a clean Generalized Authorized Access spectrum channel is identified to transmit and receive between the child wireless base station and the parent wireless base station. The spectrum channel may be identified by a spectrum inquiry request from the OSS 1756 (e.g., IAB management function 1758 of the OSS) to a Spectrum Access System managing the allocation and use of CBRS spectrum in which the child wireless base station is identified as the requesting wireless base station. In some embodiments, the child wireless base station may make the spectrum inquiry request to the Spectrum Access System. In some embodiments, a point to point link in a narrow beam is used to avoid the use of CBRS Priority Access Licensed spectrum and congested Generalize Authorized Access spectrum while also minimizing spectrum interference with PAL and GAA spectrum users.

Similar to the way the increase in user equipment device PRACH requests received by a child wireless base station within a time period was used to determine whether or not to add an additional wireless backhaul communications link for the child wireless base station to meet the demand on the child wireless base station, the monitoring of other metrics and/or indicators can also be used. For example, the OSS 1756 (e.g., IAB management function 1758 of the OSS 1756) can monitor and compare the downlink throughput demand average by user equipment being serviced by the child wireless base station and compare it to one or more threshold values to determine whether the child wireless base station needs an additional wireless backhaul communications link or other backhaul communications link modification (e.g., termination of a backhaul communications link). Another example, the OSS 1756 (e.g., IAB management function 1758 of the OSS 1756) can monitor and compare the uplink throughput demand average by user equipment and compare it to one or more threshold values to determine whether the child wireless base station needs an additional wireless backhaul communications link or other backhaul communications link modification (e.g., termination of a backhaul communications link). Another key performance indicator that is important for a child wireless base station when determining whether the wireless backhaul communications link or links is correct or adequate in addition to the number of user equipment devices and their demand is average transmission latency. The OSS 1756 (e.g., the IAB management function 1758 of the OSS 1756) can use the average transmission latency key performance indicator for determining which of the neighbor wireless base stations is the right parent for an additional wireless backhaul communications link for a child wireless base station but also can be used in assigning the right traffic for a given user equipment device based on the latency demand. For example, when a first user equipment device's latency demand increases due to the use of a certain application, the data stream for the first user equipment device being serviced by the wireless base station child 1704 will be switched from wireless base station parent 1 1702 wireless backhaul communications link 1730 to wireless base station parent 2 1706 wireless backhaul communications link 1732 because wireless base station parent 2 1706 wireless backhaul communications link 1732 has better latency response performance than wireless base station parent 1 1702 wireless backhaul communications link 1730

Various exemplary numbered embodiments illustrating different features of the present invention will now be discussed. The various features discussed may be used in a variety of different combinations. It should be appreciated that not necessarily all embodiments include the same features and some of the features described below are not necessary but can be desirable in some embodiments. The numbered embodiments are only exemplary and are not meant to be limiting to the scope of the invention. The various method embodiments may be, and in some embodiments are, implemented on system 1000 or 1000' of FIGS. 10 and 11 respectively.

List of Exemplary Numbered Method Embodiments:

Method Embodiment 1. A wireless communications method comprising: receiving, at an Integrated Access and Backhaul (IAB) management node, user equipment device connection request information (e.g., PRACH request count) for a first wireless base station, said first wireless base station being an IAB child node having a first wireless backhaul connection path to a second wireless base station, said second wireless base station being a first IAB parent node; determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station.

Method Embodiment 1A. A wireless communications method comprising: receiving, at an Integrated Access and Backhaul (IAB) management node, user equipment device connection request information (e.g., PRACH request count)

for a first wireless base station, said first wireless base station being an IAB child node having a first wireless backhaul connection path to a core network via a second wireless base station, said second wireless base station being a first IAB parent node; determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station.

Method Embodiment 1B. A wireless communications method comprising: receiving, at a wireless base station backhaul management node, user equipment device connection information (e.g., increase in user equipment device attempted connections, connections and/or backhaul data rate demand) and for a first wireless base station, said first wireless base station having a first backhaul connection path to a core network; determining, by the wireless base station backhaul management node, whether or not a second wireless backhaul connection path is to be established for the first wireless base station based on the received user equipment device connection request information for the first wireless base station; and in response to determining to establish the second wireless backhaul connection path for the first wireless base station: sending, by the wireless base station backhaul management node, to the first wireless base station via the first backhaul connection path instructions to establish the second wireless backhaul connection from the first wireless base station to the core network.

Method Embodiment 2. The wireless communications method of Method Embodiment 1, wherein the second wireless backhaul connection path is a connection path to a third wireless base station, said third wireless base station being a second IAB parent node.

Method Embodiment 3. The wireless communications method of Method Embodiment 2, wherein the first IAB parent node is a first IAB donor with a fiber-optic or wired backhaul connection to the core network; and wherein the second IAB parent node is a second IAB donor with a fiber-optic or wired backhaul connection to the core network.

Method Embodiment 4. The wireless communications method of Method Embodiment 3, wherein the received user equipment device connection request information is a first count of the number of Physical Random Access Channel (PRACH) requests received by the first wireless base station during a first period of time.

Method Embodiment 5. The wireless communications method of Method Embodiment 1, wherein said determining, by the IAB management node, whether or not a second wireless backhaul connection path is to be established for the first wireless base station based on the received user equipment device connection request information for the first wireless base station includes: monitoring, by the IAB management node, the received user equipment device connection request information for the first wireless base station to determine if the number of connection requests received by the first wireless base station during a first period of time exceeds a first threshold value; and in response to determining the number of connection requests received from user equipment devices by the first wireless base station during the first period of time exceeds the first threshold value, determining that the second wireless backhaul connection is to be established.

Method Embodiment 5A. The wireless communications method of Method Embodiment 4, wherein said determining, by the IAB management node, whether or not a second wireless backhaul connection path is to be established for the first wireless base station based on the received user equipment device connection request information for the first wireless base station includes: monitoring, by the IAB management node, the received user equipment device connection request information for the first wireless base station to determine if the first count of the number of PRACH requests received by the first wireless base station during the first period of time exceeds a first threshold value; and in response to the first count exceeding the first threshold value, determining that the second wireless backhaul connection is to be established.

Method Embodiment 6. The wireless communications method of Method Embodiment 3, further comprising: selecting, by the IAB management node, the third wireless base station from a plurality of neighbor wireless base stations based on measured backhaul connection path performance or predicted backhaul connection path performance.

Method Embodiment 6A. The wireless communications method of Method Embodiment 3, further comprising: selecting, by the IAB management node, the third wireless base station from a plurality of neighbor wireless base stations based on historical performance characteristics and/ or metrics of backhaul connection paths provided by the neighbor wireless base stations to the first wireless base station.

Method Embodiment 6C. The wireless communications method of Method Embodiment 3, further comprising: selecting, by the IAB management node, the third wireless base station from a plurality of neighbor wireless base stations based on measured backhaul connection path performance metrics.

Method Embodiment 6C1. The wireless communications method of Method Embodiment 6C, wherein said selecting, by the IAB management node, the third wireless base station from a plurality of neighbor wireless base stations based on measured backhaul connection path performance metrics includes: sending messages to said one or more neighbor wireless base stations requesting the one or more neighbor wireless base stations which receive the message execute backhaul connection path performance tests on a backhaul connection path between the neighbor wireless base station which received the message and the core network or OSS; receiving measured backhaul connection path performance results from the one or more neighbor wireless base stations, said one or more wireless base stations including the third wireless base station; generating and/or determining said measured backhaul connection path performance metrics from said measured backhaul connection path results; and comparing the measured backhaul connection path performance metrics for each backhaul connection path to each other and/or to a set of performance criteria for the second wireless backhaul connection path to determine which neighbor wireless base station can provide a wireless backhaul connection path which best meets or exceeds a set of performance criteria for the second wireless backhaul connection path (e.g., which backhaul connection path has sufficient backhaul bandwidth/capacity and/or downlink and uplink throughput or latency levels sufficient to meet the requirements of the first wireless base station).

Method Embodiment 6D. The wireless communications method of Method Embodiment 6C or 6C1, wherein said selecting, by the IAB management node, the third wireless base station from a plurality of neighbor wireless base stations based on measured backhaul connection path performance metrics includes: sending messages to said one or more neighbor wireless base stations requesting the one or more neighbor wireless base stations which receive the message execute backhaul connection path performance tests on a backhaul connection path between the neighbor wireless base station which received the message and the first wireless base stations; receiving measured backhaul connection path performance results from the one or more neighbor wireless base stations, said one or more wireless base stations including the third wireless base station; generating and/or determining said measured backhaul connection path performance metrics from said measured backhaul connection path results; and comparing the measured backhaul connection path performance metrics for each backhaul connection path to each other and/or to a set of performance criteria for the second wireless backhaul connection path to determine which neighbor wireless base station can provide a wireless backhaul connection path which best meets or exceeds a set of performance criteria for the second wireless backhaul connection path.

Method Embodiment 6E. The wireless communications method of Method Embodiment 6D, wherein the measured backhaul connection path results include one or more of the following: average latency for downlink traffic, average latency for uplink traffic, average backhaul capacity available, throughput for uplink traffic, throughput for downlink traffic.

Method Embodiment 6F. The wireless communications method of Method Embodiment 6D, wherein the set of performance criteria of the second wireless backhaul connection path is based on types of applications being utilized by the user equipment devices being serviced by the first wireless base station (e.g., if a threshold number of applications being utilized by the user equipment devices being serviced by the first wireless base station are latency sensitive (i.e., require low latency) than the set of performance criteria will emphasis latency characteristics (e.g., average uplink latency being below an uplink latency threshold value and/or average downlink latency being below a downlink latency threshold value).

Method Embodiment 6G. The wireless communications method of Method Embodiment 6D, wherein the set of performance criteria of the second wireless backhaul connection path is based on second wireless base station's traffic type (e.g., uplink dominated traffic, downlink dominated traffic or balanced uplink and downlink dominated traffic) (set of criteria will emphasize uplink throughput for uplink dominated traffic, downlink throughput for downlink dominated traffic, and balanced uplink downlink throughput for balanced uplink and downlink traffic for example by requiring that a first uplink throughput threshold value be meet or exceeded for uplink dominated traffic type, by requiring a first downlink throughput threshold value be meet or exceed for downlink dominated traffic type, and requiring a second uplink throughput threshold value be meet or exceed and a second downlink throughput threshold value be meet or exceeded for balanced uplink and downlink traffic type, said second uplink throughput threshold value being less than said first uplink throughput threshold value and said second downlink throughput value being less than said first downlink throughput value.

Method Embodiment 7. The wireless communications method of Method Embodiment 6, further comprising: maintaining, by the IAB management node, historical performance characteristics and/or metrics of wireless backhaul connection paths provided by parent wireless base stations (e.g., neighbor IAB donors which previously provided wireless backhaul connections to the first wireless base station); and utilizing said historical performance characteristics and/or metrics to predict wireless backhaul connection path performance which can be provided by neighbor parent wireless base stations (e.g., neighbor IAB donors).

Method Embodiment 7A. The wireless communications method of Method Embodiment 6, further comprising: sending instructions, from the IAB management node, to the first wireless base station and/or one or more neighbor wireless base stations to execute performance tests on backhaul connection paths established between the first wireless base station and the one or more neighbor wireless base stations; and sending instructions, from the IAB management node, to the first wireless base station and/or one or more neighbor wireless base stations to execute performance tests on backhaul connection paths established between the first wireless base station and the core network via the one or more neighbor wireless base station; and receiving, by the IAB management node, the results of the performance tests from the first wireless base station and the one or more neighbor wireless base stations which performed the performance tests.

Method Embodiment 7B. The communications method of Method Embodiment 7A, wherein the performance tests are implemented by iPerf software applications executing on the first wireless base station and the one or more neighbor wireless base stations.

Method Embodiment 7C. The wireless communications method of Method Embodiment 2, further comprising: selecting, by the IAB management node, the third wireless base station from a plurality of neighbor wireless base stations based on one or more of the following: (i) an amount of backhaul capacity that the neighbor wireless base station can provide, (ii) a number of Physical Random Access Channel (PRACH) requests received by the neighbor wireless base station during a predetermined period of time (e.g., first period of time), (iii) a number of user equipment devices connected to or being serviced by the neighbor wireless base station, (iv) a distance from the first wireless base station to the neighbor wireless base station, (v) wireless frequency band or bands supported at the neighbor wireless base station for a backhaul connection between the first wireless base station and the neighbor wireless base station, (vi) channel or channels available for use for a backhaul connection between the first wireless base station and the neighbor wireless base station, (vii) uplink throughput from the first wireless base station to the neighbor wireless base station, (viii) downlink throughput from the neighbor wireless base station to the first wireless base station, (ix) amount of loading at the neighbor wireless base station, (x) average uplink message latency for messages communicated from first wireless base station to the neighbor wireless base station, (xi) average downlink message latency for messages communicated from the neighbor wireless base station to the first wireless base station; (xii) average uplink message latency for messages communicated from first wireless base station to the core network via the neighbor wireless base station, (xiii) average downlink message latency for messages communicated from the core network to the first wireless base station via the neighbor wireless base station; (xiv) uplink throughput from the first wireless base station to the core network via the neighbor wireless base station, and (xv) downlink throughput from the core network to the first wireless base station via the neighbor wireless base station.

Method Embodiment 7D. The communications method of Method Embodiment 7C further comprising: making said selection based on a backhaul connection path score of the second wireless backhaul connection path between the first wireless base station and the third wireless base station.

Method Embodiment 7E. The communications method of Method Embodiment 7D, further comprising: prior to making said selection, generating a wireless backhaul connection path score for potential (i.e., not yet established) and/or actual (i.e., established for performance testing and evaluation prior to usage for actual data transmission) wireless backhaul connection paths available for the first wireless base station.

Method Embodiment 7F. The communications method of Method Embodiment 7D, further comprising: prior to making said selection, generating a wireless backhaul connection path score for available backhaul connection paths as a weighted average of a set of performance metrics (or a normalized set of performance metrics).

Method Embodiment 7G. The communications method of Method Embodiment 7C further comprising: making said selection based on a wireless backhaul connection path score, said wireless backhaul connection path score being calculated as a weighted sum in accordance with the following formula: wireless backhaul connection path score= (K1*an amount of backhaul capacity that the neighbor wireless base station can provide)+(K2*a number of Physical Random Access Channel (PRACH) requests received by the neighbor wireless base station during a predetermined period of time (e.g., first period of time)+(K3*a number of user equipment devices connected to or being serviced by the neighbor wireless base station)+(K4*a distance from the first wireless base station to the neighbor wireless base station)+(K5*wireless frequency band or bands supported at the neighbor wireless base station for a backhaul connection between the first wireless base station and the neighbor wireless base station)+(K6*channel or channels available for use for a backhaul connection between the first wireless base station and the neighbor wireless base station)+ (K7*uplink throughput available at the neighbor wireless base station)+(K8*downlink throughput available at the neighbor wireless base station)+(K9*amount of loading at the neighbor wireless base station)+(K10*average uplink message latency for messages communicated from first wireless base station to the neighbor wireless base station)+ (K11*average downlink message latency for messages communicated from the neighbor wireless base station to the first wireless base station)+(K12*average uplink message latency for messages communicated from first wireless base station to the core network via the neighbor wireless base station)+(K13*average downlink message latency for messages communicated from the core network to the first wireless base station via the neighbor wireless base station), where K1, K2, K3, K4, K5, K6, K7, K8, K9, K10, K11, K12, and K13 are weighting factors that are adjusted to take into account the importance of each of the items in the particular instance. For example, in some instances K11 and K13 weighting factors for downlink latency are set to zero so they have no affect on the backhaul connection path score generated and backhaul connection path selected. This may be down when the traffic is uplink dominated at the first wireless base station because the first wireless base station is servicing a large number of sensor devices uploading sensor data. Similarly the K values may be adjusted to a higher value if an item is more important such as K10 and K12 putting more weight on the importance of the uplink latency of the backhaul connection path for the backhaul connection path score which is generated. Each of the parameters and/or metrics to which a weighting factor is applied may be assigned a numerical value and/or normalized.

Method Embodiment 7H. The communications method of Method Embodiment 1-7G, wherein said neighbor wireless base stations are wireless base stations having a coverage area including the first wireless base station, said first wireless base station and said neighbor wireless base stations being able to wirelessly communicate with one another.

Method Embodiment 8. The wireless communications method of Method Embodiment 2, further comprising: determining, by the IAB management node, session establishment information (e.g., frequency band information, channel information, bandwidth information (e.g., bandwidth part information) for the second wireless backhaul connection path between the first wireless base station and the third wireless base station; communicating, by the IAB management node, the determined session establishment information for the second wireless backhaul connection path to the first wireless base station and the third wireless base station.

Method Embodiment 8A. The wireless communications method of Method Embodiment 8, wherein said determining, by the IAB management node, session establishment information (e.g., frequency band information, channel information, bandwidth information (e.g., bandwidth part information) for the second wireless backhaul connection path between the first wireless base station and the third wireless base station includes: allocating or obtaining an allocation of bandwidth/spectrum (e.g., licensed spectrum (Citizens Broadband Radio Service (CBRS) Priority Access License (PAL) spectrum), unlicensed spectrum (e.g., CBRS GAA spectrum) or a combination of licensed and unlicensed spectrum (e.g., CBRS PAL and GAA spectrum) from a Spectrum Access System) and one or more channels to be utilized for the second wireless backhaul connection path between the first wireless base station and the third wireless base station.

Method Embodiment 8B. The wireless communications method of Method Embodiment 1, wherein the message includes session establishment information for establishing the second wireless backhaul connection.

Method Embodiment 8C. The wireless communications method of Method Embodiment 8, wherein said determining, by the IAB management node, session establishment information for the second wireless backhaul connection path between the first wireless base station and the third wireless base station includes: determining IAB parameters for establishing an IAB backhaul connection path from the first wireless base station to the third wireless base station, said IAB parameters including message routing information.

Method Embodiment 9. The wireless communications method of Method Embodiment 3, wherein said message includes instructions and/or information for the third wireless base station to establish the second wireless backhaul connection path between the third wireless base station and the first wireless base station, said second wireless backhaul connection path being an IAB backhaul connection path.

Method Embodiment 9A. The wireless communications method of Method Embodiment 3, wherein said message includes instructions and/or information for the first wireless base station to establish the second wireless backhaul connection path between the first wireless base station and the third wireless base station, said second wireless backhaul connection path being an IAB backhaul connection path.

Method Embodiment 9C. The wireless communications method of Method Embodiment 3, wherein said message includes instructions and/or information for establishing the second wireless backhaul connection path between the first wireless base station and the third wireless base station, said second wireless backhaul connection path being an IAB backhaul connection path.

Method Embodiment 10. The wireless communications method of Method Embodiment 3, further comprising: establishing, by the first wireless base station and the third wireless base station, the second wireless backhaul connection path between the first wireless base station and the third wireless base station, said second wireless backhaul connection path being an IAB backhaul connection path; and utilizing the second wireless backhaul connection path to communicate data from the first wireless base station to the core network via the third wireless base station.

Method Embodiment 10A. The wireless communications method of Method Embodiment 10, further comprising: subsequent to establishing, by the first wireless base station and the third wireless base station, the second wireless backhaul connection path between the first wireless base station and the third wireless base station, executing a first set of performance tests on the second wireless backhaul connection path between the second wireless base station and the third wireless base station to determine the second wireless backhaul connection path's performance (e.g., bandwidth that second wireless backhaul connection path supports); reporting results of the first set of performance tests executed on the second wireless backhaul connection path to the IAB management node; determining, by the IAB management node, whether the results of the first set of performance tests meet a first set of performance criteria for the second wireless backhaul connection path (e.g., bandwidth supported, throughput available for uplink, throughput available for downlink, and/or average latency); and in response to determining, by the IAB management node, that the second wireless backhaul connection path meets the first set of performance criteria, utilizing the second wireless backhaul connection path to communicate data from the first wireless base station to the third wireless base station.

Method Embodiment 11. The communications method of Method Embodiment 10 or 10A, wherein said utilizing the second wireless backhaul connection path to communicate data from the first wireless base station to the core network includes: communicating, by the first wireless base station, data to the third wireless base station via the second wireless backhaul communication path; receiving, by the third wireless base station via the second wireless backhaul communication path, the communicated data from the first wireless base station; and communicating, by the third wireless base station via a wired or fiber-optic cable, to the core network the received data from the first wireless base station.

Method Embodiment 11A. The communications method of Method Embodiment 11, wherein said communicating, by the first wireless base station, data to the third wireless base station via the second wireless backhaul communication path includes: communicating, by the first wireless base station, the data in IAB Backhaul Adaptation Protocol packets to the third wireless base station.

Method Embodiment 12. The communications method of Method Embodiment 11, further comprising: after a first period of time of utilizing the second wireless backhaul connection path to communicate data from the first wireless base station to the third wireless base station, executing a second set of performance tests on the second wireless backhaul connection path between the second wireless base station and the third wireless base station to determine the second wireless backhaul connection path's performance (e.g., bandwidth that second wireless backhaul connection path supports); reporting results of the second set of performance tests executed on the second wireless backhaul connection path to the IAB management node; determining, by the IAB management node, whether the second set of test results meet a second set of performance criteria for the second wireless backhaul connection path (e.g., bandwidth supported, throughput available for uplink, throughput available for downlink, and/or average latency); and in response to determining, by the IAB management node, that the second wireless backhaul connection path does not meet the second set of performance criteria, determining to create one or more additional IAB wireless backhaul connections for the second wireless base station via one or more additional wireless base stations.

Method Embodiment 12A. The communications method of Method Embodiment 12, wherein said one or more additional wireless base stations are IAB donor nodes.

Method Embodiment 12B. The communications method of Method Embodiment 12A, wherein said IAB donor nodes have wired and/or fiber-optic cable connections to the core network.

Method Embodiment 12C. The communications method of Method Embodiment 11, further comprising: continuously monitoring the performance of the second wireless backhaul connection path after commencing utilization of the second wireless backhaul connection path to communicate data from the first wireless base station to the core network via the third wireless base station; and in response to determining via said continuous monitoring that the second wireless backhaul connection path is not meeting performance requirements (e.g., not providing sufficient bandwidth, uplink and/or downlink throughput, or latency too great for the first wireless base station—e.g., uplink data throughput determined via monitoring is below an uplink throughput threshold value, downlink throughput determined via monitoring is below a downlink throughput threshold value, and/or an average latency determined via monitoring is greater than a latency threshold value), determining to create one or more additional IAB wireless backhaul connections for the first wireless base station via one or more additional wireless base stations, said one or more additional wireless base stations being IAB donor nodes.

Method Embodiment 12C1. The wireless communications method of Method Embodiment 12C, wherein said IAB management node stores performance metrics for the second backhaul connection path determined during or based on said monitoring.

Method Embodiment 12D. The wireless communications method of Method Embodiment 10, 10A, 11, 11A, 12, 12A, or 12B, further comprising: generating a first set of performance metrics for the second wireless backhaul connection path between the first wireless base station and the third wireless base station based on the first set of performance tests executed; storing the first set of performance metrics for the second wireless backhaul connection path between the first wireless base station and the third wireless base station based on the first set of performance tests executed in memory of the IAB management node or a storage device connected or coupled to the IAB management node; storing with the first set of performance metrics, the time at which the first set of performance tests were executed, characteristics of the second wireless backhaul connection path (e.g., frequency band, bandwidth and channel information for the second wireless backhaul connection, type of wireless connection (e.g., GAA spectrum point to point link, GAA spectrum point to point link in a narrow beam, PAL spectrum, PAL spectrum point to point link in narrow beam, bandwidth for the second wireless backhaul connection being allocated by segregating the available bandwidth into a dedicated carrier(s) or carrier channel(s)) and the conditions and/or characteristics of the first wireless base station and/or the second wireless base station (e.g., location (e.g., Global Position System (GPS) coordinates), cell Identifier, cell sector Identifier, cell loading, cell sector loading, number of user equipment devices connected to the wireless base station, number of user equipment devices connected to each cell and/or cell sector of the wireless base station, number of child IAB nodes being supported by the IAB donor node, number of child IAB nodes being supported by cells and/or cell sectors of the IAB donor node, type of applications user equipment devices are executing, type of traffic (uplink dominated traffic, downlink dominated traffic, or balanced uplink and downlink traffic) being handled by each cell or cell sector of the wireless base station, power transmission levels being utilized at the wireless base station, spectrum interference being experienced at the wireless base station).

Method Embodiment 12E. The wireless communications method of Method Embodiment 12D, further comprising: generating a second set of performance metrics for the second wireless backhaul connection path between the first wireless base station and the third wireless base station based on the second set of performance tests executed; storing the second set of performance metrics for the second wireless backhaul connection path between the first wireless base station and the third wireless base station based on the second set of performance tests executed in memory of the IAB management node or a storage device connected or coupled to the IAB management node; storing with the second set of performance metrics, the time at which the second set of performance tests were executed, characteristics of the second wireless backhaul connection path (e.g., frequency band, bandwidth and channel information for the second wireless backhaul connection, type of wireless connection (e.g., GAA spectrum point to point link, GAA spectrum point to point link in a narrow beam, PAL spectrum, PAL spectrum point to point link in narrow beam, bandwidth for the second wireless backhaul connection being allocated by segregating the available bandwidth into a dedicated carrier(s) or carrier channel(s)) and the conditions and/or characteristics of the first wireless base station and/or the second wireless base station (e.g., location (e.g., Global Position System (GPS) coordinates), cell Identifier, cell sector Identifier, cell loading, cell sector loading, number of user equipment devices connected to the wireless base station, number of user equipment devices connected to each cell and/or cell sector of the wireless base station, number of child IAB nodes being supported by the IAB donor node, number of child IAB nodes being supported by cells and/or cell sectors of the IAB donor node, type of applications user equipment devices are executing, type of traffic (uplink dominated traffic, downlink dominated traffic, or balanced uplink and downlink traffic) being handled by each cell or cell sector of the wireless base station, power transmission levels being utilized at the wireless base station, spectrum interference being experienced at the wireless base station).

Method Embodiment 12F. The wireless communications method of Method Embodiment 12E, further comprising: generating a third set of performance metrics for the second wireless backhaul connection path between the first wireless base station and the third wireless base station based on monitoring: (i) conditions of the second wireless backhaul connection path between the first wireless base station and the third wireless base station, (ii) conditions at the first wireless base station, (iii) conditions of the third wireless base station; storing the third set of performance metrics for the second wireless backhaul connection path between the first wireless base station and the third wireless base station in memory of the IAB management node or a storage device connected or coupled to the IAB management node; and storing with the third set of performance metrics, the time at which the third set of performance metrics were generated, characteristics of the second wireless backhaul connection path (e.g., frequency band, bandwidth and channel information for the second wireless backhaul connection, type of wireless connection (e.g., GAA spectrum point to point link, GAA spectrum point to point link in a narrow beam, PAL spectrum, PAL spectrum point to point link in narrow beam, bandwidth for the second wireless backhaul connection being allocated by segregating the available bandwidth into a dedicated carrier(s) or carrier channel(s)) and the conditions and/or characteristics of the first wireless base station and/or the second wireless base station (e.g., location (e.g., Global Position System (GPS) coordinates), cell Identifier, cell sector Identifier, cell loading, cell sector loading, number of user equipment devices connected to the wireless base station, number of user equipment devices connected to each cell and/or cell sector of the wireless base station, number of child IAB nodes being supported by the IAB donor node, number of child IAB nodes being supported by cells and/or cell sectors of the IAB donor node, type of applications user equipment devices are executing, type of traffic (uplink dominated traffic, downlink dominated traffic, or balanced uplink and downlink traffic) being handled by each cell or cell sector of the wireless base station, power transmission levels being utilized at the wireless base station, spectrum interference being experienced at the wireless base station).

Method Embodiment 12G. The communications method of Method Embodiment 12G, further comprising: utilizing one or more of: (i) the stored first set of performance metrics, (ii) the stored second set of performance metrics, and (iii) the stored third set of performance metrics in selecting whether or not to utilize the third wireless base station to implement a backhaul connection path for the first wireless base station after the storage of the first, second or third set of performance metrics.

Method Embodiment 12H. The communications method of Method Embodiment 12G, further comprising: utilizing one or more of the stored first set of performance metrics and information stored with the first set of performance metrics, the stored second set of performance metrics and the information stored with the second set of performance metrics, and the stored third set of performance metrics and information stored with third set of performance metrics in selecting whether or not to utilize the third wireless base station to implement a backhaul connection path for the first wireless base station after the storage of the first, second or third set of performance metrics.

Method Embodiment 13. The communications method of Method Embodiment 3, further comprising: establishing the second wireless backhaul connection path as a GAA spectrum point to point narrow beam channel between the first wireless base station and the third wireless base station (e.g., to minimize interference with the usage of PAL spectrum by the first wireless base station, second and third wireless base stations and/or other neighbor wireless base stations).

Method Embodiment 14. The communications method of Method Embodiment 3, further comprising: maintaining access capacity for the second wireless backhaul connection path between the first wireless base station and the third wireless base station by implementing the second wireless backhaul connection path as a GAA spectrum point to point wireless link between the first wireless base station and the third wireless base station.

Method Embodiment 15. The communications method of Method Embodiment 3, further comprising: utilizing a dedicated carrier for the second wireless backhaul connection path between the first wireless base station and the third wireless base station.

Method Embodiment 16. The communications method of Method Embodiment 3, further comprising: determining, by the IAB management node, that additional IAB backhaul connection paths are needed by the second wireless base station (e.g., based on backhaul needs of the first wireless base station—number of PRACH requests received by first wireless base station in given period of time and/or rate of increase of PRACH requests received by wireless base station over a given period of time); selecting additional wireless base stations to be a parent IAB donor node for the first wireless base station; and communicating messages to the selected additional wireless base stations to implement IAB backhaul connection paths with the first wireless base stations.

Method Embodiment 17. The communications method of Method Embodiment 16, further comprising: establishing by the selected additional wireless base stations IAB backhaul connection paths with the first wireless base station.

Method Embodiment 18. The wireless communications method of Method Embodiment 3, further comprising: in response to the first wireless base station moving from a first location to a second location, receiving from the first wireless base station, by the IAB management node, via a fourth wireless base station a request for the IAB management node to identify one or more IAB parent nodes for the first wireless base station, said first wireless base station being a mobile device, said request for the IAB management node including a list of neighbor wireless base stations whose signal the first wireless base station is receiving.

Method Embodiment 19. The wireless communications method of Method Embodiment 18, further comprising: determining, by the IAB management node, one or more wireless base stations from the list of neighbor wireless base stations included in the request from the first wireless base station, to be an IAB parent node for the first wireless base station.

Method Embodiment 20. The wireless communications method of Method Embodiment 19, wherein said being an IAB parent node for the first wireless base station includes providing an IAB backhaul connection path for the first wireless base station.

Method Embodiment 21. The wireless communications method of Method Embodiment 20, wherein at least one of the wireless base stations determined by the IAB management node to be an IAB parent node to the first wireless base station is an IAB donor node with a fiber-optic and/or wired backhaul connection to the core network.

Method Embodiment 22. The wireless communications method of Method Embodiment 21, wherein said determination as to which of the neighbor wireless base stations are to be an IAB parent node to the first wireless base stations is based on one or more characteristics or attributes of the neighbor wireless base station (e.g., loading on the cell (i.e., how many PRACH requests it has received in a time period, number of user equipment devices it is servicing, number of IAB child nodes it is providing backhaul services for, available backhaul capacity), frequency band availability for backhaul connection path, distance to the first wireless base station, channel availability for the backhaul connection path to the first wireless base station, performance characteristics (e.g., bandwidth capacity, uplink throughput, downlink throughput), type of wireless base station (e.g., IAB donor node with a wired or fiber-optic connection to the core network or IAB node which does not have a wired or fiber-optic connection to the core network).

Method Embodiment 23. The wireless communications method of Method Embodiment 1, further comprising: continuously monitoring the performance of IAB backhaul connection paths in a wireless network; continuously monitoring status of IAB parent nodes and IAB child nodes; dynamically and in real time or near real time modifying the IAB backhaul connection paths in the wireless network to increase network backhaul performance and/or efficiency based on and/or in response to the performance of IAB backhaul connection paths monitored performance and/or in response to the status of the IAB parent nodes and IAB child nodes monitored status.

Method Embodiment 24. The wireless communications method of Method Embodiment 23, wherein dynamically modifying the IAB backhaul connection paths in the wireless network including sending instructions from the IAB management node to IAB parent nodes to perform one or more of the following operations: (i) implement a new IAB backhaul connection path, (ii) terminate an existing IAB backhaul connection path, (iii) transfer a data stream from one IAB backhaul connection path to a different IAB backhaul connection path, (iv) dedicate additional bandwidth capacity to an existing IAB backhaul connection path, and (v) reduce bandwidth capacity for an existing IAB backhaul connection path.

Method Embodiment 25. The communications method of Method Embodiment 1, further comprising: establishing the second wireless backhaul connection between first wireless base station and a third wireless base station; monitoring, by the IAB management node, the usage of the first wireless backhaul connection path, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station; determining, by the IAB management node, based on the monitored usage of the first wireless backhaul connection, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station whether or not to terminate the second wireless backhaul connection; and in response to determining to terminate the second wireless backhaul connection path, sending a message to the terminate the second wireless backhaul connection path.

Method Embodiment 26. The communications method of Method Embodiment 25, further comprising: determining, by the IAB management node, based on the monitored usage of the first wireless backhaul connection path, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station whether or not to add an additional wireless backhaul connection for the first wireless base station; and in response to determining to add an additional wireless backhaul connection path, (i) selecting a fourth wireless base station to be an IAB parent donor for the first wireless base station from wireless base stations which are neighbor wireless base stations of the first wireless base station, (ii) generating one or messages to establish the additional wireless backhaul connection path for the first wireless base station, and (iii) sending the generated one or more messages to establish an additional wireless backhaul connection path for the first wireless base station (e.g., with session establishment information and/or IAB parameters to an Operations Support System, the first wireless base station and/or the fourth wireless base station).

Method Embodiment 27. The communications method of Method Embodiment 3, wherein the first wireless base station does not have a fiber-optic backhaul connection.

Method Embodiment 28. The communications method of Method Embodiment 27, wherein the first wireless base station does not have a wired backhaul connection.

Method Embodiment 29. The communications method of Method Embodiment 3, wherein the first wireless base station does not have a land line backhaul connection path to the core network.

Method Embodiment 30. The communications method of Method Embodiment 27, 28, or 29, wherein the first wireless base station only has wireless backhaul interfaces (e.g., mobile wireless base station brought into an area for an event (e.g., concert, country fair, political rally, sporting event, emergency event when landlines affected).

Method Embodiment 31. The communications method of Method Embodiment 27, 28, 29, or 30, wherein said first wireless base station is located in an area where landline connections (fiber-optical cabling and/or wired lines (e.g., cable) are not available (e.g., disaster area in which landlines have been damaged) and/or are not economical (e.g., low density population area, mountainous area).

Method Embodiment 32. The communications method of Method Embodiment 27, 28, 29, 30, or 31, wherein the first wireless base station, second wireless base station and third wireless base station are Citizens Broadband Radio Service Devices (CBSDs) which are part of Citizens Broadband Radio Service (CBRS) network.

Method Embodiment 33. The communications method of Method Embodiments 27, 28, 29, 30, 31, or 32 wherein each of the first wireless base station, second wireless base station and third wireless base station are implemented as one of a gNodeB wireless base station or an eNodeB wireless base station.

Method Embodiment 34. The communications method of Method Embodiments 1-33, wherein the wireless base stations of the method include software for implementing the Integrated Access Backhaul protocol; wherein the wireless base stations of the method include software for performing performance tests (e.g., iPerf applications); wherein the IAB management node is part of or is coupled to the Operations Support System (OSS) for a first wireless network, said wireless base stations of the method being part of the first wireless network; and wherein the IAB management node receives information about conditions of the wireless base stations (e.g., key performance indicators such as user equipment device connection information, cell loading information, uplink and downlink throughput information, uplink latency information, downlink latency information, backhaul connection path information such as performance metrics, frequency band information, channel information, type of backhaul connection (e.g., dedicated carrier for backhaul link data transfer, GAA channel which is point to point narrow beam)) from the OSS (e.g., by registering with the OSS for notifications including information, requesting the information and/or polling the OSS for the information)).

Method Embodiment 35. The communications method of Method Embodiment 34, wherein the IAB management node and/or the OSS is part of the core network.

Method Embodiment 36. The communications method of Method Embodiment 36, wherein the IAB management node is located in a cloud.

Listing of Exemplary Numbered System Embodiments:

System Embodiment 1. A wireless communications system comprising: an Integrated Access and Backhaul (IAB) management node, said IAB management node including memory and a first processor, said first processor configured to control the IAB management node to perform the following operations: receiving, at the IAB management node, user equipment device connection request information (e.g., PRACH request count) for a first wireless base station, said first wireless base station being an IAB child node having a first wireless backhaul connection path to a second wireless base station, said second wireless base station being a first IAB parent node; determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station.

System Embodiment 2. The wireless communications system of System Embodiment 1, wherein the second wireless backhaul connection path is a connection path to a third wireless base station, said third wireless base station being a second IAB parent node.

System Embodiment 3. The wireless communications system of System Embodiment 2, wherein the first IAB parent node is a first IAB donor with a fiber-optic or wired backhaul connection to the core network; and wherein the second IAB parent node is a second IAB donor with a fiber-optic or wired backhaul connection to the core network.

System Embodiment 4. The wireless communications system of System Embodiment 3, wherein the received user equipment device connection request information is a first count of the number of Physical Random Access Channel (PRACH) requests received by the first wireless base station during a first period of time.

System Embodiment 5. The wireless communications system of System Embodiment 1, wherein said determining, by the IAB management node, whether or not a second wireless backhaul connection path is to be established for the first wireless base station based on the received user equipment device connection request information for the first wireless base station includes: monitoring, by the IAB management node, the received user equipment device connection request information for the first wireless base station to determine if the number of connection requests received by the first wireless base station during a first period of time exceeds a first threshold value; and in response to determining the number of connection requests received from user equipment devices by the first wireless base station during the first period of time exceeds the first threshold value, determining that the second wireless backhaul connection is to be established.

System Embodiment 6. The wireless communications system of System Embodiment 3, further comprising: selecting, by the IAB management node, the third wireless base station from a plurality of neighbor wireless base stations based on measured backhaul connection path performance or predicted backhaul connection path performance.

System Embodiment 7. The wireless communications system of System Embodiment 6, wherein the first processor further controls the IAB management node to perform the following operations: maintaining, in said memory, historical performance characteristics and/or metrics of wireless backhaul connection paths provided by parent wireless base stations (e.g., neighbor IAB donors which previously provided wireless backhaul connections to the first wireless base station); and utilizing said historical performance characteristics and/or metrics to predict wireless backhaul connection path performance which can be provided by neighbor parent wireless base stations (e.g., neighbor IAB donors).

System Embodiment 8. The wireless communications system of System Embodiment 2, wherein the first processor further controls the IAB management node to perform the following operations: determining session establishment information (e.g., frequency band information, channel information, bandwidth information (e.g., bandwidth part information) for the second wireless backhaul connection path between the first wireless base station and the third wireless base station; communicating the determined session establishment information for the second wireless backhaul connection path to the first wireless base station and the third wireless base station.

System Embodiment 9. The wireless communications system of System Embodiment 3, wherein said message includes instructions and/or information for the third wireless base station to establish the second wireless backhaul connection path between the third wireless base station and the first wireless base station, said second wireless backhaul connection path being an IAB backhaul connection path.

System Embodiment 10. The wireless communications system of System Embodiment 3, wherein the first wireless base station and the third wireless base station establish the second wireless backhaul connection path between the first wireless base station and the third wireless base station, said second wireless backhaul connection path being an IAB backhaul connection path, and wherein the first wireless base station utilizes the second wireless backhaul connection path to communicate data from the first wireless base station to the core network via the third wireless base station; and wherein the first wireless base station does not have a wired or fiber-optic backhaul connection to the core network.

System Embodiment 11. The wireless communications system of System Embodiment 10, wherein said utilizing the second wireless backhaul connection path to communicate data from the first wireless base station to the core network includes: communicating, by the first wireless base station, data to the third wireless base station via the second wireless backhaul communication path; receiving, by the third wireless base station via the second wireless backhaul communication path, the communicated data from the first wireless base station; and communicating, by the third wireless base station via a wired or fiber-optic cable, to the core network the received data from the first wireless base station.

System Embodiment 12. The wireless communications system of System Embodiment 11, wherein the first processor further controls the IAB management node to perform the following operations: after a first period of time of the second wireless backhaul connection path being utilized to communicate data from the first wireless base station to the third wireless base station, determining, by the IAB management node, whether the second set of test results meet a second set of performance criteria for the second wireless backhaul connection path (e.g., bandwidth supported, throughput available for uplink, throughput available for downlink, and/or average latency); and in response to determining, by the IAB management node, that the second wireless backhaul connection path does not meet the second set of performance criteria, determining to create one or more additional IAB wireless backhaul connections for the second wireless base station via one or more additional wireless base stations.

System Embodiment 12A. The wireless communications system of System Embodiment 12, wherein said one or more additional wireless base stations are IAB donor nodes; and wherein said IAB donor nodes have wired and/or fiber-optic cable connections to the core network.

System Embodiment 13. The wireless communications system of System Embodiment 1, wherein the first processor further controls the IAB management node to perform the following operations: continuously monitor the performance of IAB backhaul connection paths in a wireless network; continuously monitoring status of IAB parent nodes and IAB child nodes; and dynamically and in real time or near real time modifying the IAB backhaul connection paths in the wireless network to increase network backhaul performance and/or efficiency based on and/or in response to the performance of IAB backhaul connection paths monitored performance and/or in response to the status of the IAB parent nodes and IAB child nodes monitored status.

System Embodiment 14. The wireless communications system of System Embodiment 13, wherein said dynamically modifying the IAB backhaul connection paths in the wireless network including sending instructions from the IAB management node to IAB parent nodes to perform one or more of the following operations: (i) implement a new IAB backhaul connection path, (ii) terminate an existing IAB backhaul connection path, (iii) transfer a data stream from one IAB backhaul connection path to a different IAB backhaul connection path, (iv) dedicate additional bandwidth capacity to an existing IAB backhaul connection path, and (v) reduce bandwidth capacity for an existing IAB backhaul connection path.

System Embodiment 15. The wireless communications system of System Embodiment 1, wherein the second wireless backhaul connection is established between first wireless base station and a third wireless base station; and wherein the first processor further controls the IAB management node to perform the following operations: monitoring the usage of the first wireless backhaul connection path, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station; determining based on the monitored usage of the first wireless backhaul connection, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station whether or not to terminate the second wireless backhaul connection; and in response to determining to terminate the second wireless backhaul connection path, sending a message to the terminate the second wireless backhaul connection path.

System Embodiment 16. The wireless communications system of System Embodiment 15, wherein the first processor further controls the IAB management node to perform the following operations: determining, by the IAB management node, based on the monitored usage of the first wireless backhaul connection path, usage of the second wireless backhaul connection path, connection request information for the first wireless base station, connection request information for the second wireless base station, connection request information for the third wireless base station, cell loading at the first wireless base station, cell loading at the second wireless base station, and/or cell loading at the third wireless base station whether or not to add an additional wireless backhaul connection for the first wireless base station; and in response to determining to add an additional wireless backhaul connection path, (i) selecting a fourth wireless base station to be an IAB parent donor for the first wireless base station from wireless base stations which are neighbor wireless base stations of the first wireless base station, (ii) generating one or messages to establish the additional wireless backhaul connection path for the first wireless base station, and (iii) sending the generated one or more messages to establish an additional wireless backhaul connection path for the first wireless base station (e.g., with session establishment information and/or IAB parameters to an Operations Support System, the first wireless base station and/or the fourth wireless base station).

The techniques of various embodiments may be implemented using software, hardware and/or a combination of software and hardware. Various embodiments are directed to apparatus, e.g., wireless base stations, eNodeBs, gNodeBs, CBSDs, user equipment devices, wireless devices, wireless endpoint stations, user devices, subscriber devices, IAB management nodes, IAB donors, IAB nodes, Operations Support System, core network, network equipment, Spectrum Access System, servers, nodes, and/or elements. Various embodiments are also directed to methods, e.g., method of controlling and/or operating wireless base stations, eNodeBs, gNodeBs, CBSDs, user equipment devices, wireless devices, wireless endpoint stations, user devices, subscriber devices, IAB management nodes, IAB donors, IAB nodes, Operations Support System, core network, network equipment, Spectrum Access System, servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, wireless base stations, eNodeBs, gNodeBs, CBSDs, user equipment devices, wireless devices, wireless endpoint stations, user devices, subscriber devices, IAB management nodes, IAB donors, IAB nodes, Operations Support System, core network, network equipment, Spectrum Access System, servers, nodes, and/or elements are described herein are implemented using one or more components to perform the steps corresponding to one or more methods, for example, establishing wireless backhaul connection paths/routes, selecting routes, generating messages, communicating messages, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless base station, eNodeB, gNodeB, CBSD, user equipment device, wireless device, wireless endpoint station, user device, subscriber device, IAB management node, IAB donor, IAB node, Operations Support System, network equipment, Spectrum Access System, including a processor configured to implement one, multiple or all of the steps of one or more methods of the invention.

In some embodiments, the processor or processors, e.g., CPUs, of one or more devices, e.g., wireless base stations, eNodeBs, gNodeBs, CBSDs, user equipment devices, wireless devices, wireless endpoint stations, user devices, subscriber devices, IAB management nodes, IAB donors, IAB nodes, Operations Support System, core network, network equipment, Spectrum Access System nodes, and/or elements are configured to perform the steps of the methods described as being performed by the wireless base stations, eNodeBs, gNodeBs, CBSDs, user equipment devices, wireless devices, wireless endpoint stations, user devices, subscriber devices, IAB management nodes, IAB donors, IAB nodes, Operations Support System, core network, network equipment, Spectrum Access System, servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a wireless base station, eNodeB, gNodeB, CBSD, user equipment device, wireless device, wireless endpoint station, user device, subscriber device, IAB management node, IAB donor, IAB node, Operations Support System, network equipment, Spectrum Access System, server, node, and/or element, with a processor which includes a component corresponding to each of the steps of the various described methods performed by the device in which the processor is included. In some but not all embodiments a device, e.g., a wireless base station, eNodeB, gNodeB, CBSD, user equipment device, wireless device, wireless endpoint station, user device, subscriber device, IAB management node, IAB donor, IAB node, Operations Support System, network equipment, Spectrum Access System, server, node and/or element includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base station, eNodeB, gNodeB, CBSD, user equipment device, wireless device, wireless endpoint station, user device, subscriber device, IAB management node, IAB donor, IAB node, Operations Support System, network equipment, Spectrum Access System, server, node, and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such a wireless base station, eNodeB, gNodeB, CBSD, user equipment device, wireless device, wireless endpoint station, user device, subscriber device, IAB management node, IAB donor, IAB node, Operations Support System, network equipment, Spectrum Access System, server, node, element or other device described in the present application.

Various embodiments of the present invention provide new and/or improved methods and apparatus for utilizing and managing multi-parent donors in IAB networks. The use of multiple IAB donors for a child IAB node improves the efficiency, robustness and adaptability to traffic loads of IAB networks especially mixed technology networks which utilize a plurality of different RATs, wireless protocols and interfaces.

Numerous additional variations on the methods and apparatus of the various embodiments described above will be apparent to those skilled in the art in view of the above description. Numerous additional embodiments, within the scope of the present invention, will be apparent to those of ordinary skill in the art in view of the above description and the claims which follow. Such variations are to be considered within the scope of the invention.

What is claimed is:

1. A wireless communications method comprising:

receiving, at an Integrated Access and Backhaul (IAB) management node, user equipment device connection request information for a first wireless base station, said first wireless base station being an IAB child node having a first wireless backhaul connection path to a second wireless base station, said second wireless base station being a first IAB parent node;

determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station;

wherein the second wireless backhaul connection path is a connection path to a third wireless base station, said third wireless base station being a second IAB parent node;

wherein the first IAB parent node is a first IAB donor with a fiber-optic or wired backhaul connection to a core network; and wherein the second IAB parent node is a second IAB donor with a fiber-optic or wired backhaul connection to the core network.

2. The wireless communications method of claim 1, wherein the received user equipment device connection request information is a first count of the number of Physical Random Access Channel (PRACH) requests received by the first wireless base station during a first period of time.

3. The wireless communications method of claim 1, wherein said determining, by the IAB management node, whether or not a second wireless backhaul connection path is to be established for the first wireless base station based on the received user equipment device connection request information for the first wireless base station includes:

monitoring, by the IAB management node, the received user equipment device connection request information for the first wireless base station to determine if the number of connection requests received from user equipment devices by the first wireless base station during a first period of time exceeds a first threshold value; and in response to determining the number of connection requests received from user equipment devices by the first wireless base station during the first period of time exceeds the first threshold value, determining that the second wireless backhaul connection is to be established.

4. The wireless communications method of claim 1, further comprising:

selecting, by the IAB management node, the third wireless base station from a plurality of neighbor wireless base stations based on measured backhaul connection path performance or predicted backhaul connection path performance, said plurality of neighbor wireless base stations being neighbors of said first wireless base station.

5. The wireless communications method of claim 4, further comprising:

maintaining, by the IAB management node, historical performance metrics of wireless backhaul connection paths provided by wireless base; stations which are IAB parent nodes; and utilizing said historical performance metrics to predict wireless backhaul connection path performance which can be provided by neighbor wireless base stations which are IAB parent nodes.

6. The wireless communications method of claim 1, further comprising:

determining, by the IAB management node, session establishment information for the second wireless backhaul connection path between the first wireless base station and the third wireless base station; and communicating, by the IAB management node, the determined session establishment information for the second wireless backhaul connection path to the first wireless base station and the third wireless base station.

7. The wireless communications method of claim 1, wherein said message includes instructions for the third wireless base station to establish the second wireless backhaul connection path between the third wireless base station and the first wireless base station, said second wireless backhaul connection path being an IAB backhaul connection path.

8. The wireless communications method of claim 1, further comprising:

establishing, by the first wireless base station and the third wireless base station, the second wireless backhaul connection path between the first wireless base station and the third wireless base station, said second wireless backhaul connection path being an IAB backhaul connection path; and utilizing the second wireless backhaul connection path to communicate data from the first wireless base station to the core network via the third wireless base station.

9. The wireless communications method of claim 8, further comprising:

after a first period of time of utilizing the second wireless backhaul connection path to communicate data from the first wireless base station to the core network via the third wireless base station, executing a set of performance tests on the second wireless backhaul connection path to determine the second wireless backhaul connection path's performance;

reporting results of the set of performance tests executed on the second wireless backhaul connection path to the IAB management node;

determining, by the IAB management node, whether the results of the set of performance tests executed on the second wireless backhaul connection path meet a set of performance criteria for the second wireless backhaul connection path; and in response to determining, by the IAB management node, that the second wireless backhaul connection path does not meet the set of performance criteria for the second wireless backhaul connection path, determining to create one or more additional IAB wireless backhaul connections for the first wireless base station via one or more additional wireless base stations, said one or more additional wireless base stations being IAB donors.

10. The wireless communications method of claim 1, further comprising:

minimizing spectrum interference with the usage of priority access licensed spectrum by the first wireless base station, the second wireless base station, and the third wireless base station by establishing the second wireless backhaul connection path as a General Authorized Access spectrum point to point narrow beam channel between the first wireless base station and the third wireless base station.

11. A wireless communications system comprising:

an Integrated Access and Backhaul (IAB) management node, said IAB management node including memory and a first processor, said first processor configured to control the IAB management node to perform the following operations:

receiving, at the IAB management node, user equipment device connection request information for a first wireless base station, said first wireless base station being an IAB child node having a first wireless backhaul connection path to a second wireless base station, said second wireless base station being a first IAB parent node;

determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station;

wherein the second wireless backhaul connection path is a connection path to a third wireless base station, said third wireless base station being a second IAB parent node;

wherein the first IAB parent node is a first IAB donor with a fiber-optic or wired backhaul connection to a core network; and wherein the second IAB parent node is a second IAB donor with a fiber-optic or wired backhaul connection to the core network.

12. The wireless communications system of claim 11, wherein the received user equipment device connection request information is a first count of the number of Physical Random Access Channel (PRACH) requests received by the first wireless base station during a first period of time.

13. The wireless communications system of claim 11, wherein the first processor further controls the IAB management node to perform the following additional operation: minimizing spectrum interference with the usage of priority access licensed spectrum by the first wireless base station, the second wireless base station, and the third wireless base station by establishing the second wireless backhaul connection path as a General Authorized Access spectrum point to point narrow beam channel between the first wireless base station and the third wireless base station.

14. The wireless communications system of claim 11, wherein the first processor further controls the IAB management node to perform the following additional operation: selecting, by the IAB management node, the third wireless base station from a plurality of neighbor wireless base stations based on measured backhaul connection path performance or predicted backhaul connection path performance, said plurality of neighbor wireless base stations being neighbors of said first wireless base station.

15. The wireless communications system of claim 14, wherein the first processor further controls the IAB management node to perform the following additional operations: (i) maintaining, in said memory, historical performance metrics of wireless backhaul connection paths provided by wireless base stations which are IAB parent nodes; and (ii) utilizing said historical performance metrics to predict wireless backhaul connection path performance which can be provided by neighbor wireless base stations which are IAB parent nodes.

16. The wireless communications system of claim 11, wherein said message includes instructions for the third wireless base station to establish the second wireless backhaul connection path between the third wireless base station and the first wireless base station, said second wireless backhaul connection path being an IAB backhaul connection path.

17. A non-transitory computer readable medium including a set of computer executable instructions which, when executed by a processor of an Integrated Access and Backhaul (IAB) management node, cause the IAB management node to perform the steps of:

receiving user equipment device connection request information for a first wireless base station, said first wireless base station being an IAB child node having a first wireless backhaul connection path to a second wireless base station, said second wireless base station being a first IAB parent node;

determining, by the IAB management node, whether or not a second wireless backhaul connection path is to be established for the first wireless base station based on the received user equipment device connection request information for the first wireless base station; and in response to determining to establish the second wireless backhaul connection path for the first wireless base station, sending, by the IAB management node, a message to establish the second wireless backhaul connection path for the first wireless base station;

wherein the second wireless backhaul connection path is a connection path to a third wireless base station, said third wireless base station being a second IAB parent node;

wherein the first IAB parent node is a first IAB donor with a fiber-optic or wired backhaul connection to a core network; and wherein the second IAB parent node is a second IAB donor with a fiber-optic or wired backhaul connection to the core network.

18. The wireless communications system of claim 11, wherein said determining, by the IAB management node, whether or not a second wireless backhaul connection path is to be established for the first wireless base station based on the received user equipment device connection request information for the first wireless base station includes:

monitoring, by the IAB management node, the received user equipment device connection request information for the first wireless base station to determine if the number of connection requests received from user equipment devices by the first wireless base station during a first period of time exceeds a first threshold value; and in response to determining the number of connection requests received from user equipment devices by the first wireless base station during the first period of time exceeds the first threshold value, determining that the second wireless backhaul connection is to be established.

19. The wireless communications system of claim 11, wherein the first processor further controls the IAB management node to perform the following additional operations:

determining session establishment information for the second wireless backhaul connection path between the first wireless base station and the third wireless base station; and communicating the determined session establishment information for the second wireless backhaul connection path to the first wireless base station and the third wireless base station.

20. The wireless communications system of claim 11, wherein the first wireless base station and the third wireless base station establish the second wireless backhaul connection path between the first wireless base station and the third wireless base station, said second wireless backhaul connection path being an IAB backhaul connection path; and wherein the first wireless base station utilizes the second wireless backhaul connection path to communicate data from the first wireless base station to the core network via the third wireless base station.

\* \* \* \* \*